(12) United States Patent
Hizu et al.

(10) Patent No.: US 11,223,784 B2
(45) Date of Patent: Jan. 11, 2022

(54) IMAGING DEVICE AND IMAGING SYSTEM

(71) Applicant: Sony Semiconductor Solutions Corporation, Kanagawa (JP)

(72) Inventors: Kazuki Hizu, Kanagawa (JP); Hongbo Zhu, Tokyo (JP); Takafumi Takatsuka, Kanagawa (JP); Yusuke Oike, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 109 days.

(21) Appl. No.: 16/636,143

(22) PCT Filed: May 16, 2019

(86) PCT No.: PCT/JP2019/019469
§ 371 (c)(1),
(2) Date: Feb. 3, 2020

(87) PCT Pub. No.: WO2020/008737
PCT Pub. Date: Jan. 9, 2020

(65) Prior Publication Data
US 2020/0186735 A1    Jun. 11, 2020

(30) Foreign Application Priority Data
Jul. 6, 2018 (JP) .............................. JP2018-128733

(51) Int. Cl.
*H04N 5/335* (2011.01)
*H04N 5/3745* (2011.01)
*H04N 5/378* (2011.01)

(52) U.S. Cl.
CPC .......... *H04N 5/3355* (2013.01); *H04N 5/378* (2013.01); *H04N 5/3745* (2013.01)

(58) Field of Classification Search
CPC ............... H04N 5/3355; H04N 5/3745; H04N 5/37455; H04N 5/378; H04N 5/379
See application file for complete search history.

(56) References Cited

U.S. PATENT DOCUMENTS 6,253,161 B1    6/2001 Arias-Estrada
9,577,645 B2 *  2/2017 Yoon ...................... G01T 1/247
(Continued)

FOREIGN PATENT DOCUMENTS

| | | |
|---|---|---|
| JP | 2008-271278 A | 11/2008 |
| JP | 2010-078338 A | 4/2010 |
| WO | 2004/054235 A1 | 6/2004 |

OTHER PUBLICATIONS

Extended European Search Report dated Nov. 11, 2020 for corresponding European Application No. 19830851.2.
(Continued)

*Primary Examiner* — Lin Ye
*Assistant Examiner* — Chriss S Yoder, III
(74) *Attorney, Agent, or Firm* — Michael Best & Friedrich LLP

(57) ABSTRACT

An imaging device according to the present disclosure includes: a pixel including a photoelectric converter configured to generate a signal in response to entering light, a storage configured to store data corresponding to the signal, and an output section configured to output the data stored in the storage; and a controller configured to control the output section to output the data in a case where the data stored in the storage satisfies a predetermined condition.

22 Claims, 39 Drawing Sheets

(56) References Cited

U.S. PATENT DOCUMENTS

2005/0224903 A1\* 10/2005 Augusto .............. H04N 5/3745
257/440
2011/0235771 A1\* 9/2011 Aull ................... H04N 5/37455
377/19

OTHER PUBLICATIONS

Posch C et al., "An asynchronous time-based image sensor", Circuits and Systems, 2008. ISCAS2008, IEEE International Symposium on, IEEE, Piscataway, NJ, USA, May 18, 2008 (May 18, 2008), pp. 2030-2133, XP031392426, ISBN;978-1-4244-1683-7.

\* cited by examiner

[ FIG. 1 ]
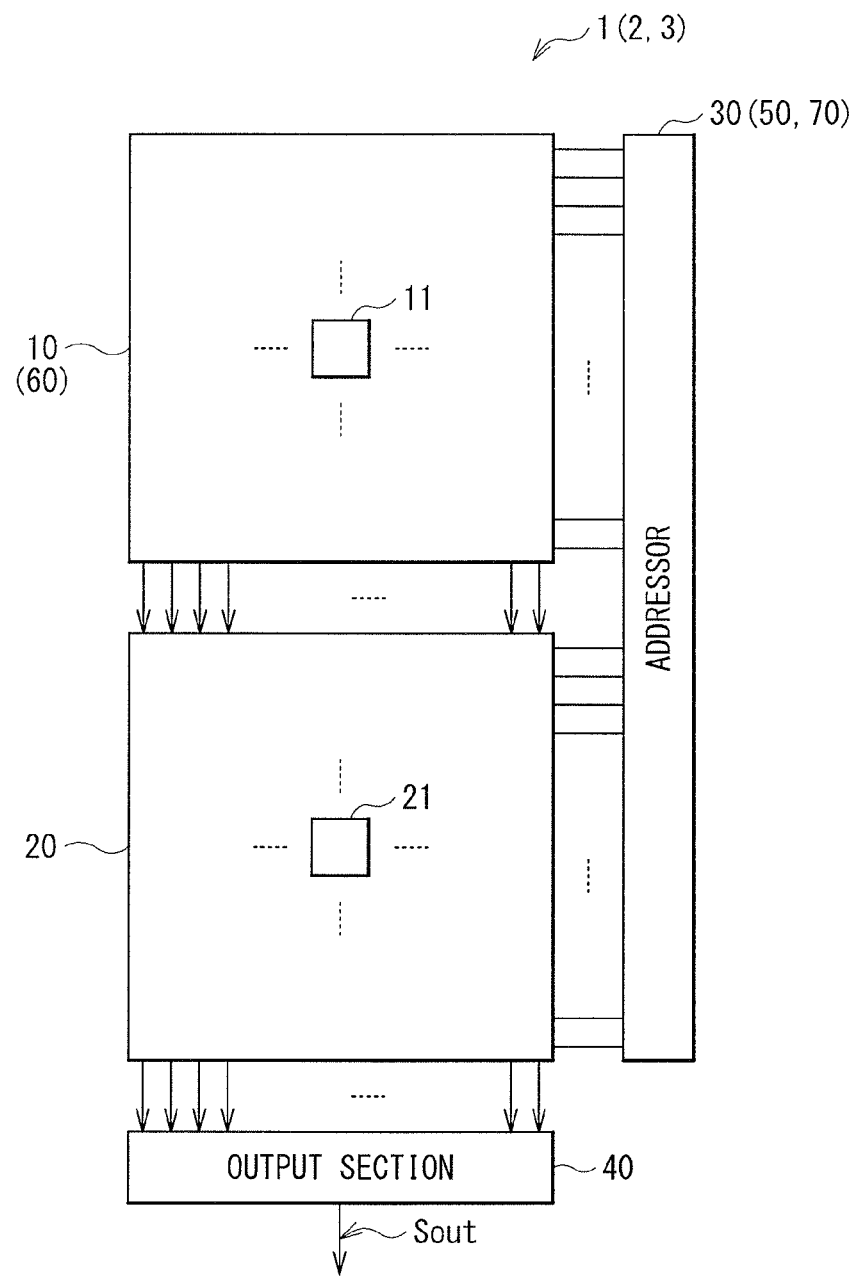

[FIG. 2]
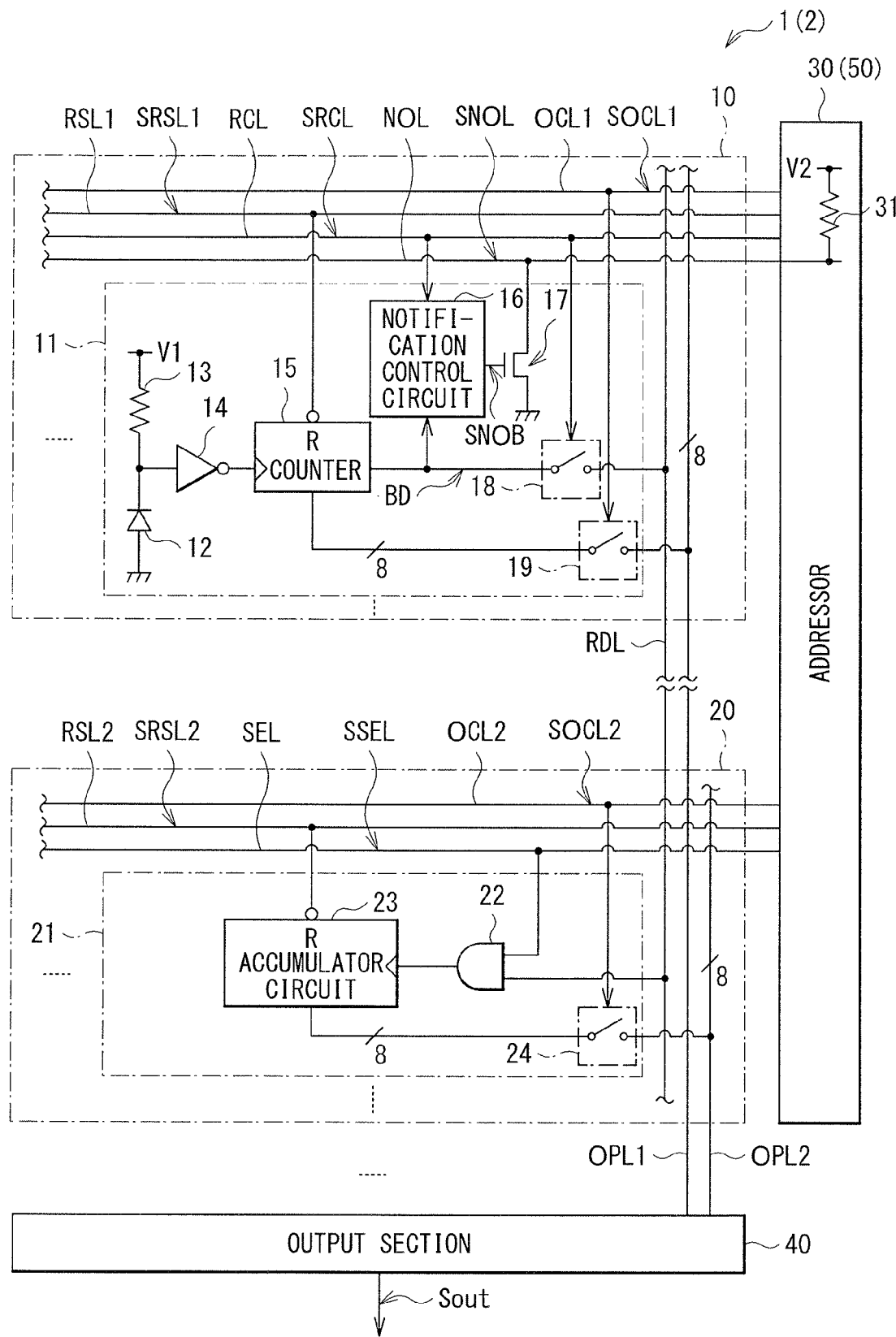

[FIG. 3]
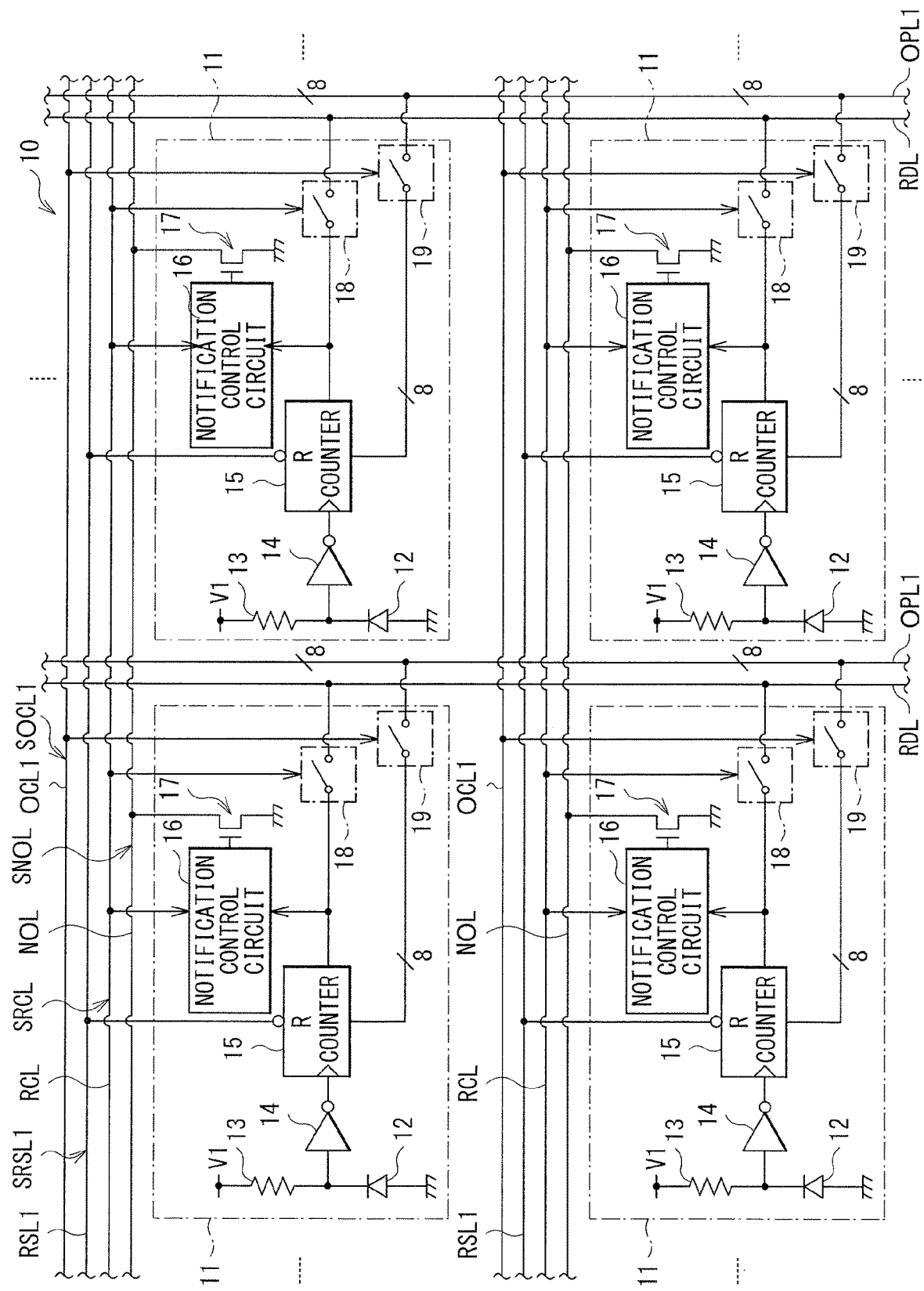

[FIG. 4]
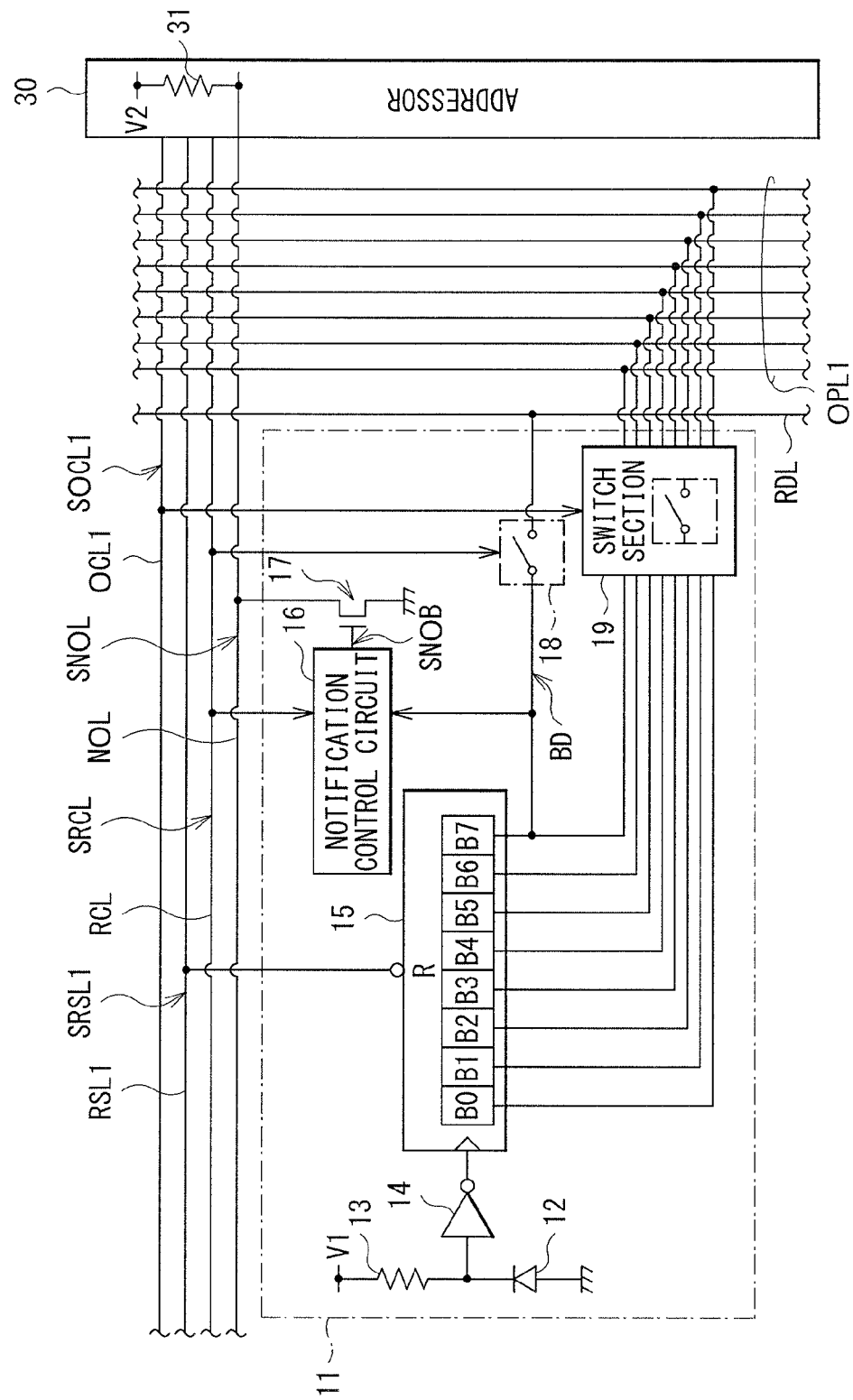

[FIG. 5]
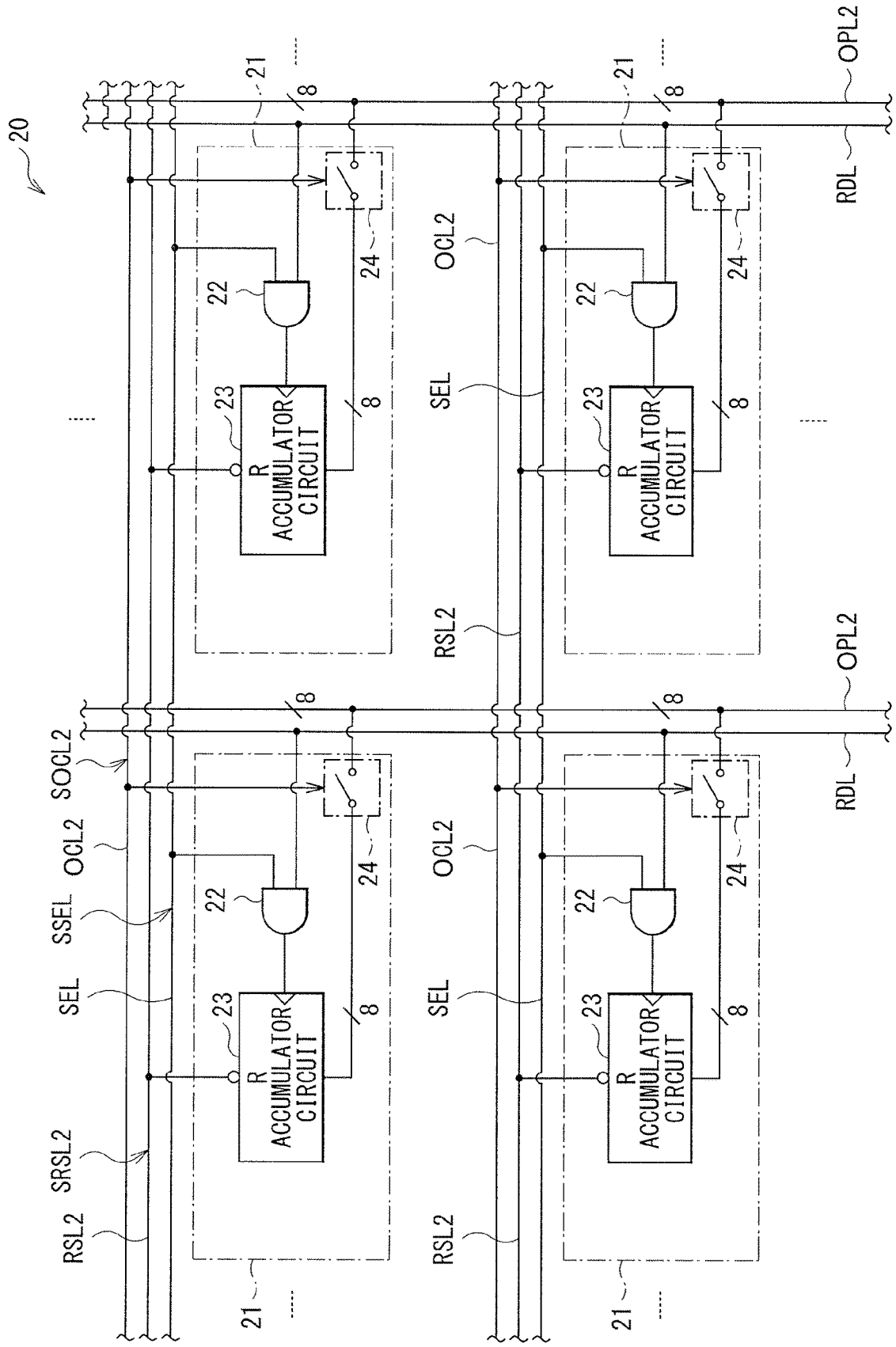

[FIG. 6]
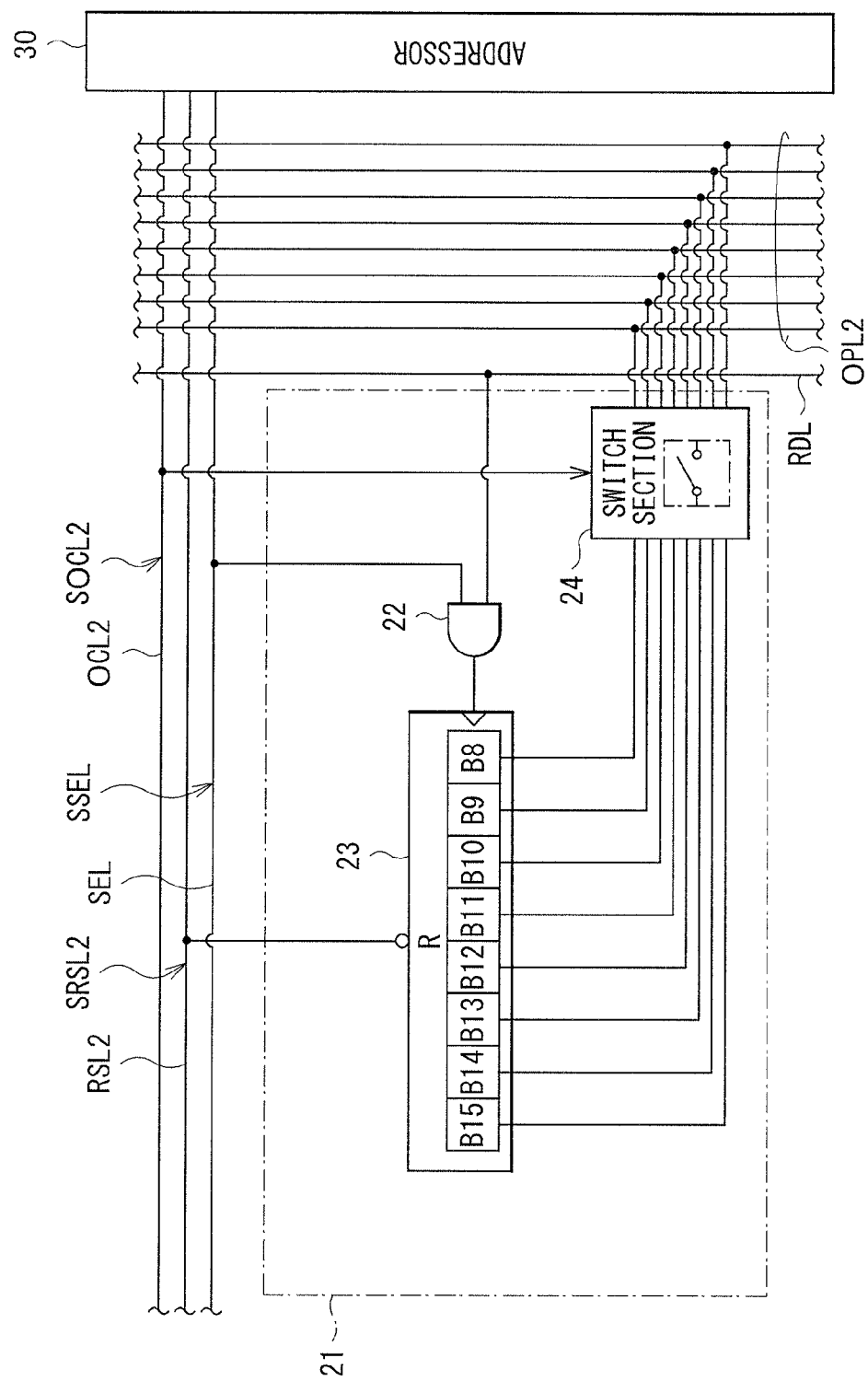

[ FIG. 7 ]
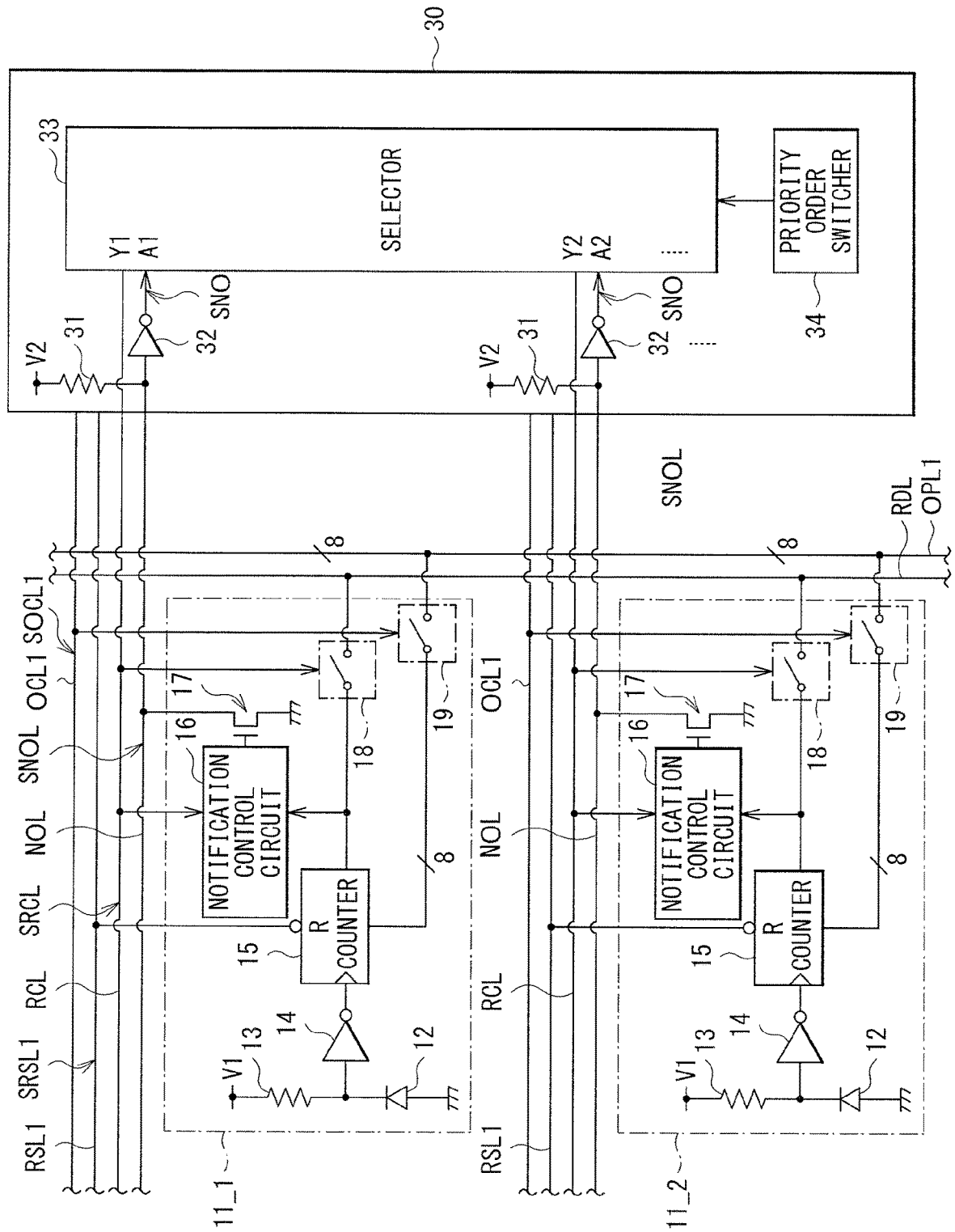

[ FIG. 8A ]

PATA

| A1 | A2 | A3 | A4 | Y1 | Y2 | Y3 | Y4 |
|----|----|----|----|----|----|----|----|
| 0  | 0  | 0  | 0  | 0  | 0  | 0  | 0  |
| 1  | 0  | 0  | 0  | 1  | 0  | 0  | 0  |
| X  | 1  | 0  | 0  | 0  | 1  | 0  | 0  |
| X  | X  | 1  | 0  | 0  | 0  | 1  | 0  |
| X  | X  | X  | 1  | 0  | 0  | 0  | 1  |

[ FIG. 8B ]

PATB

| A4 | A1 | A2 | A3 | Y4 | Y1 | Y2 | Y3 |
|----|----|----|----|----|----|----|----|
| 0  | 0  | 0  | 0  | 0  | 0  | 0  | 0  |
| 1  | 0  | 0  | 0  | 1  | 0  | 0  | 0  |
| X  | 1  | 0  | 0  | 0  | 1  | 0  | 0  |
| X  | X  | 1  | 0  | 0  | 0  | 1  | 0  |
| X  | X  | X  | 1  | 0  | 0  | 0  | 1  |

[ FIG. 8C ]

PATC

| A3 | A4 | A1 | A2 | Y3 | Y4 | Y1 | Y2 |
|----|----|----|----|----|----|----|----|
| 0  | 0  | 0  | 0  | 0  | 0  | 0  | 0  |
| 1  | 0  | 0  | 0  | 1  | 0  | 0  | 0  |
| X  | 1  | 0  | 0  | 0  | 1  | 0  | 0  |
| X  | X  | 1  | 0  | 0  | 0  | 1  | 0  |
| X  | X  | X  | 1  | 0  | 0  | 0  | 1  |

[ FIG. 8D ]
| A2 | A3 | A4 | A1 | Y2 | Y3 | Y4 | Y1 |
|----|----|----|----|----|----|----|----|
| 0  | 0  | 0  | 0  | 0  | 0  | 0  | 0  |
| 1  | 0  | 0  | 0  | 1  | 0  | 0  | 0  |
| X  | 1  | 0  | 0  | 0  | 1  | 0  | 0  |
| X  | X  | 1  | 0  | 0  | 0  | 1  | 0  |
| X  | X  | X  | 1  | 0  | 0  | 0  | 1  |
PATD
[ FIG. 9 ]
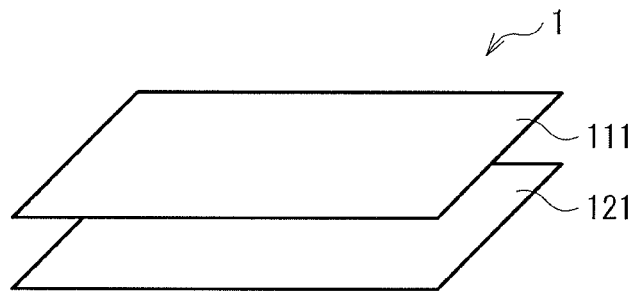
[ FIG. 10A ]
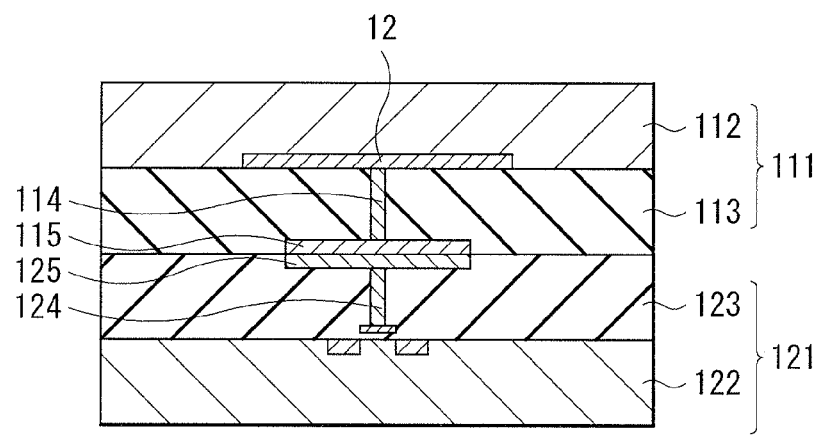

[ FIG. 10B ]
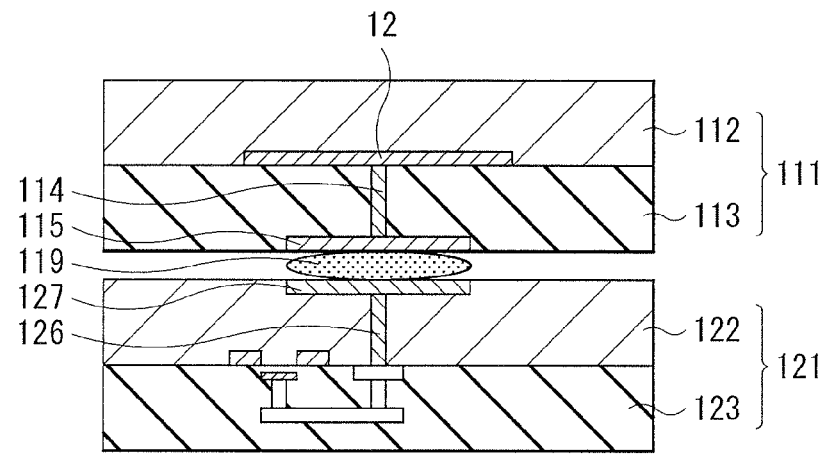
[ FIG. 11 ]
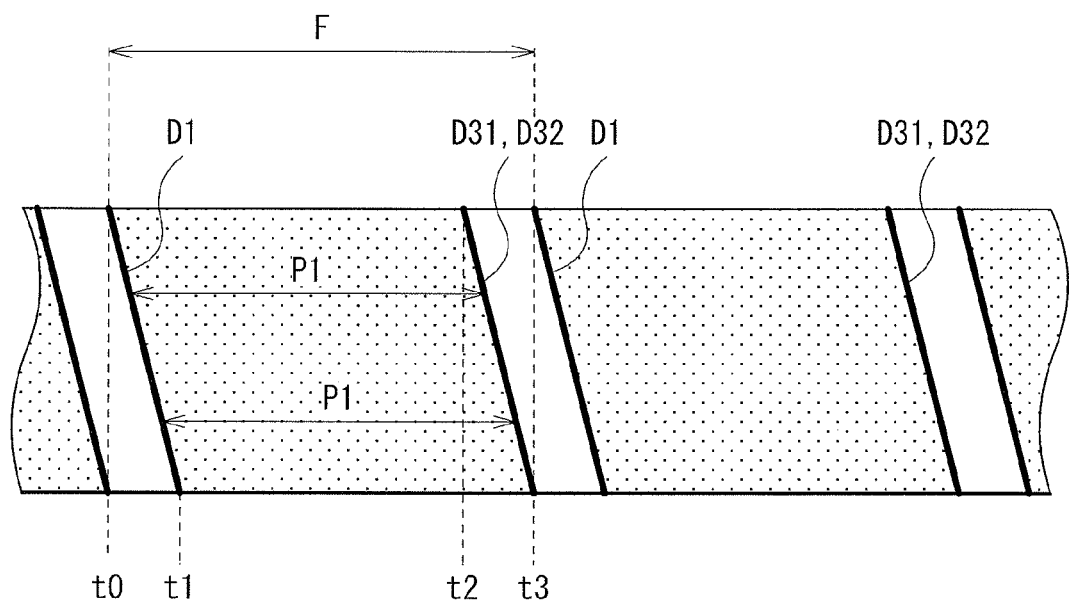

[FIG. 12]
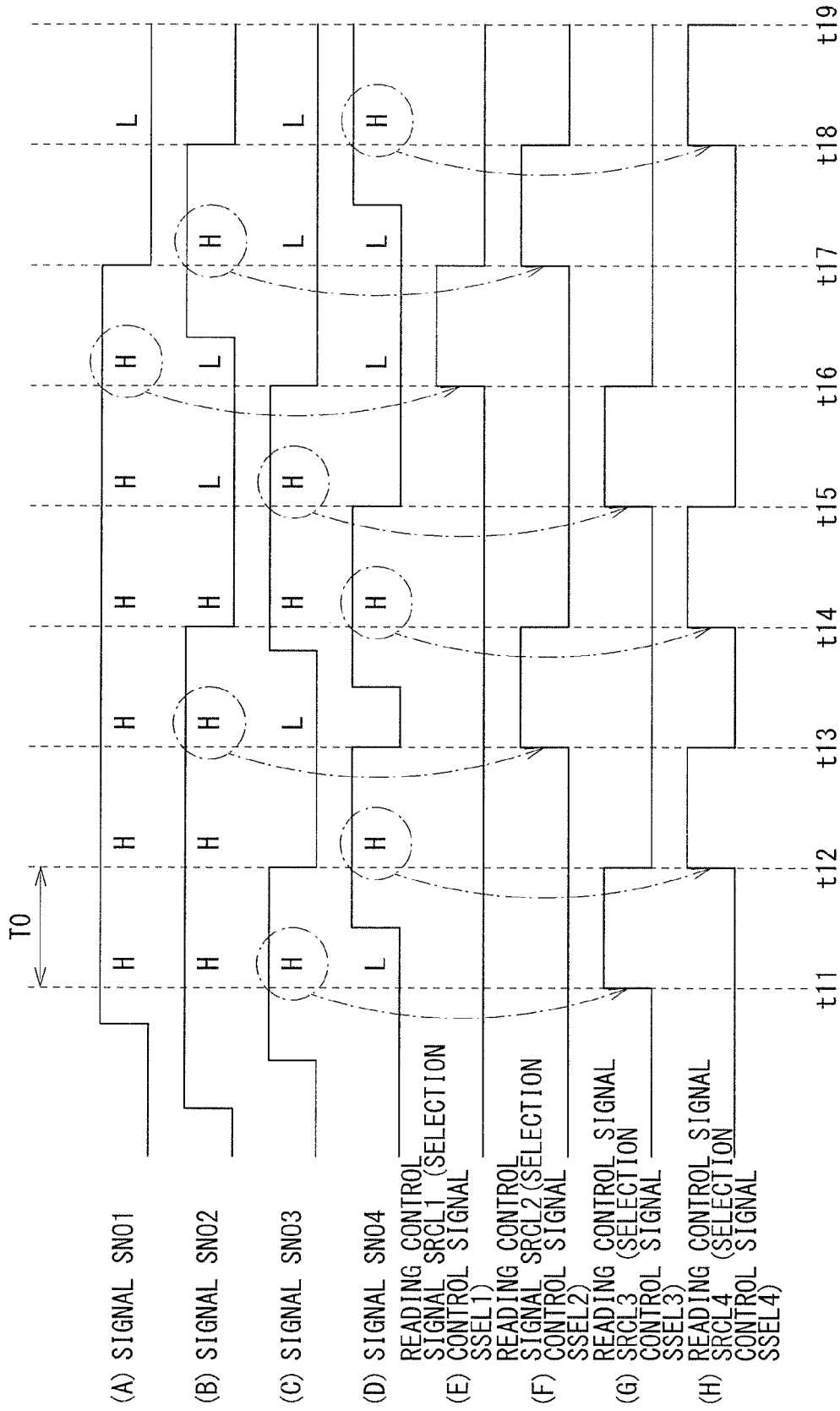

[ FIG. 13 ]
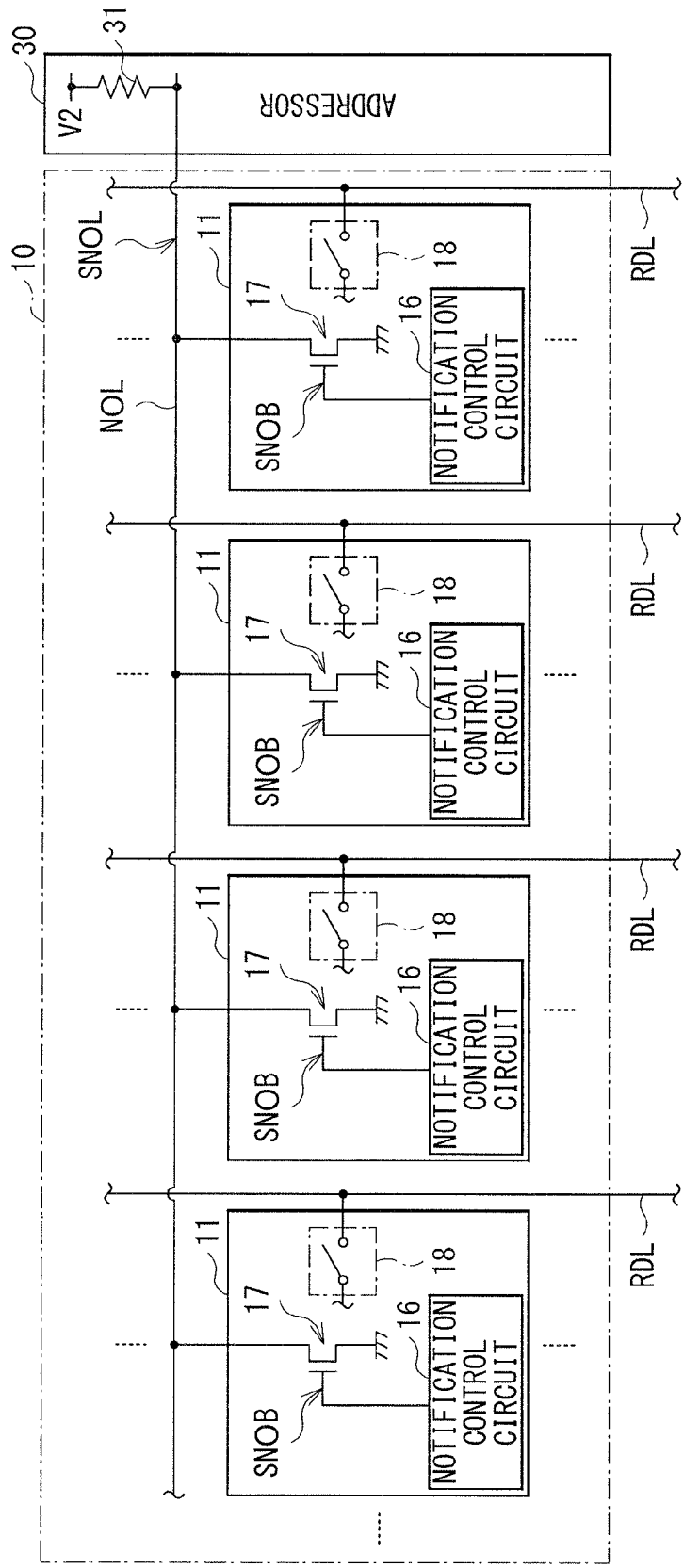

[FIG. 14]
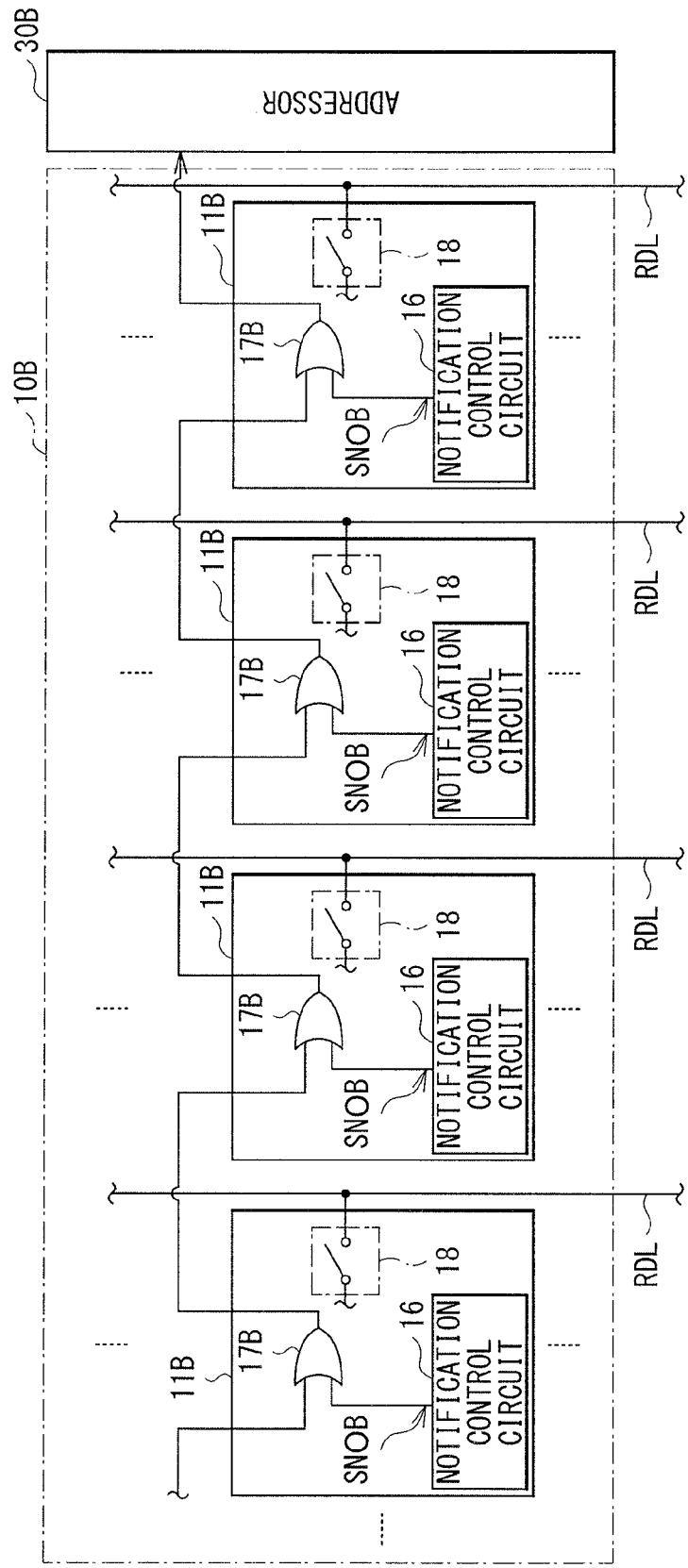

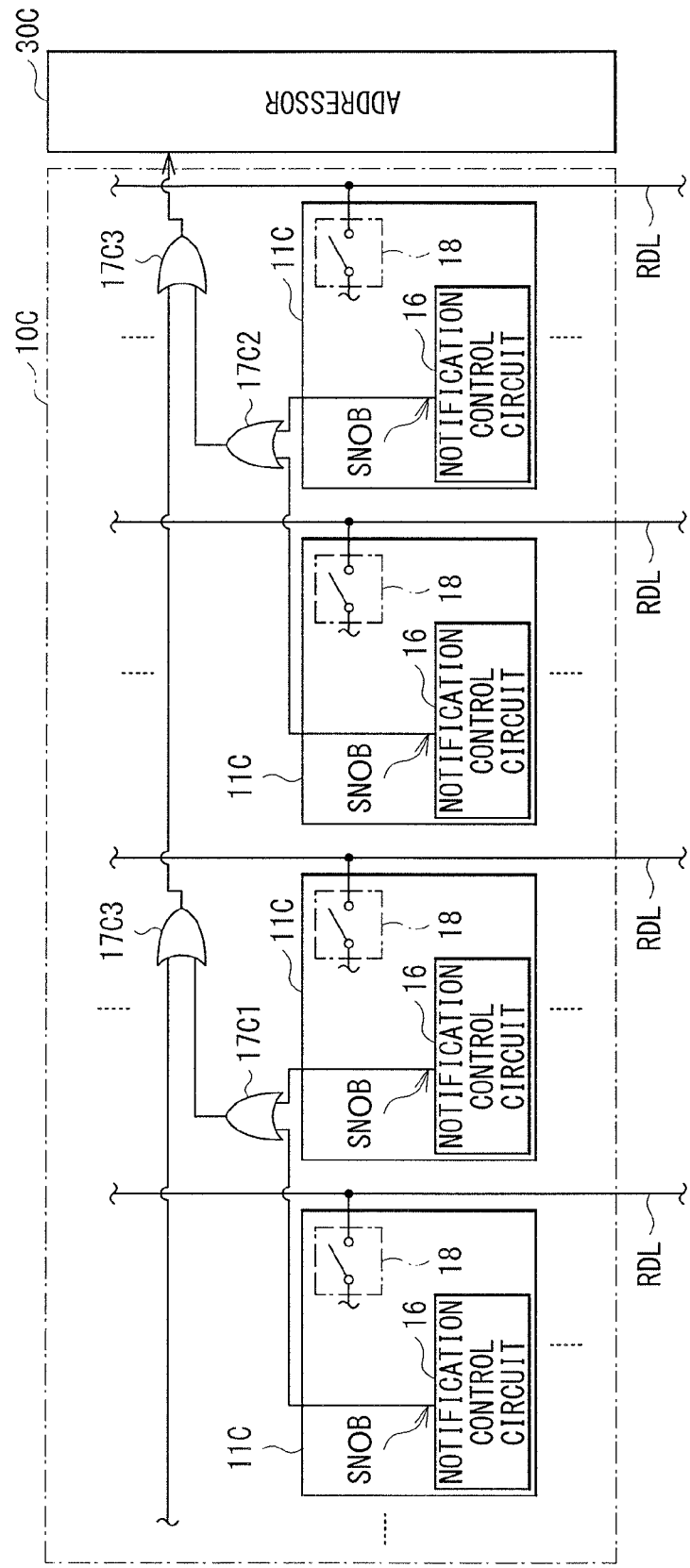
[FIG. 15]

[ FIG. 16 ]
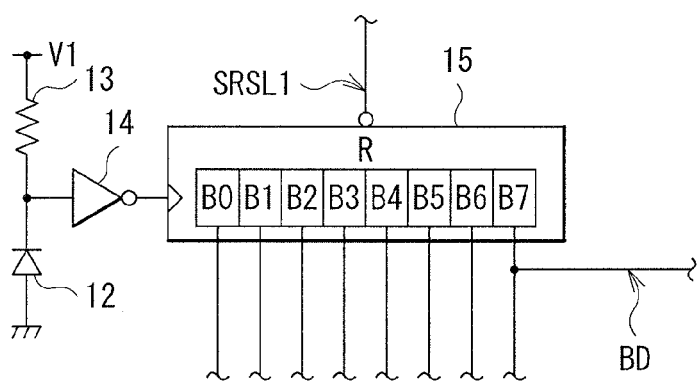
[ FIG. 17 ]
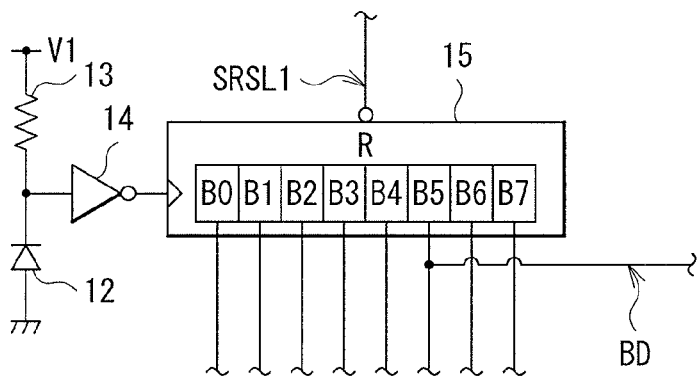

[ FIG. 18 ]
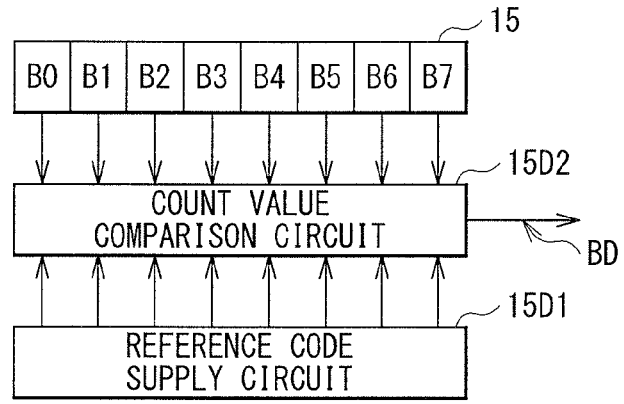
[ FIG. 19 ]
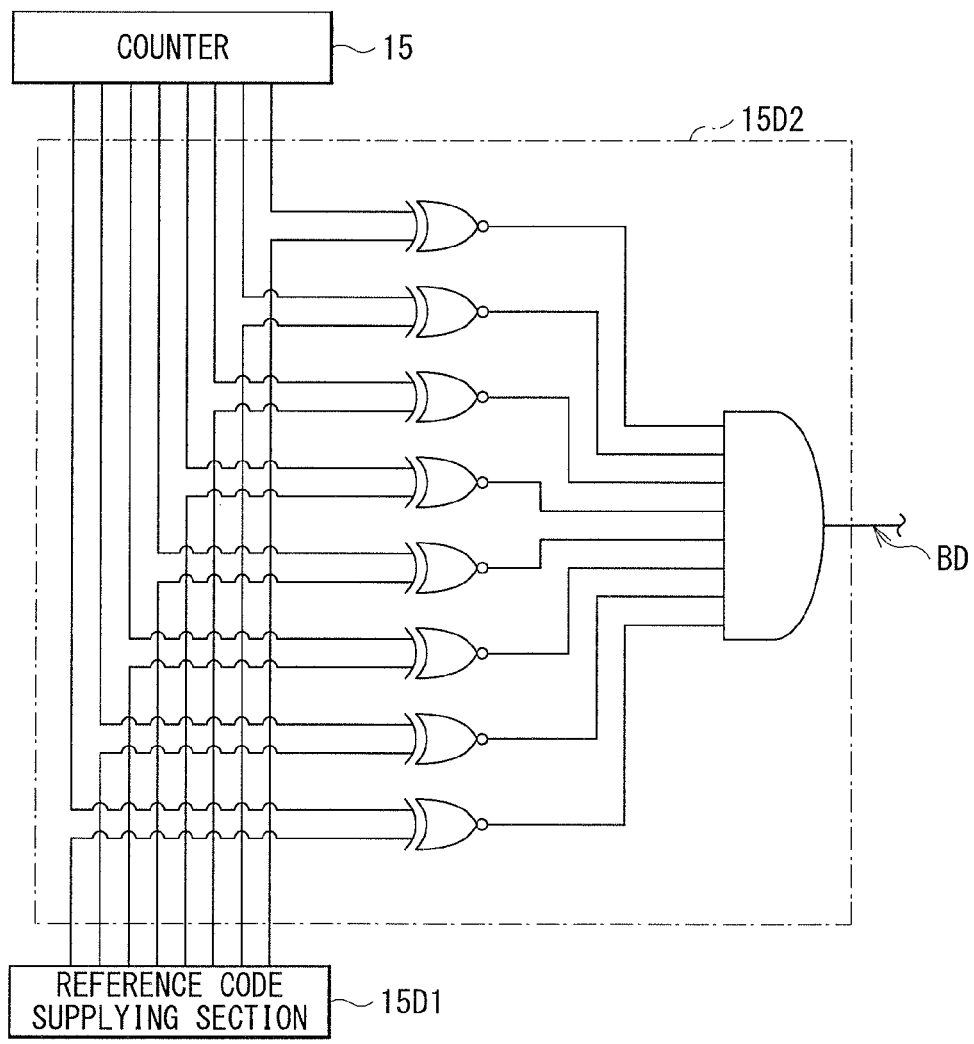

[ FIG. 20 ]
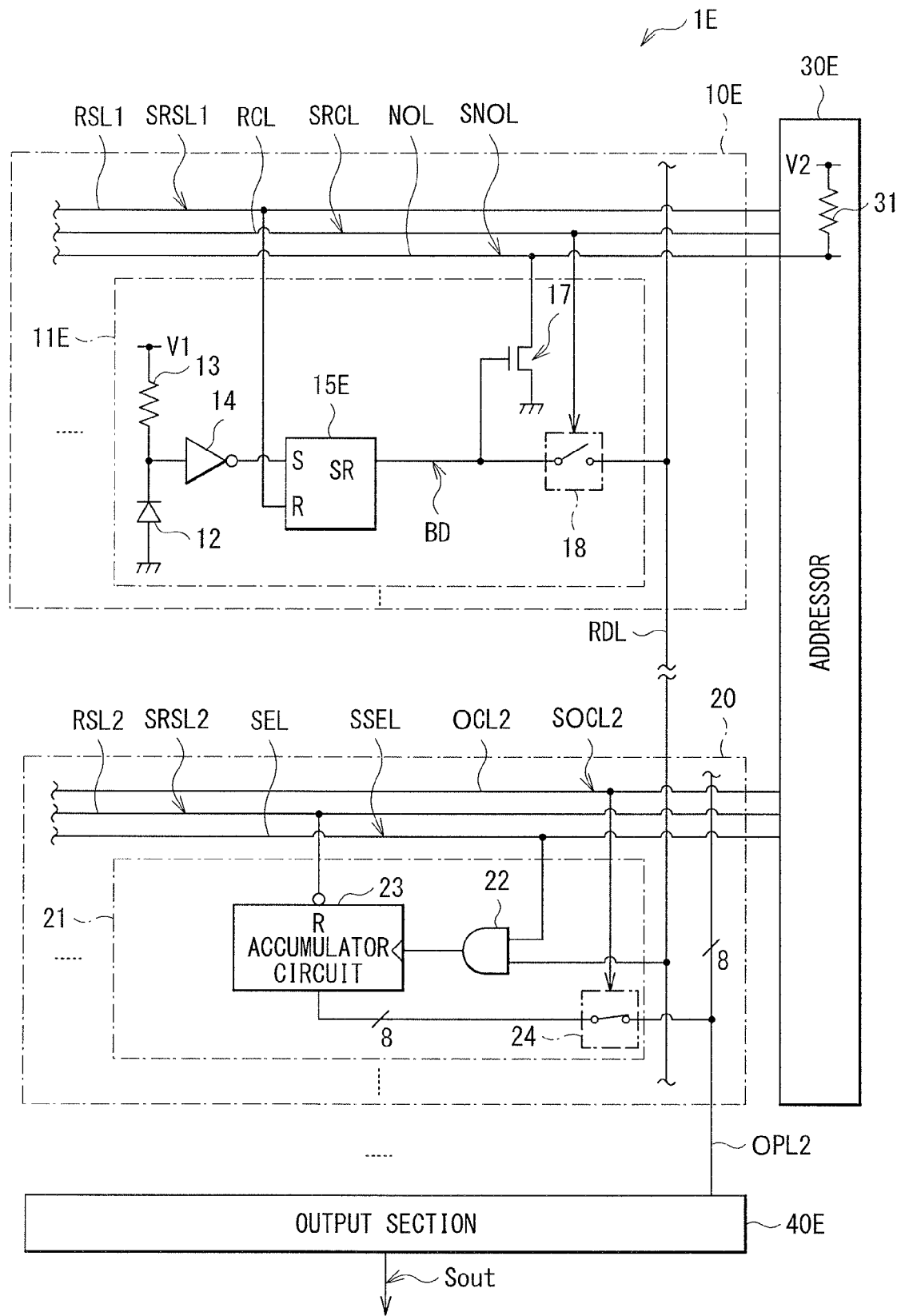

[ FIG. 21 ]
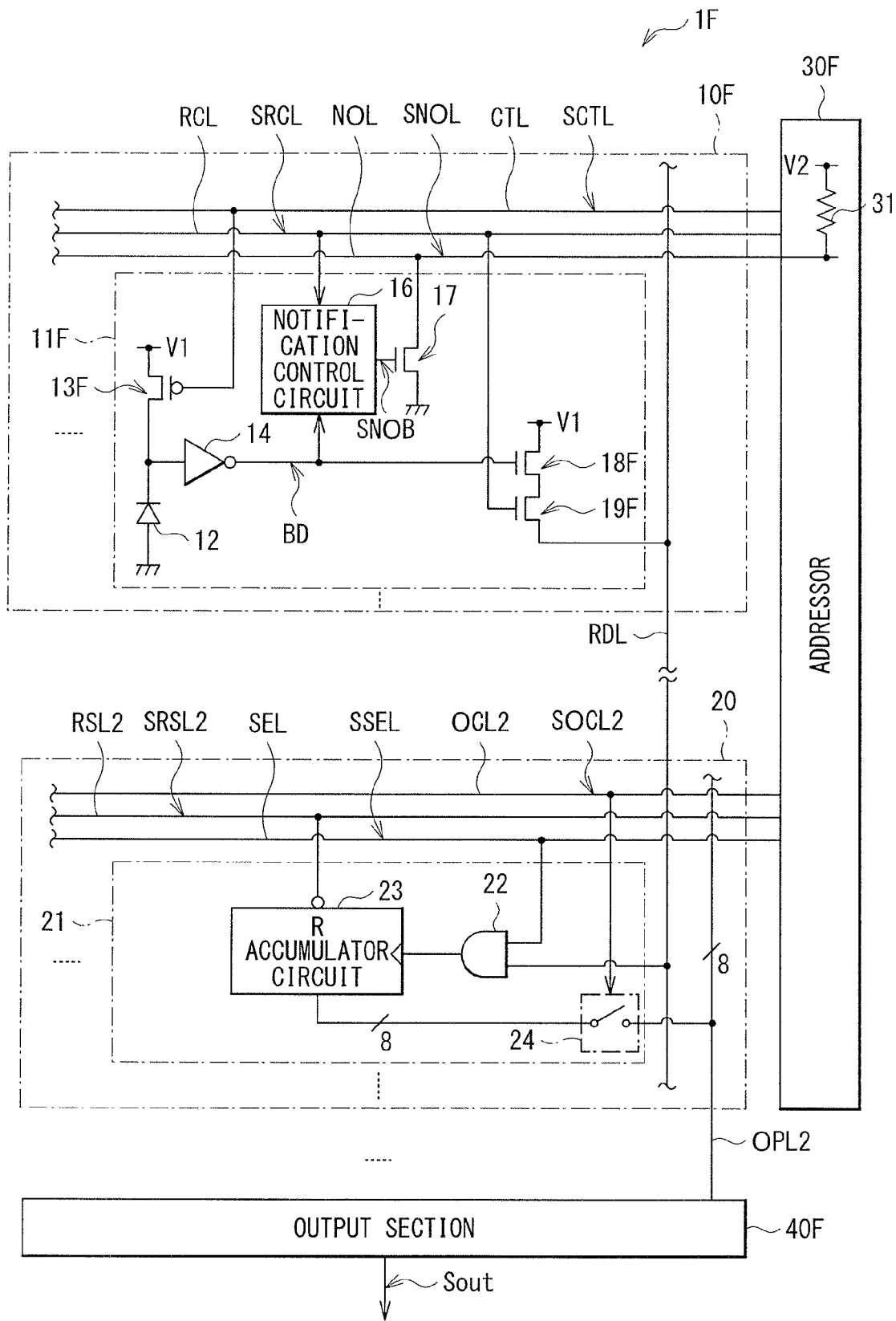

[ FIG. 22 ]
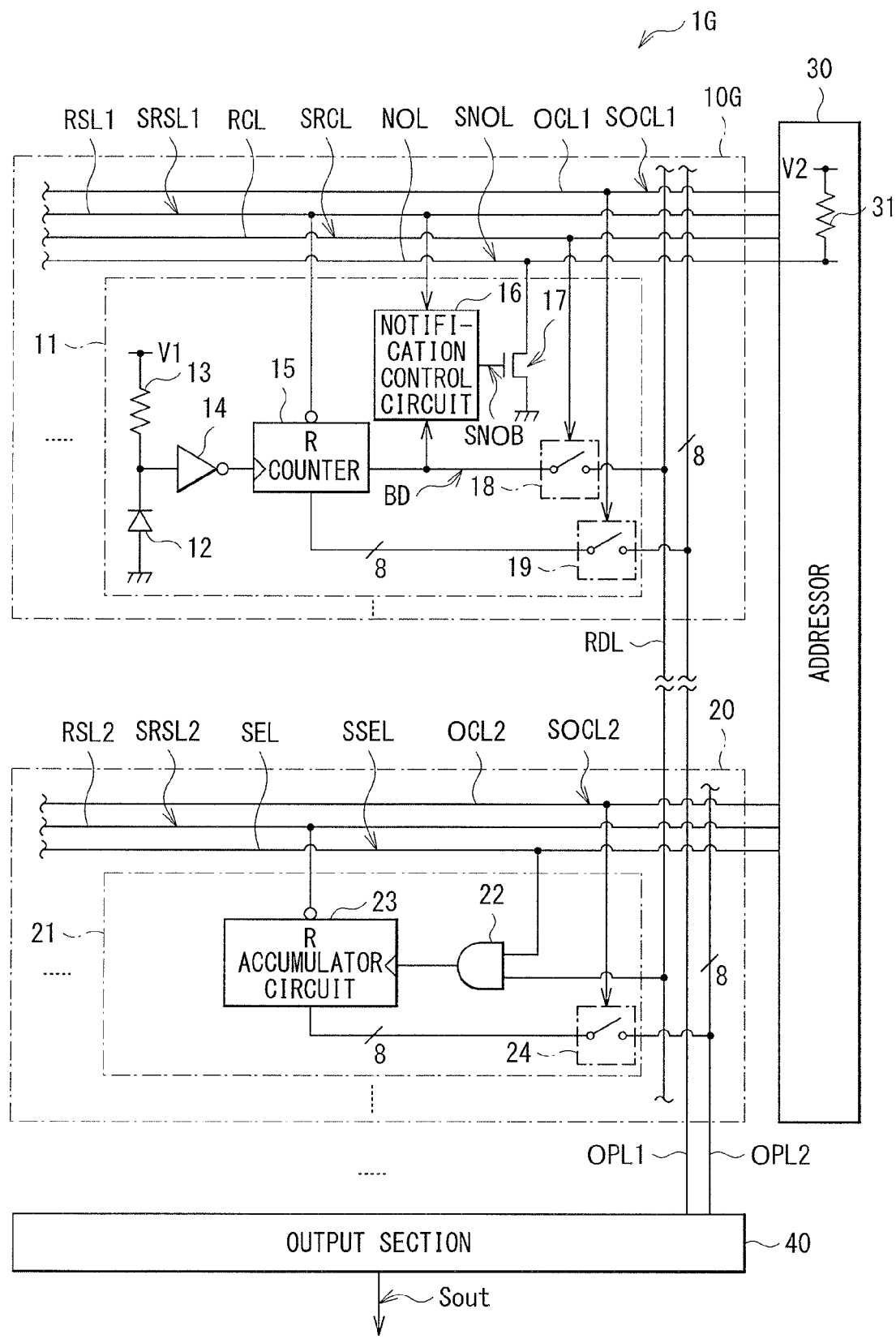

[FIG. 23]
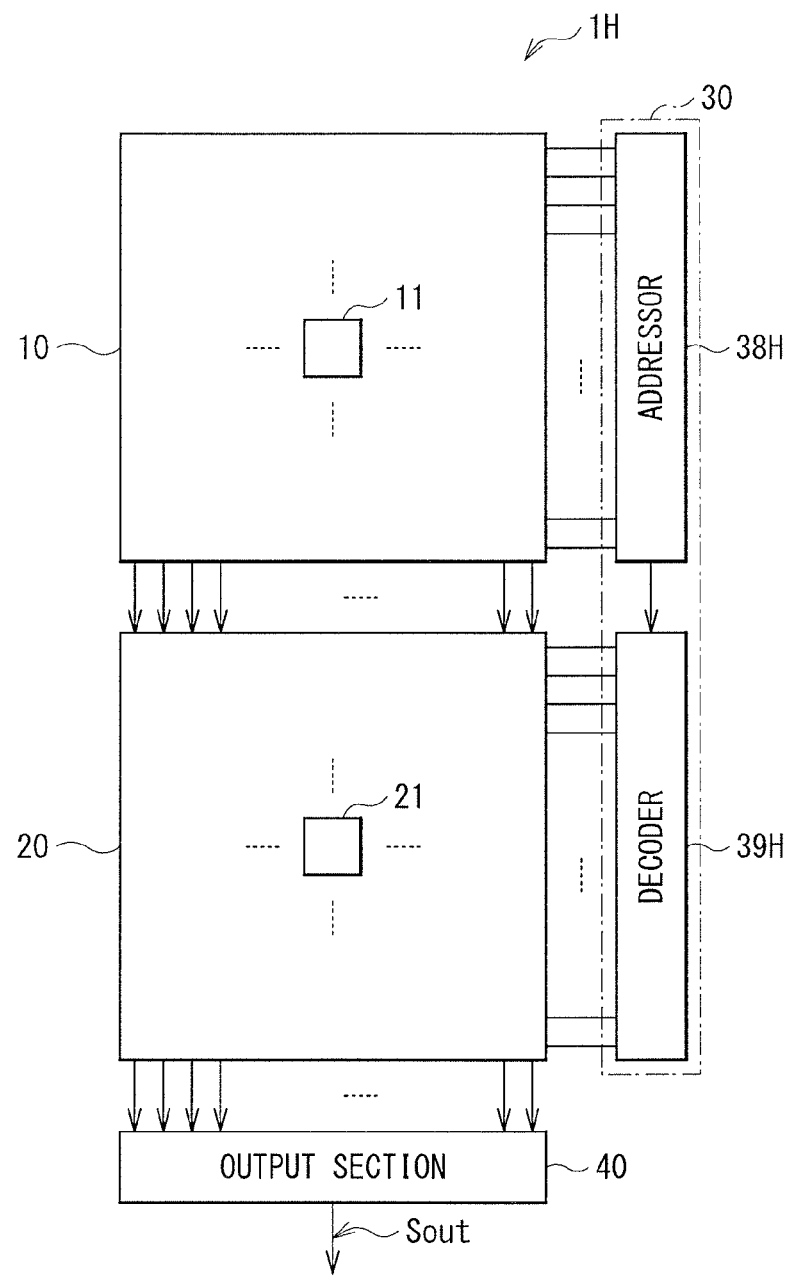

[ FIG. 24 ]
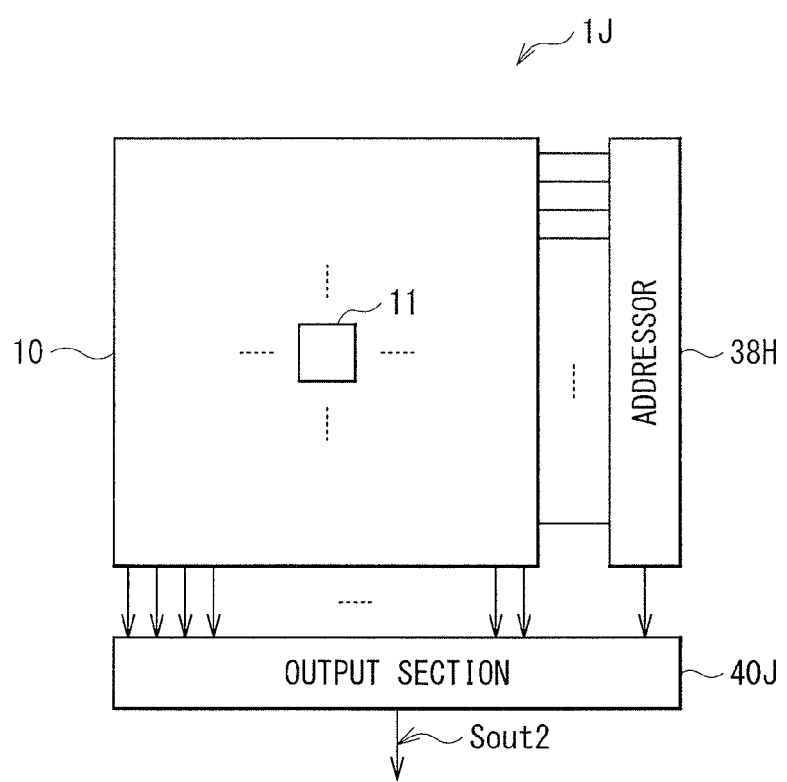

[ FIG. 25 ]
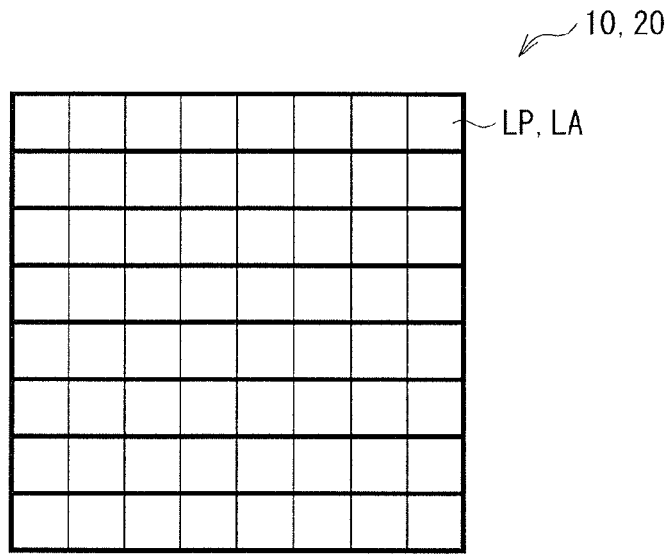
[ FIG. 26 ]
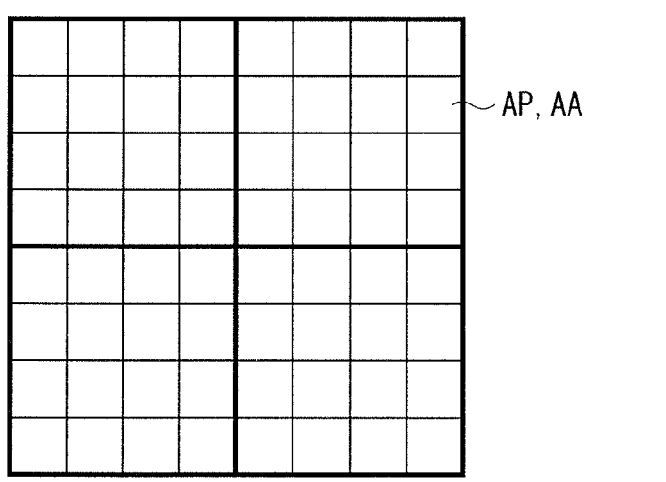

[ FIG. 27 ]
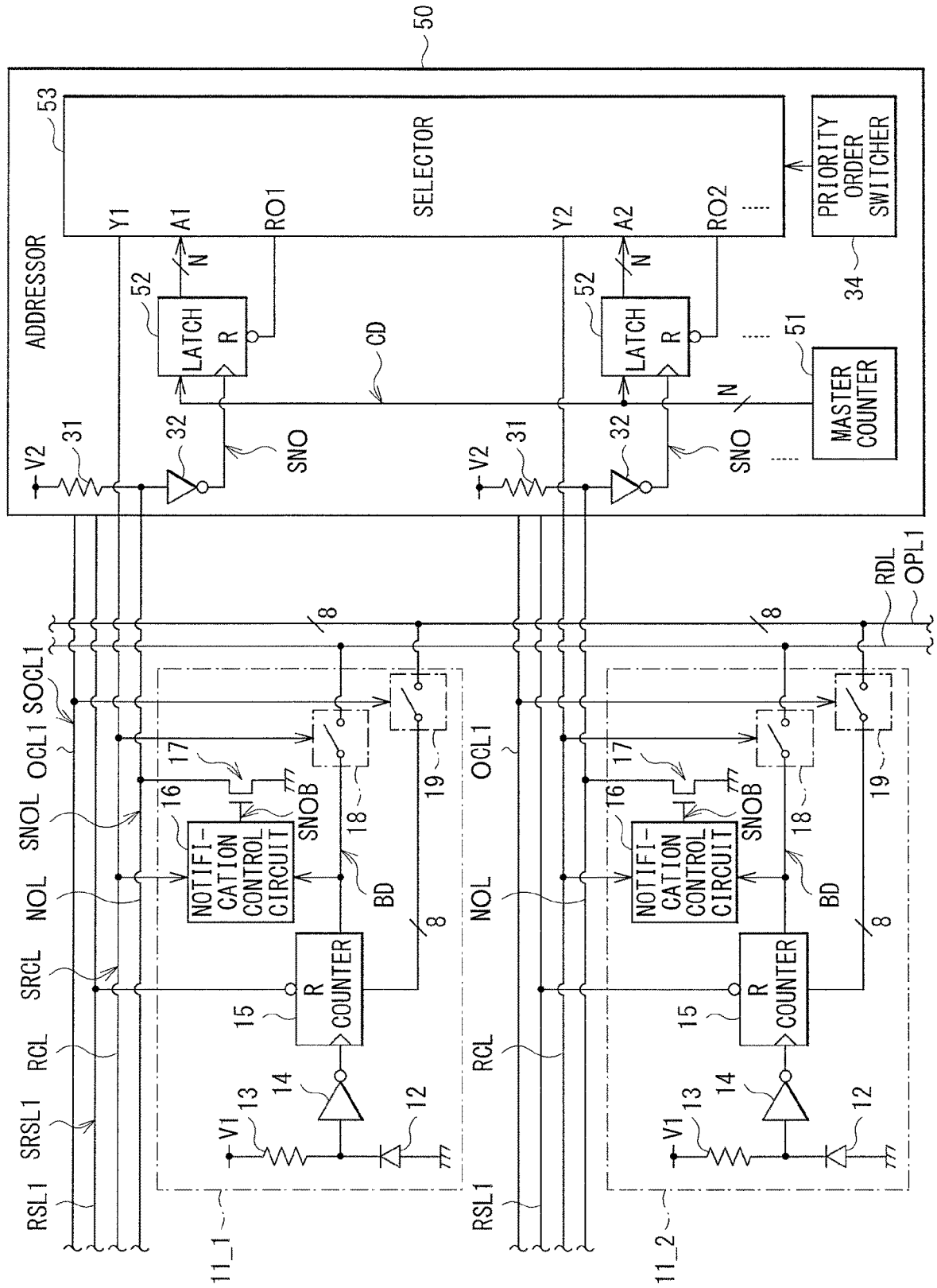

[ FIG. 28 ]
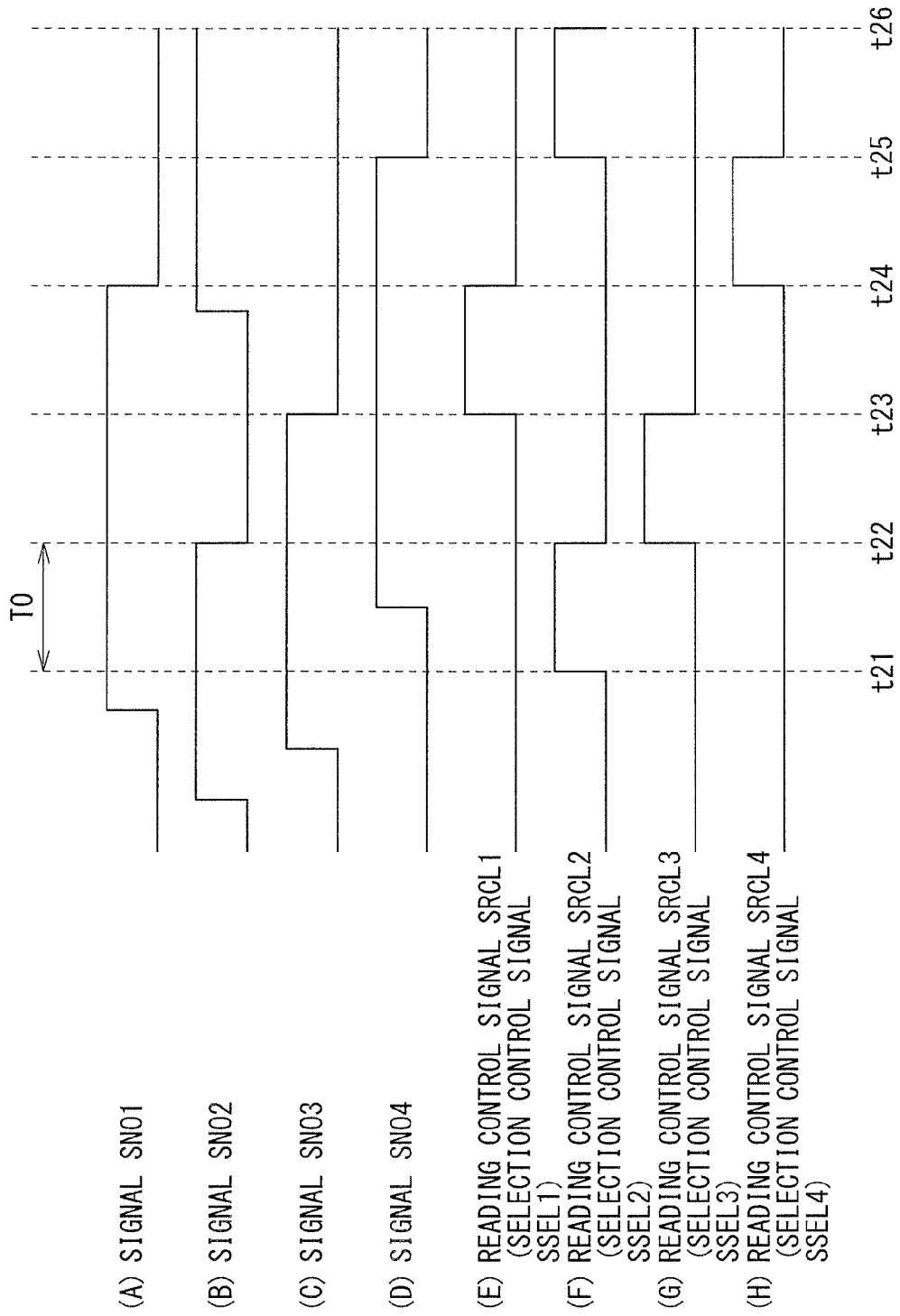

[FIG. 29]
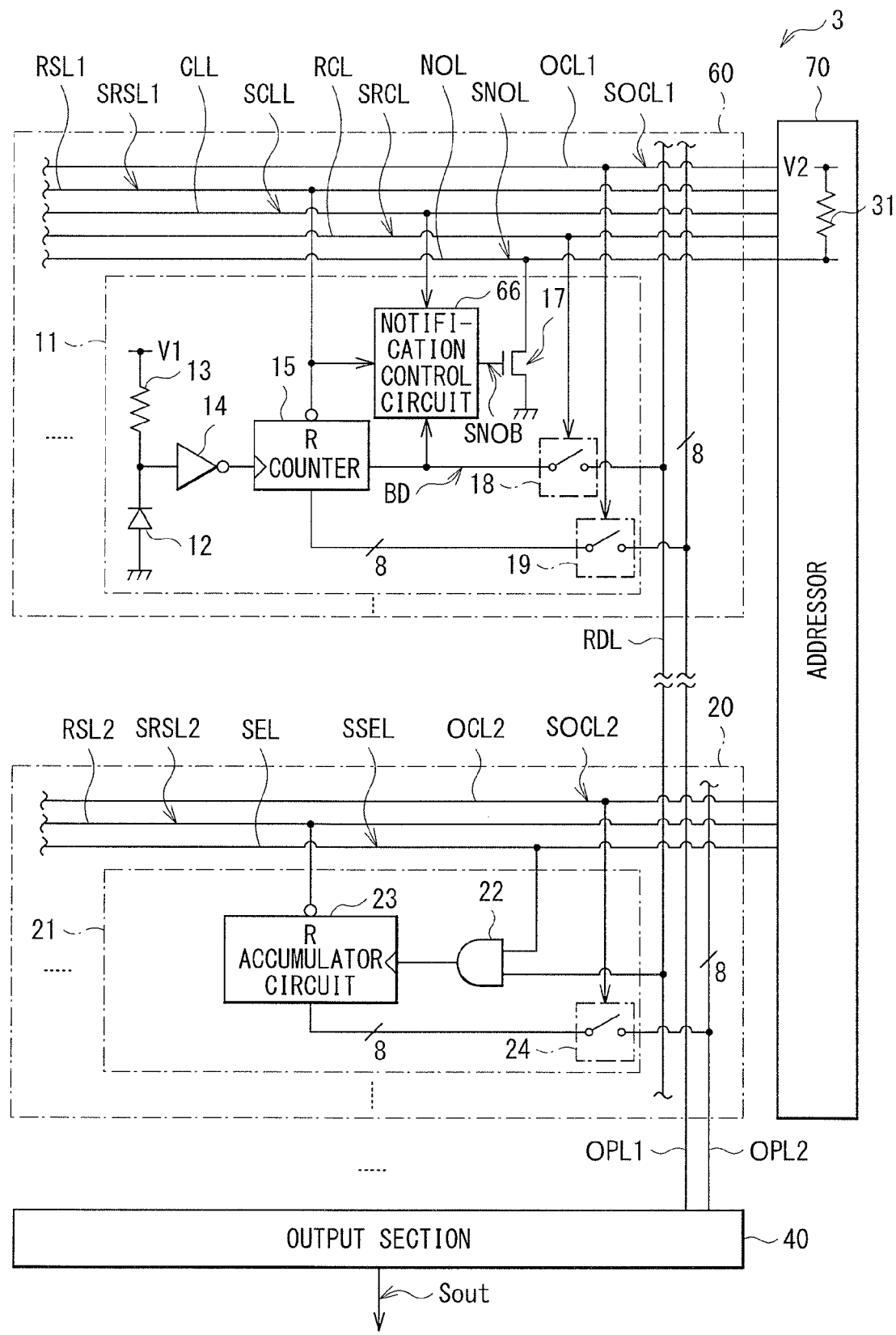

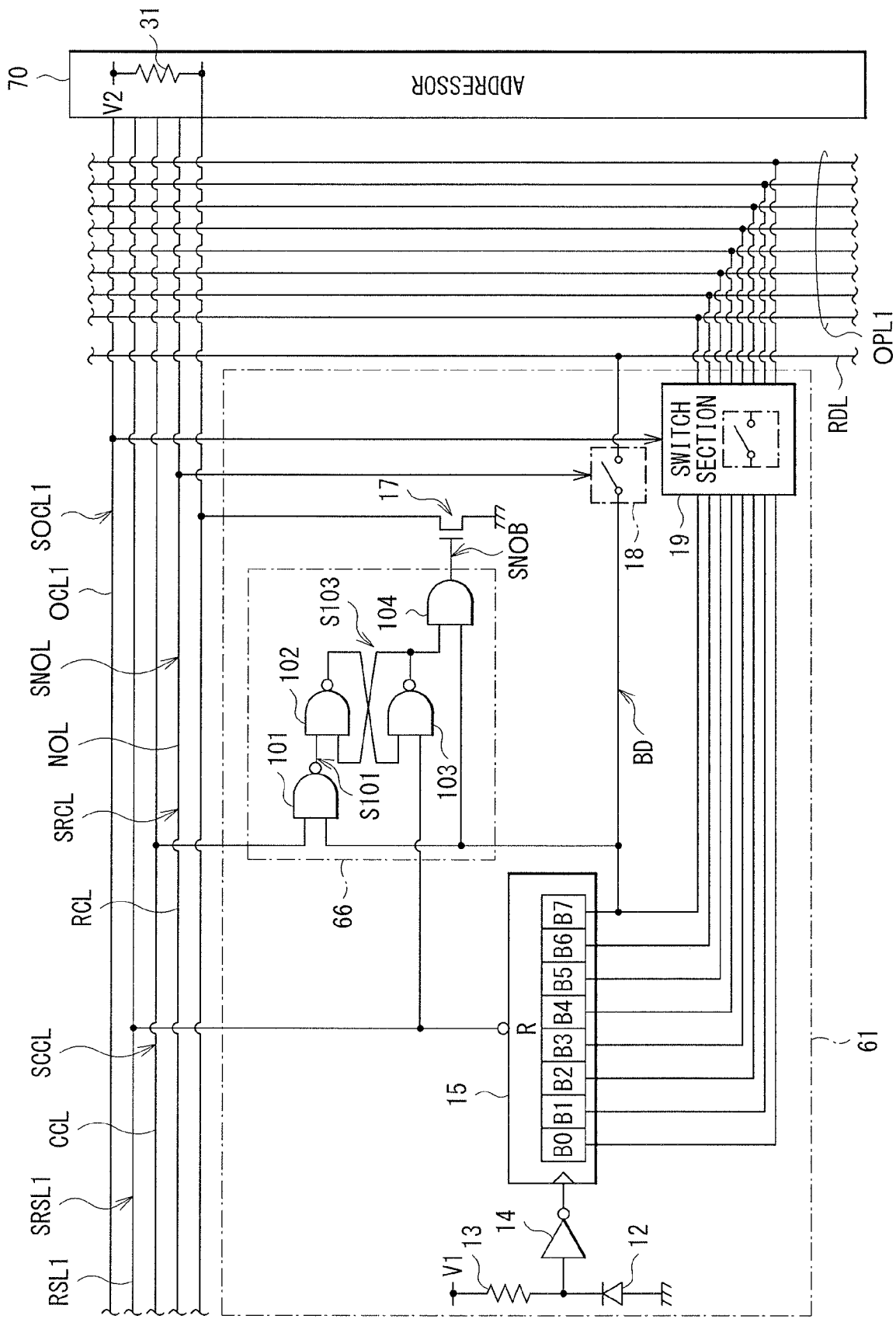
[ FIG. 30 ]

[ FIG. 31 ]
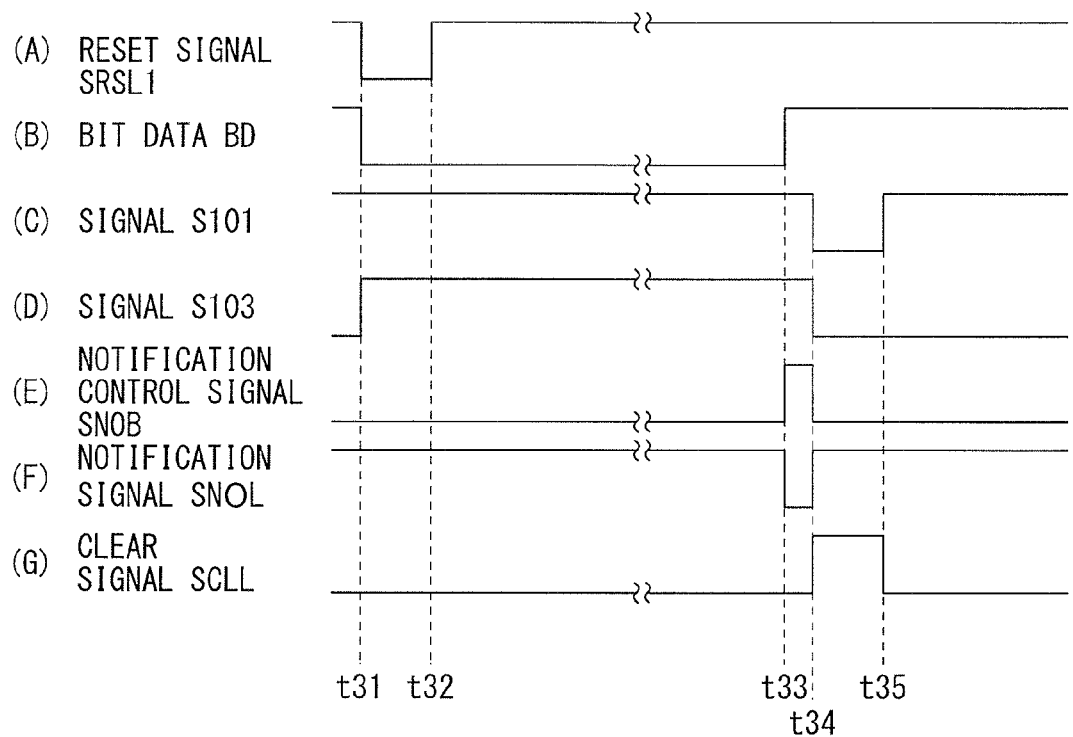

[ FIG. 32 ]
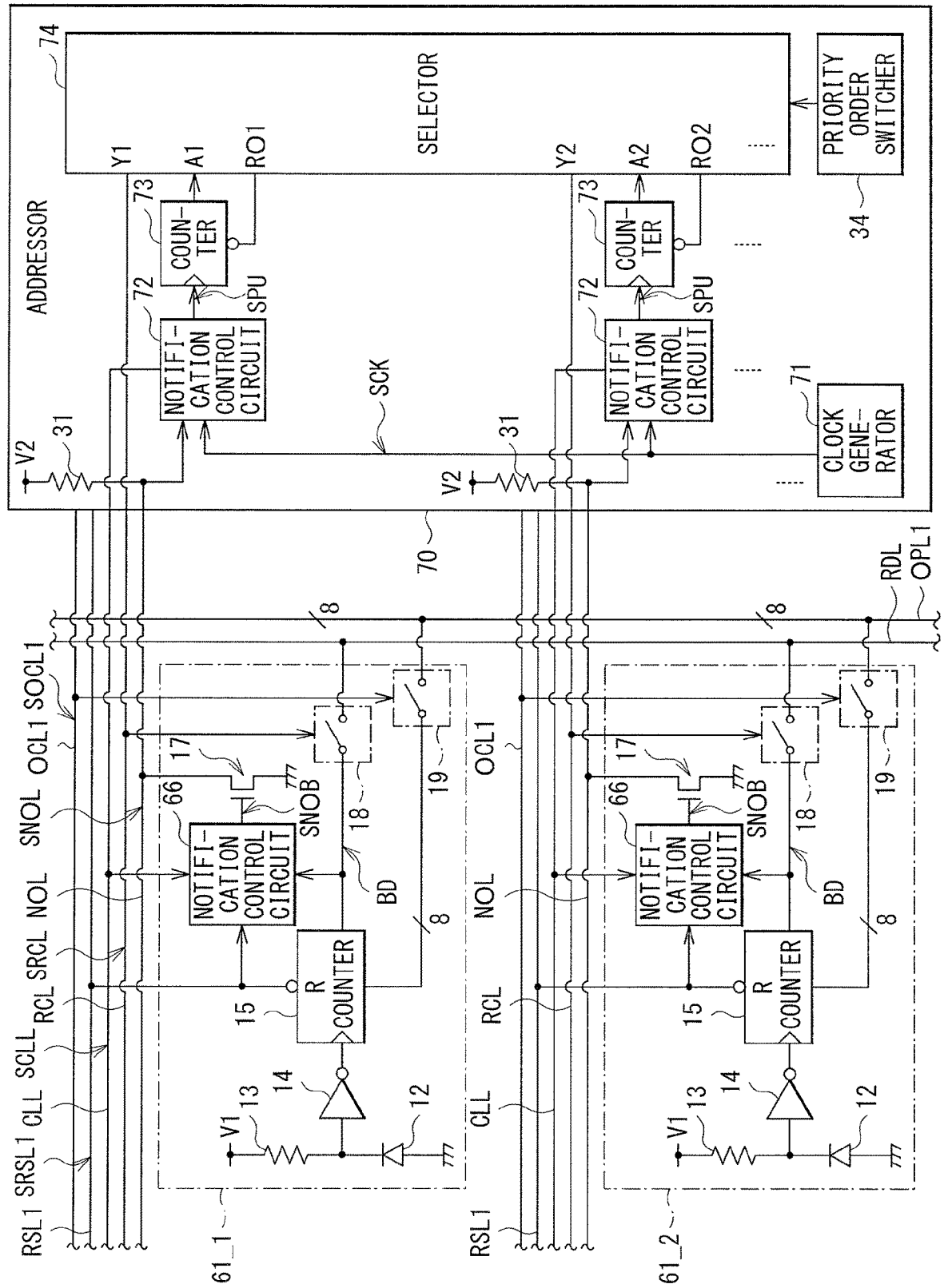

[ FIG.33 ]
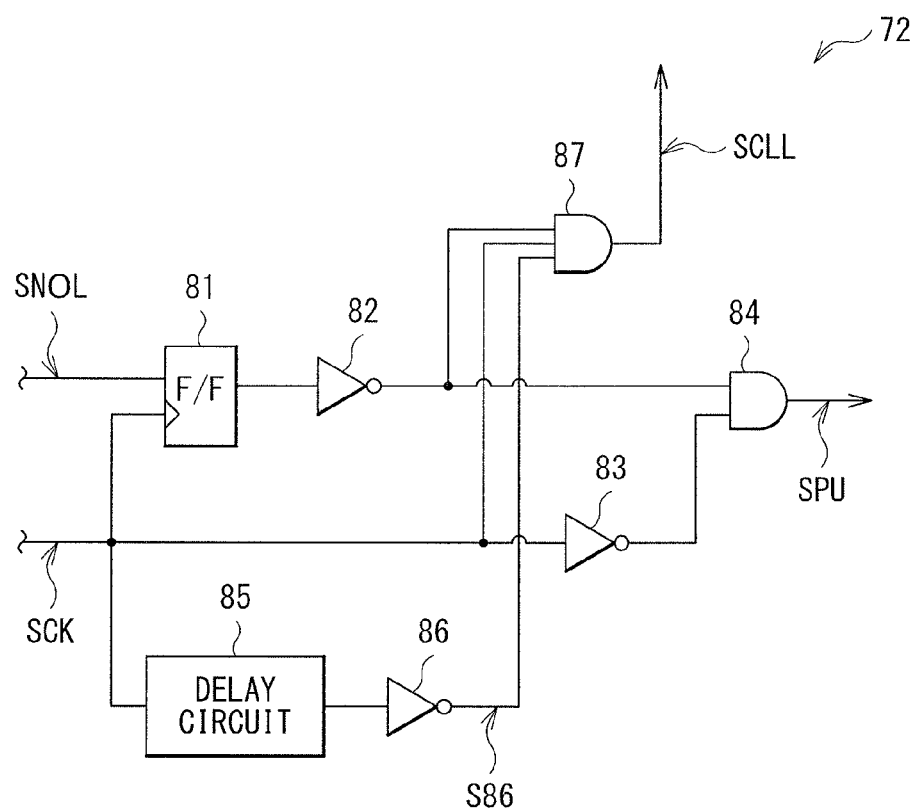

[FIG. 34]
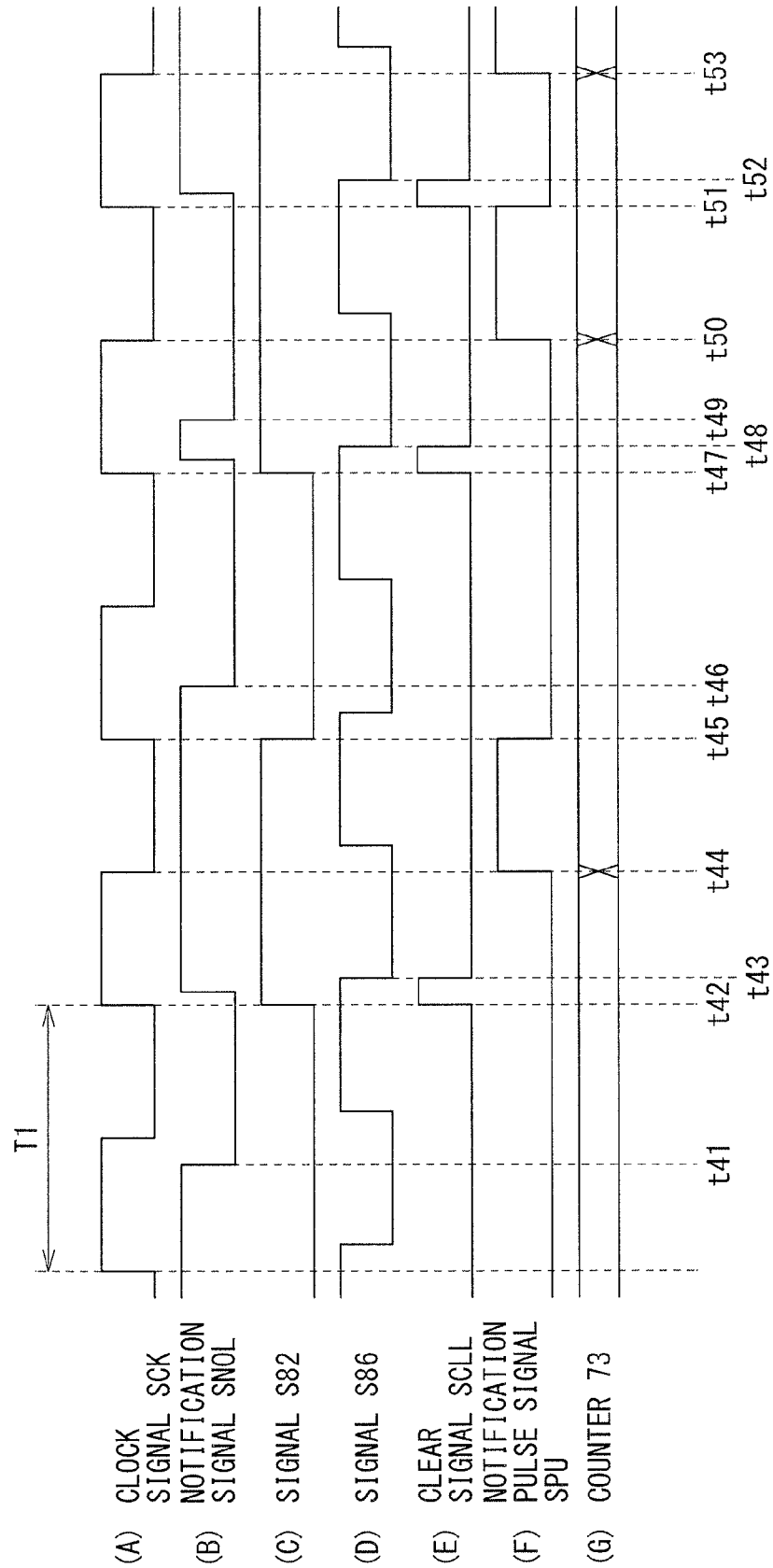

[ FIG. 35 ]
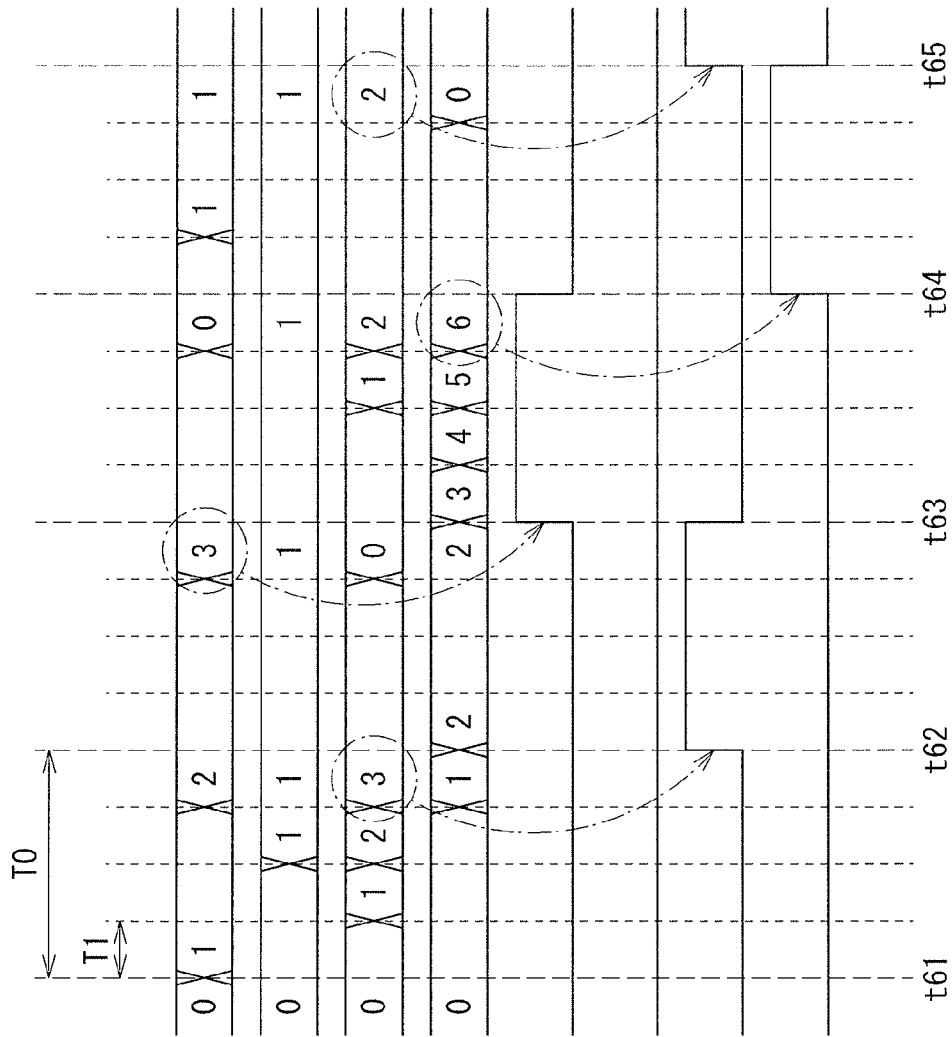

[FIG. 36]
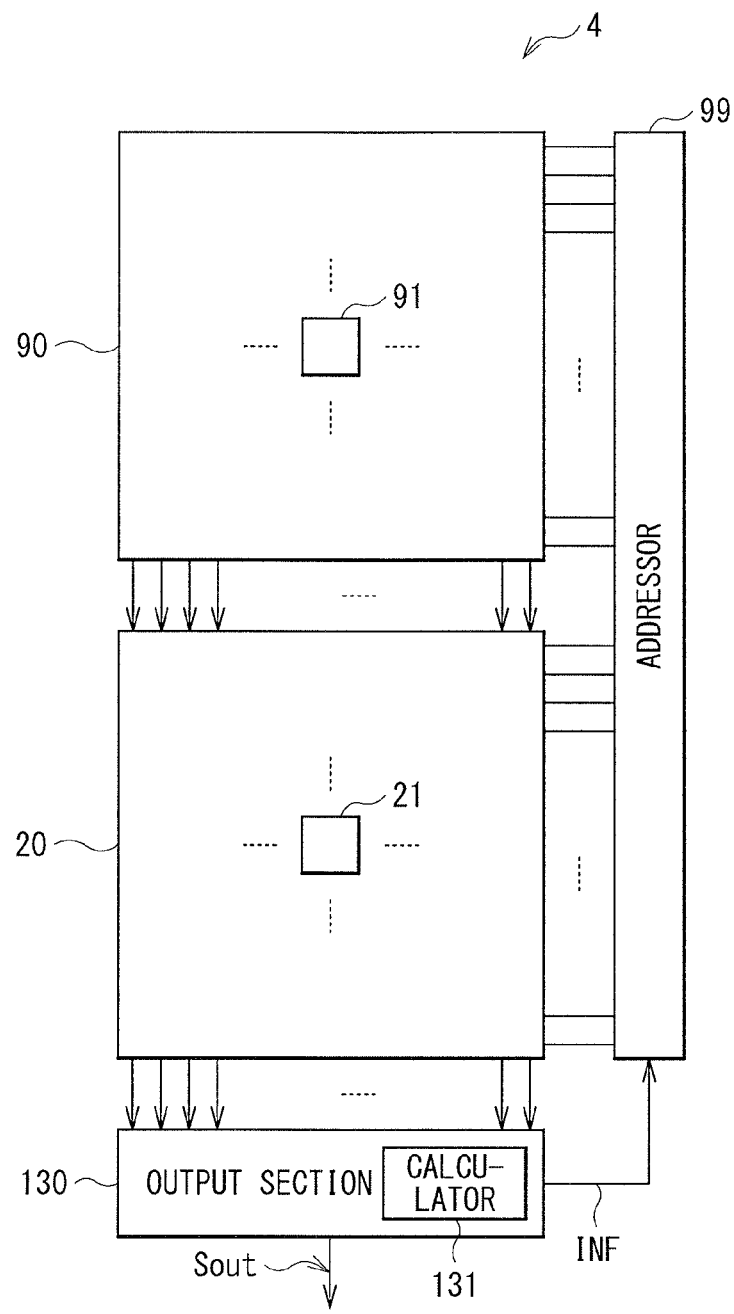

[ FIG. 37 ]
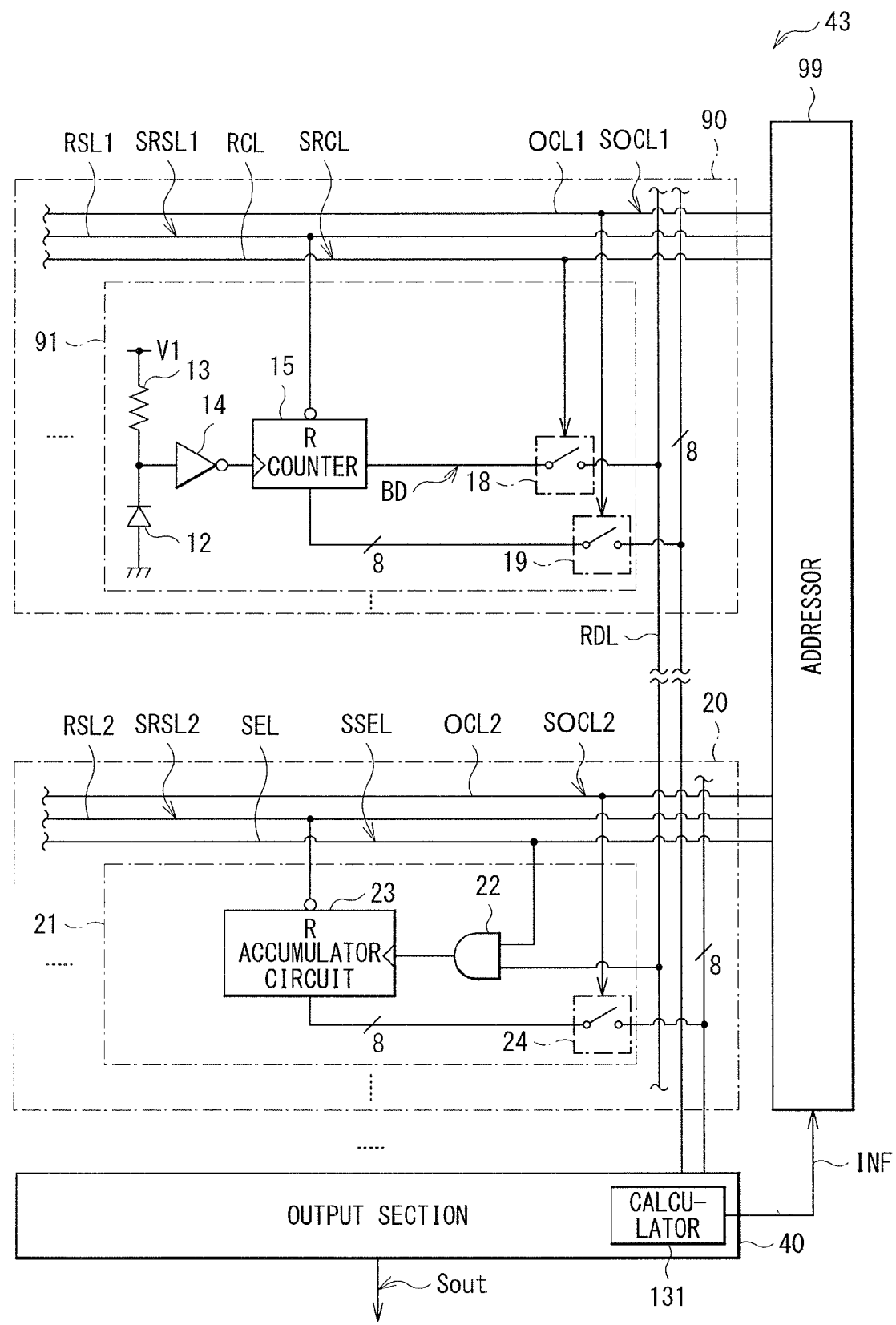

[ FIG. 38 ]
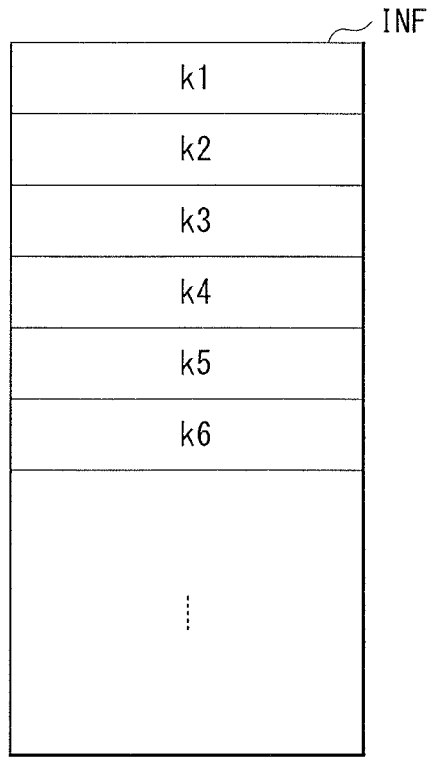
[ FIG. 39 ]
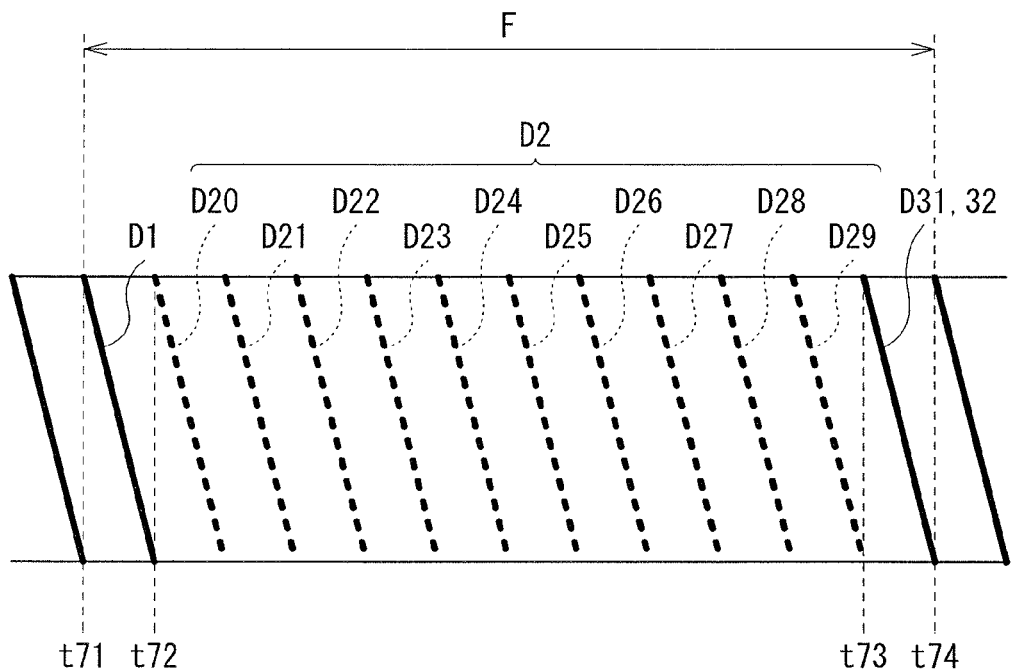

[ FIG. 40A ]
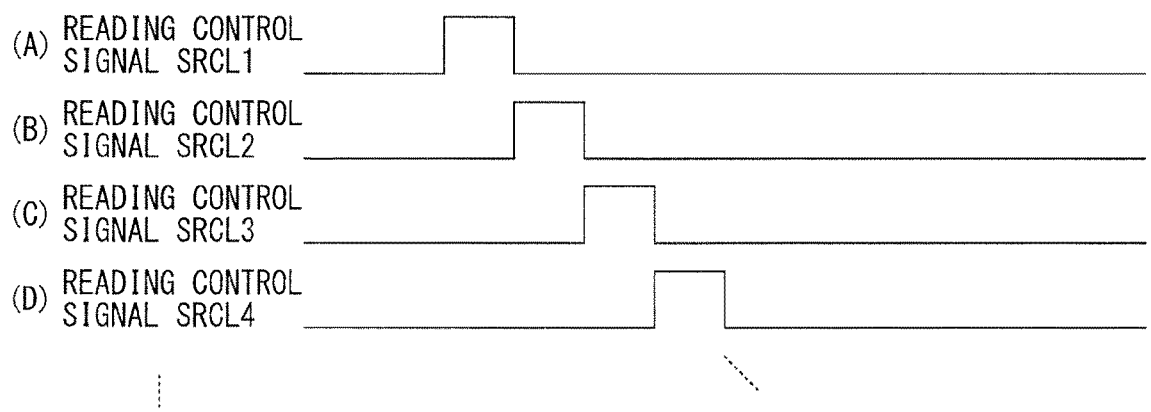
[ FIG. 40B ]
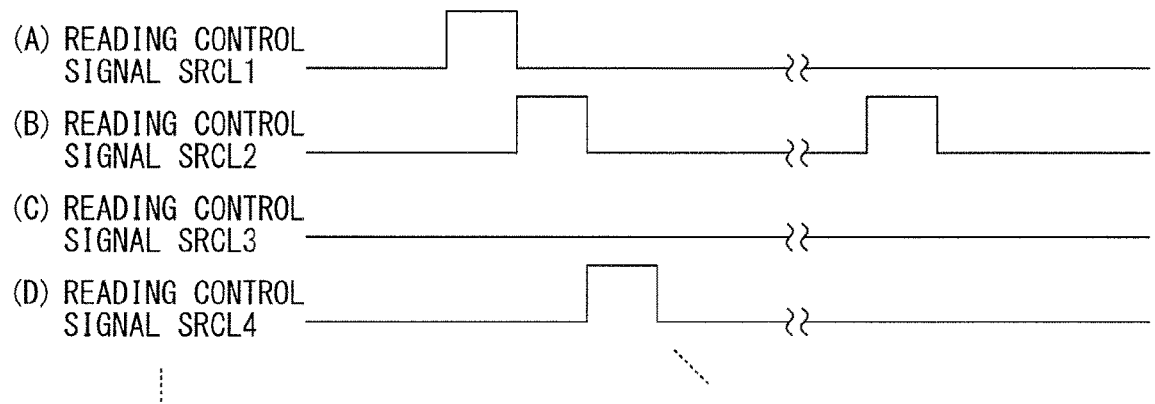

[FIG. 41]
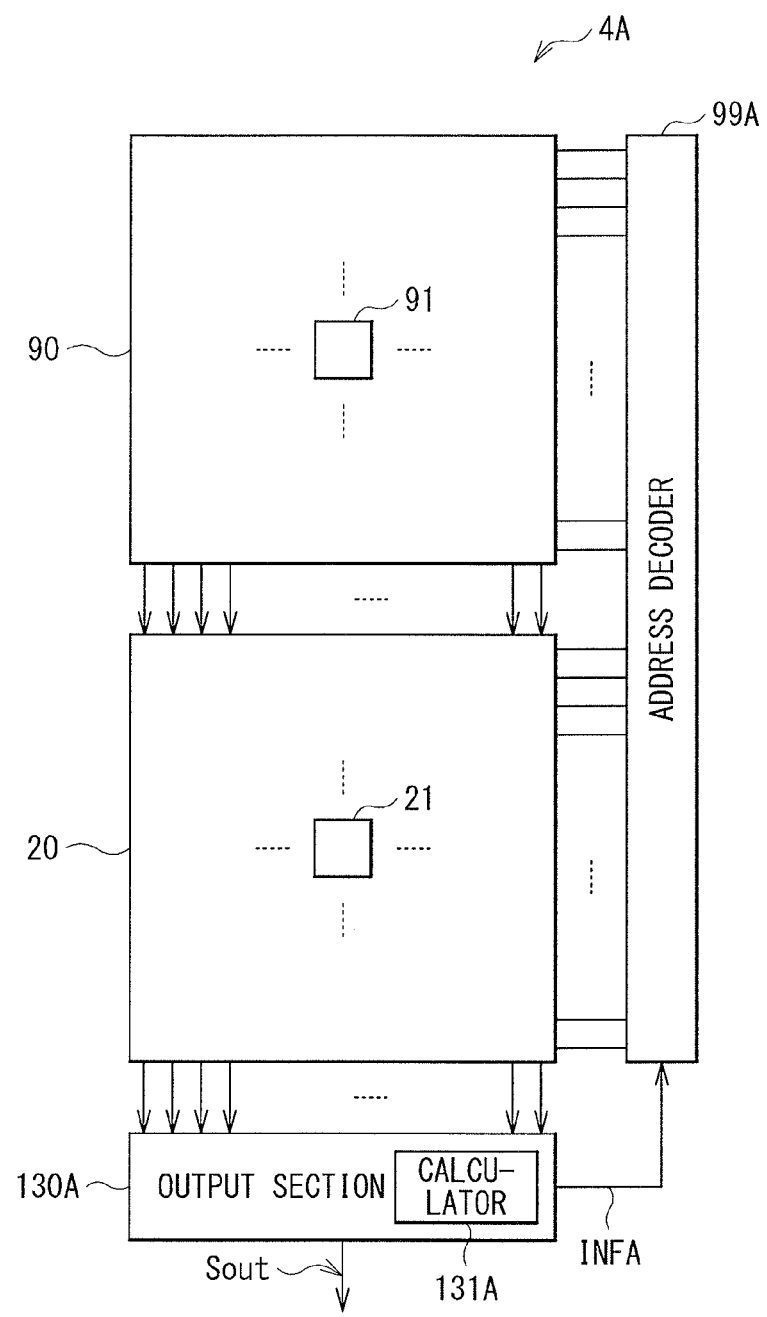

[ FIG. 42 ]
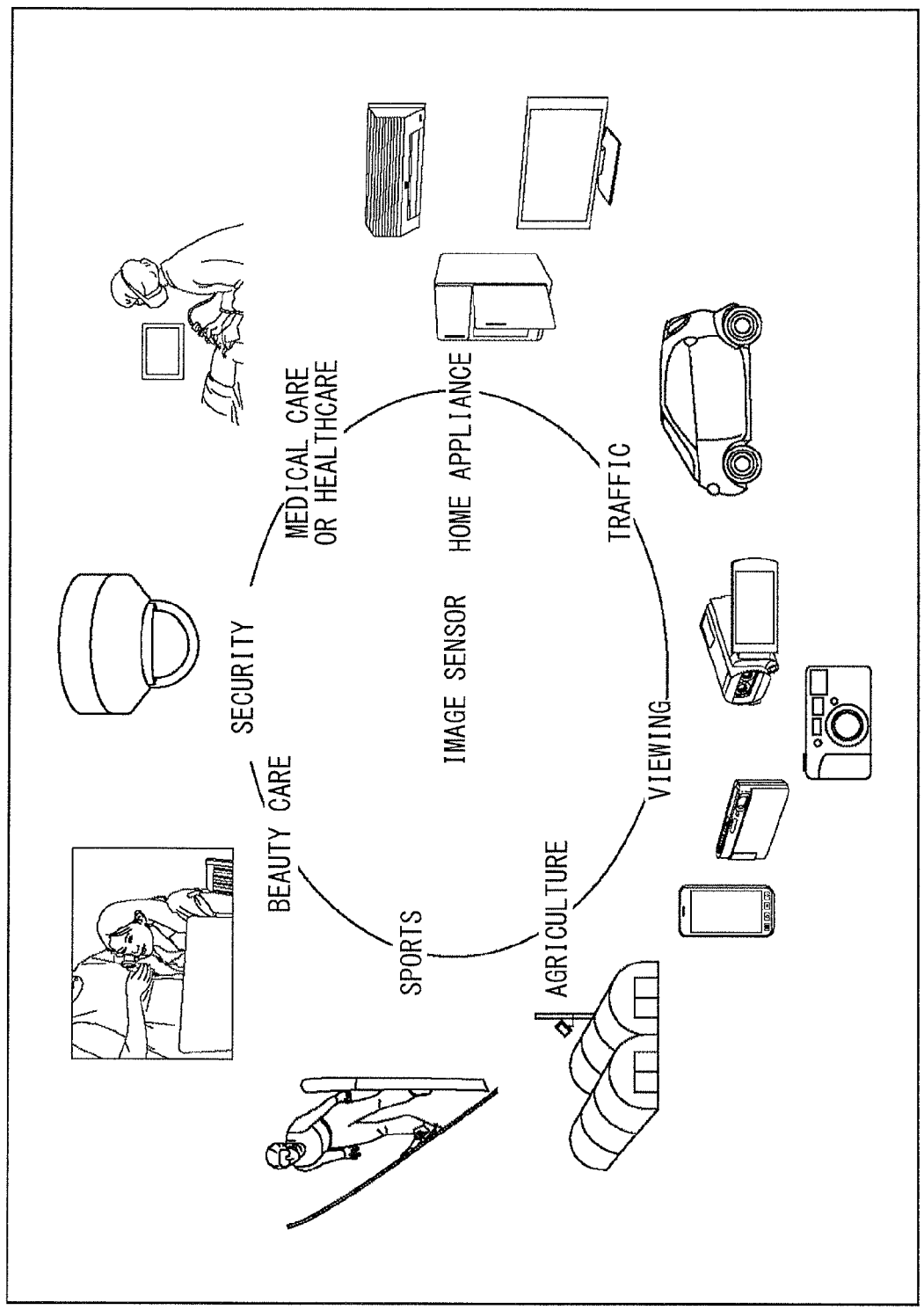

[ FIG. 43 ]
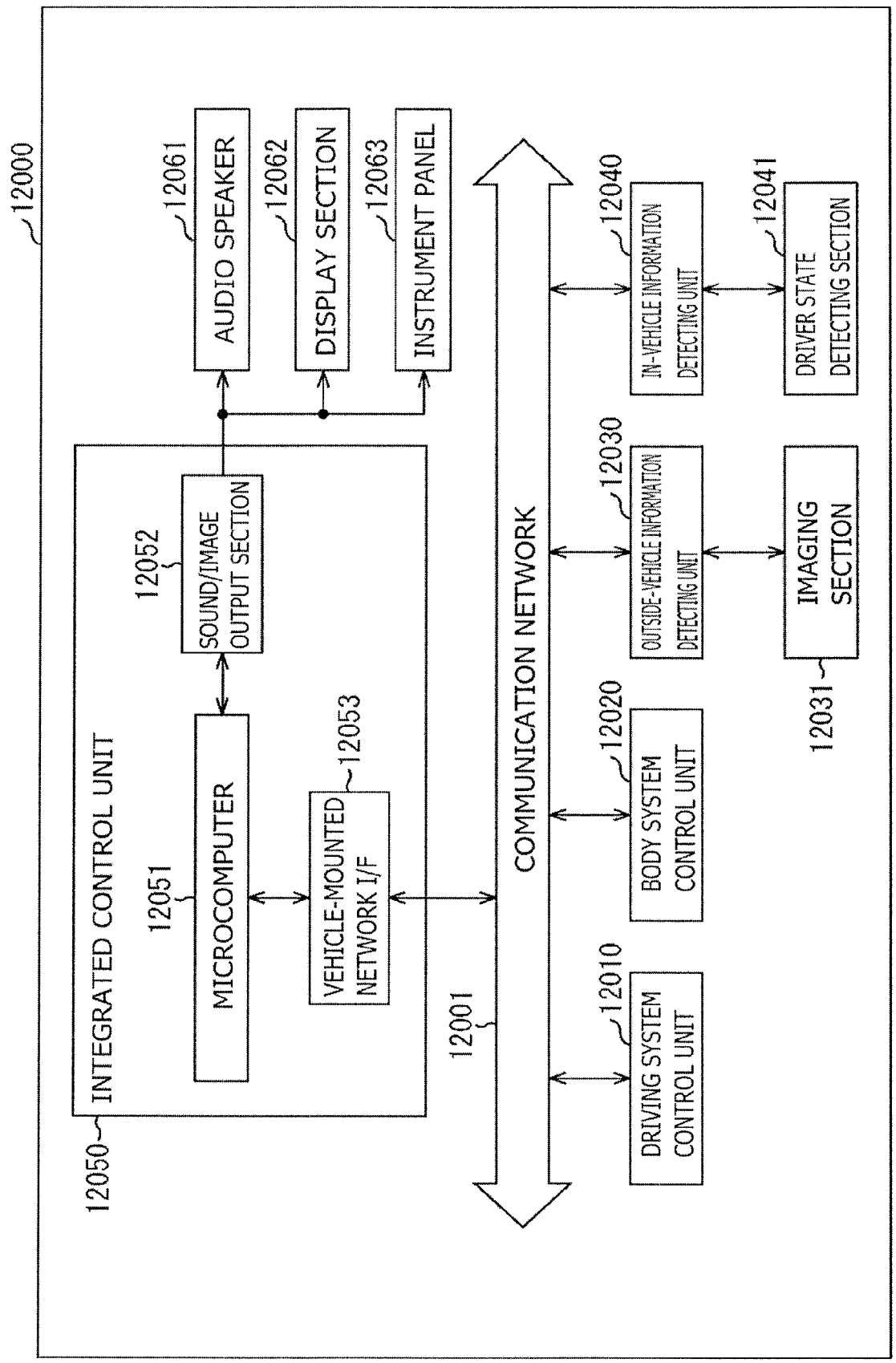

[ FIG. 44 ]
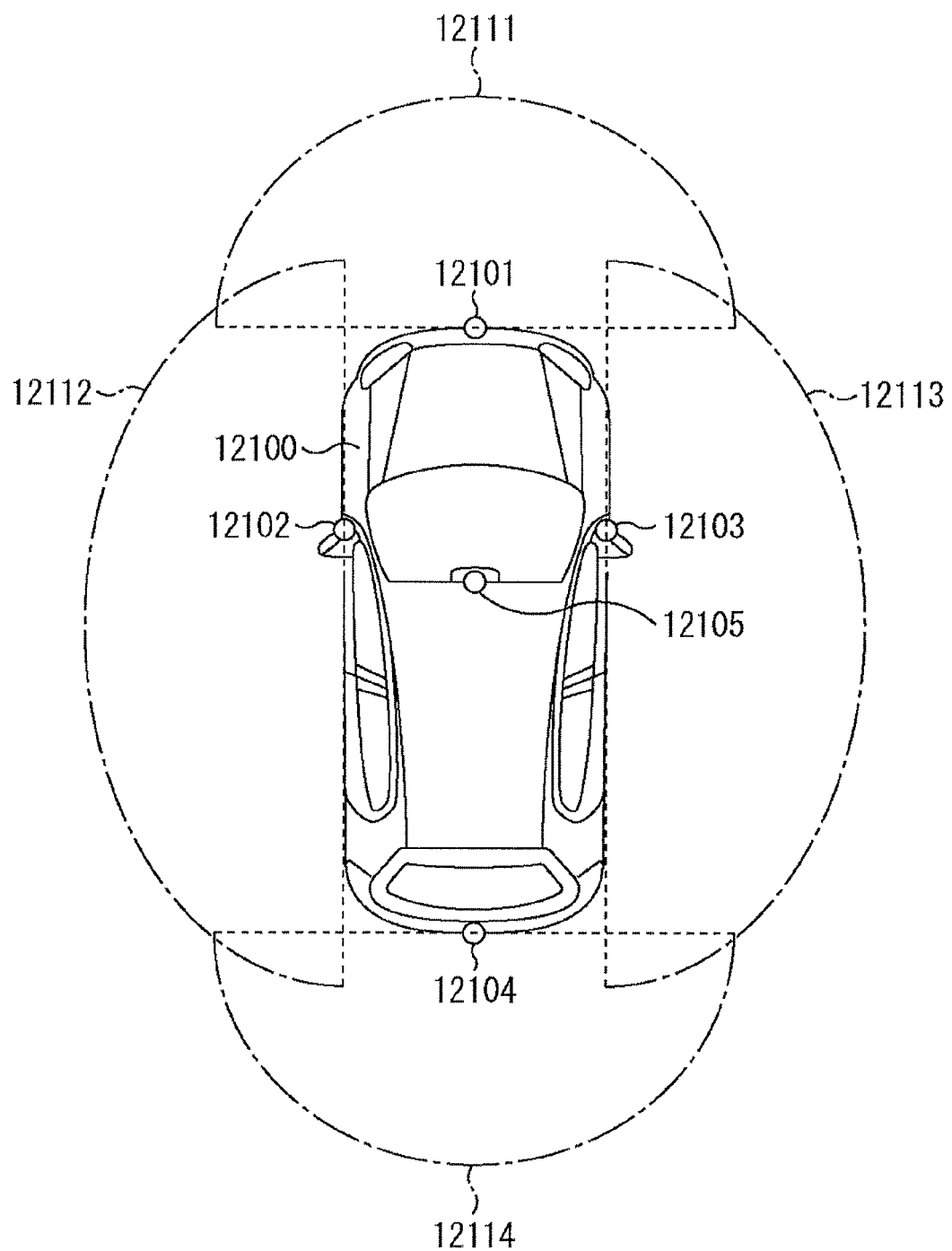

ual signal that is composed of a plurality of output signals that are successively outputted from the plurality of pixels 11 in the pixel array 10. The horizontal signal line 14 is driven as such, thereby outputting the output signal (the electric signal DOUT) outputted from each pixel 11 of the pixel array 10. However, this is not limitative.
IMAGING DEVICE AND IMAGING SYSTEM

TECHNICAL FIELD

The present disclosure relates to an imaging device that captures an image and an imaging system including such an imaging device.

BACKGROUND ART

Some imaging devices count the number of photons detected by each pixel and generate an image on the basis of a count result.

CITATION LIST

Patent Literature

PTL 1: U.S. Unexamined Patent Application Publication No. 2011/0235771

SUMMARY OF THE INVENTION

Such an imaging device is desired to timely aggregate the number of photons detected by a pixel.

It is desirable to provide an imaging device and an imaging system that are able to timely aggregate the number of photons detected by a pixel.

A first imaging device according to one embodiment of the present disclosure includes a pixel and a controller. The pixel includes a photoelectric converter configured to generate a signal in response to entering light, a storage configured to store data corresponding to the signal, and an output section configured to output the data stored in the storage. The controller is configured to control the output section to output the data in a case where the data stored in the storage satisfies a predetermined condition.

A second imaging device according to one embodiment of the present disclosure a pixel and a controller. The pixel includes a photoelectric converter configured to generate a signal in response to entering light, a storage configured to store data corresponding to the signal, and an output section configured to output the data stored in the storage. The controller is configured to control the output section to output the data stored in the storage on the basis of accumulated data obtained by an accumulating section configured to accumulate the data outputted from the pixel.

An imaging system according to one embodiment of the present disclosure includes a pixel, an accumulating section, and a controller. The pixel includes a photoelectric converter configured to generate a signal in response to entering light, a storage configured to store data corresponding to the signal, and an output section configured to output the data stored in the storage. The accumulating section is configured to accumulate the data outputted from the pixel. The controller is configured to control the output section to output the data in a case where the data stored in the storage satisfies a predetermined condition.

In the first imaging device and the imaging system according to one embodiment of the present disclosure, the photoelectric converter generates a signal in response to entering light and data corresponding to the signal is stored in the storage. Then, in a case where the data stored in the storage satisfies the predetermined condition, control is performed to output the data stored in the storage.

In the second imaging device according to one embodiment of the present disclosure, the photoelectric converter generates a signal in response to entering light and data corresponding to the signal is stored in the storage. Then, control is performed to output the data stored in the storage on the basis of accumulated data obtained by the accumulating section configured to accumulate the data outputted from the pixel.

In the first imaging device and the imaging system according to one embodiment of the present disclosure, in a case where the data stored in the storage satisfies the predetermined condition, the output section is controlled to output the data, thereby making it possible to timely aggregate the number of photons detected by the pixel.

In the second imaging device according to one embodiment of the present disclosure, the output section is controlled to output the data stored in the storage on the basis of accumulated data obtained by the accumulating section configured to accumulate the data outputted from the pixel, thereby making it possible to timely aggregate the number of photons detected by the pixel.

It is to be noted that the effects described herein are not necessarily limitative and any effect described in the present disclosure may be achieved.

BRIEF DESCRIPTION OF DRAWINGS

FIG. 1 is a block diagram that illustrates a configuration example of an imaging device according to an embodiment of the present disclosure.

FIG. 2 is a circuit diagram that illustrates a configuration example of the imaging device illustrated in FIG. 1.

FIG. 3 is a circuit diagram that illustrates a configuration example of a pixel array illustrated in FIG. 1.

FIG. 4 is a circuit diagram that illustrates a configuration example of a pixel illustrated in FIG. 2.

FIG. 5 is a circuit diagram that illustrates a configuration example of an accumulator array illustrated in FIG. 1.

FIG. 6 is a circuit diagram that illustrates a configuration example of an accumulator illustrated in FIG. 2.

FIG. 7 is a block diagram that illustrates a configuration example of an addresser illustrated in FIG. 2.

FIG. 8A is a table that illustrates an example of a priority order pattern.

FIG. 8B is a table that illustrates another example of the priority order pattern.

FIG. 8C is a table that illustrates another example of the priority order pattern.

FIG. 8D is a table that illustrates another example of the priority order pattern.

FIG. 9 is an explanatory diagram that illustrates an implementation example of the imaging device illustrated in FIG. 1.

FIG. 10A is another explanatory diagram that illustrates an implementation example of the imaging device illustrated in FIG. 1.

FIG. 10B is another explanatory diagram that illustrates an implementation example of the imaging device illustrated in FIG. 1.

FIG. 11 is a timing diagram that illustrates an operation example of the imaging device illustrated in FIG. 1.

FIG. 12 is a timing waveform diagram that illustrates an operation example of an imaging device according to a first embodiment.

FIG. 13 is an explanatory diagram that illustrates a coupling example of pixels according to the first embodiment.

FIG. 14 is an explanatory diagram that illustrates a coupling example of pixels according to a modification example of the first embodiment.

FIG. 15 is an explanatory diagram that illustrates a coupling example of pixels according to another modification example of the first embodiment.

FIG. 16 is an explanatory diagram that illustrates a coupling example of a counter according to the first embodiment.

FIG. 17 is an explanatory diagram that illustrates a coupling example of a counter according to a modification example of the first embodiment.

FIG. 18 is an explanatory diagram that illustrates a coupling example of a counter according to another modification example of the first embodiment.

FIG. 19 is a circuit diagram that illustrates a configuration example of a count value comparison circuit illustrated in FIG. 18.

FIG. 20 is a circuit diagram that illustrates a configuration example of an imaging device according to another modification example of the first embodiment.

FIG. 21 is a circuit diagram that illustrates a configuration example of an imaging device according to another modification example of the first embodiment.

FIG. 22 is a circuit diagram that illustrates a configuration example of an imaging device according to another modification example of the first embodiment.

FIG. 23 is a block diagram that illustrates a configuration example of an imaging device according to another modification example of the first embodiment.

FIG. 24 is a block diagram that illustrates a configuration example of an imaging device according to another modification example of the first embodiment.

FIG. 25 is an explanatory diagram that illustrates an example of a driving method for the imaging device according to the first embodiment.

FIG. 26 is an explanatory diagram that illustrates an example of a driving method for an imaging device according to another modification example of the first embodiment.

FIG. 27 is a block diagram that illustrates a configuration example of an addressor according to a second embodiment.

FIG. 28 is a timing waveform diagram that illustrates an operation example of an imaging device according to the second embodiment.

FIG. 29 is a circuit diagram that illustrates a configuration example of an imaging device according to a third embodiment.

FIG. 30 is a circuit diagram that illustrates a configuration example of a pixel illustrated in FIG. 29.

FIG. 31 is a timing waveform diagram that illustrates an operation example of a notification control circuit illustrated in FIG. 30.

FIG. 32 is a block diagram that illustrates a configuration example of an addressor illustrated in FIG. 29.

FIG. 33 is a circuit diagram that illustrates a configuration example of a clear signal generator illustrated in FIG. 32.

FIG. 34 is a timing waveform diagram that illustrates an operation example of the clear signal generator illustrated in FIG. 33.

FIG. 35 is a timing waveform diagram that illustrates an operation example of the imaging device according to the third embodiment.

FIG. 36 is a block diagram that illustrates a configuration example of an imaging device according to a fourth embodiment.

FIG. 37 is a circuit diagram that illustrates a configuration example of the imaging device illustrated in FIG. 36.

FIG. 38 is an explanatory diagram that illustrates a configuration example of weight information illustrated in FIG. 36.

FIG. 39 is a timing diagram that illustrates an operation example of the imaging device according to the fourth embodiment.

FIG. 40A is a timing waveform diagram that illustrates an example of a reading drive in the imaging device according to the fourth embodiment.

FIG. 40B is a timing waveform diagram that illustrates another example of the reading drive in the imaging device according to the fourth embodiment.

FIG. 41 is a block diagram that illustrates a configuration example of an imaging device according to a modification example of the fourth embodiment.

FIG. 42 is an explanatory diagram that illustrates use examples of the imaging device.

FIG. 43 is a block diagram depicting an example of schematic configuration of a vehicle control system.

FIG. 44 is a diagram of assistance in explaining an example of installation positions of an outside-vehicle information detecting section and an imaging section.

MODES FOR CARRYING OUT THE INVENTION

Embodiments of the present disclosure are described in detail hereinbelow with reference to the drawings. It is to be noted that description is made in the following order.
1. First Embodiment
2. Second Embodiment
3. Third Embodiment
4. Fourth Embodiment
5. Use Examples of Imaging Device
6. Example of Application to Mobile Body 1. First Embodiment Configuration Example FIGS. 1 and 2 illustrate a configuration example of an imaging device (imaging device 1) according to a first embodiment. The imaging device 1 performs an imaging operation by counting the number of photons detected by a pixel. The imaging device 1 includes a pixel array 10, an accumulator array 20, an addressor 30, and an output section 40.

The pixel array 10 includes a plurality of pixels 11 arranged in matrix.

FIG. 3 illustrates a configuration example of the pixel array 10. In this FIG. 3, four (=2×2) pixels 11 among the plurality of pixels 11 of the pixel array 10 are illustrated. The pixel array 10 includes a plurality of reset lines RSL1, a plurality of reading control lines RCL, a plurality of notification lines NOL, a plurality of output control lines OCL1, a plurality of reading lines RDL, and a plurality of output lines OPL1. Each of the plurality of reset lines RSL1, which extends in a lateral direction in FIGS. 2 and 3, has one end coupled to the addressor 30 as illustrated in FIG. 2. The addressor 30 applies a reset signal SRSL1 to each of these reset lines RSL1. Each of the plurality of reading control lines RCL, which extends in the lateral direction in FIGS. 2 and 3, has one end coupled to the addressor 30 as illustrated in FIG. 2. The addressor 30 applies a reading control signal SRCL to each of these reading control lines RCL. Each of the plurality of notification lines NOL, which extends in the lateral direction in FIGS. 2 and 3, has one end coupled to the addressor 30 as illustrated in FIG. 2. Each of the plurality of output control lines OCL1, which extends in the lateral direction in FIGS. 2 and 3, has one end coupled to the addressor 30 as illustrated in FIG. 2. The addressor 30 applies an output control signal SOCL1 to each of these output control lines OCL1. Each of the plurality of reading lines RDL, which extends in a longitudinal direction in FIGS. 2 and 3, is arranged across this pixel array 10 and the accumulator array 20 as illustrated in FIG. 2. Each of the plurality of output lines OPL1, which extends in the longitudinal direction in FIGS. 2 and 3, has one end coupled to the output section 40. One row of the plurality of pixels 11 arranged side by side in the lateral direction in FIG. 3 constitutes a pixel line LP.

FIG. 4 illustrates a configuration example of each of the pixels 11. The pixel 11 includes a light-receiving element 12, a resistor 13, an inverter 14, a counter 15, a notification control circuit 16, a transistor 17, a switch 18, and a switch section 19.

The light-receiving element 12, which is a photoelectric transducer that detects light (photon), includes a single photon avalanche diode (SPAD), for example. An anode of the light-receiving element 12 is grounded and a cathode is coupled to the other end of the resistor 13 and an input terminal of the inverter 14. One end of the resistor 13 is applied with a predetermined voltage V1 and the other end is coupled to the cathode of the light-receiving element 12 and the input terminal of the inverter 14. A voltage of the cathode of the light-receiving element 12, which is usually the voltage V1, transiently decreases from the voltage V1 every time when the light-receiving element 12 detects a photon.

The inverter 14 inverts a voltage at the input terminal and outputs the inverted voltage through an output terminal. The input terminal of the inverter 14 is coupled to the cathode of the light-receiving element 12 and the other end of the resistor 13, and the output terminal is coupled to an input terminal of the counter 15. Every time when the light-receiving element 12 detects a photon, the inverter 14 outputs a pulse corresponding to the photon.

The counter 15 performs a counting operation to count the number of pulses supplied from the inverter 14. The counter 15 is an 8-bit counter in this example. A bit B0 is an LSB (Least Significant Bit) and a bit B7 is an MSB (Most Significant Bit). The counter 15 performs the counting operation on the basis of the pulses supplied from the inverter 14 and stores a count value corresponding to the number of photons detected by the light-receiving element 12. In addition, the counter 15 resets the count value on the basis of the reset signal SRSL1 applied to the reset line RSL1. Specifically, the counter 15 resets the count value when the reset signal SRSL1 is at a low level in this example. In addition, the counter 15 supplies data of the bit B7 to the notification control circuit 16 and the switch 18 as bit data BD and supplies stored data for 8 bits (bits B7 to B0) to the switch section 19.

The notification control circuit 16 generates a notification control signal SNOB on the basis of the bit data BD and the reading control signal SRCL applied to the reading control line RCL. Specifically, the notification control circuit 16 sets the notification control signal SNOB at a high level in response to a change in a signal indicated by the bit data BD from a low level to the high level and sets the notification control signal SNOB at the low level in response to a change in the reading control signal SRCL from the high level to the low level.

The transistor 17, which is an N-channel MOS (Metal Oxide Semiconductor) transistor, has a gate that is applied with the notification control signal SNOB, a drain that is coupled to the notification line NOL, and a source that is grounded. The notification line NOL is pulled up by a resistor 31 (described later) of the addressor 30 in this example as illustrated in FIGS. 2 and 4. This configuration causes the transistor 17 to operate as a so-called open-drain output circuit. The transistor 17 is turned on, thereby causing a voltage of the notification line NOL to be at the low level. The pixel 11 thus supplies a notification signal SNOL to the addressor 30 through the notification line NOL.

The switch 18, which is a switch to be turned on and off on the basis of the reading control signal SRCL applied to the reading control line RCL, couples the pixel 11 to the reading line RDL when turned on. In this example, the switch 18 is turned on when the reading control signal SRCL is at the high level, causing the pixel 11 to output the bit data BD to the reading line RDL. The pixel 11 thus supplies this bit data BD to an accumulator 21 (described later) corresponding to this pixel 11 in the accumulator array 20 through the reading line RDL.

The switch section 19, which is a switch to be turned on and off on the basis of the output control signal SOCL1 applied to the output control line OCL1, couples the pixel 11 to the output line OPL1 when turned on. In this example, the switch section 19 is turned on when the output control signal SOCL1 is at the high level, causing the pixel 11 to output the data for 8 bits (bits B7 to B0) in the counter 15 to the output line OPL1. The pixel 11 thus supplies the data for 8 bits to the output section 40 through the output line OPL1.

In each of the pixels 11 in the pixel array 10, this configuration causes the light-receiving element 12 to detect a photon and the counter 15 to count the number of photons detected by the light-receiving element 12. Then, in response to a signal indicated by the data (bit data BD) of the bit B7 in the counter 15 becoming the high level, the notification control circuit 16 sets the notification control signal SNOB at the high level, turning on the transistor 17. This sets the voltage (notification signal SNOL) of the notification line NOL at the low level (active). The pixel 11 thus provides a notification (detection notification) indicating that the photon has been detected by supplying the notification signal SNOL to the addressor 30. In response to the reading control signal SRCL becoming the high level on the basis of this detection notification, the switch 18 is turned on. This causes this pixel 11 to supply the bit data BD through the reading line RDL to the accumulator 21 (described later) corresponding to this pixel 11 in the accumulator array 20. Afterwards, in response to the reading control signal SRCL becoming the low level, the notification control circuit 16 sets the notification control signal SNOB at the low level, turning off the transistor 17. This sets the voltage (notification signal SNOL) of the notification line NOL at the high level (non-active), causing the pixel 11 to withdraw the detection notification. Then, in response to the output control signal SOCL1 becoming the high level after the elapse of an exposure period, the switch section 19 is turned on. This causes this pixel 11 to supply the data for 8 bits (bits B7 to B0) in the counter 15 through the output line OPL1 to the output section 40.

The accumulator array 20 (FIGS. 1 and 2) includes a plurality of accumulators 21 arranged in matrix. The plurality of accumulators 21 in the accumulator array 20 corresponds to the plurality of pixels 11 in the pixel array 10. That is, for example, the plurality of accumulators 21 in a first row in the accumulator array 20 corresponds to the respective plurality of pixels 11 in a first row in the pixel array 10. The same applies to second and subsequent rows. The plurality of accumulators 21 in a first column in the accumulator array 20 corresponds to the respective plurality of pixels 11 in a first column in the pixel array 10. The same applies to second and subsequent columns.

FIG. 5 illustrates a configuration example of the accumulator array 20. In this FIG. 5, four (=2×2) of the accumulators 21 in the accumulator array 20 are illustrated. The accumulator array 20 includes a plurality of reset lines RSL2, a plurality of selection control lines SEL, a plurality of output control lines OCL2, a plurality of reading lines RDL, and a plurality of output lines OPL2. Each of the plurality of reset lines RSL2, which extends in a lateral direction in FIGS. 2 and 5, has one end coupled to the addresser 30 as illustrated in FIG. 2. The addresser 30 applies a reset signal SRSL2 to each of these reset lines RSL2. Each of the plurality of selection control lines SEL, which extends in the lateral direction in FIGS. 2 and 5, has one end coupled to the addresser 30 as illustrated in FIG. 2. The addresser 30 applies a selection control signal SSEL to each of the selection control lines SEL. Each of the plurality of output control lines OCL2, which extends in the lateral direction in FIGS. 2 and 5, has one end coupled to the addresser 30 as illustrated in FIG. 2. The addresser 30 applies an output control signal SOCL2 to each of these output control lines OCL2. Each of the plurality of reading lines RDL, which extends in a longitudinal direction in FIGS. 2 and 5, is arranged across the accumulator array 20 and the pixel array 10 as illustrated in FIG. 2. Each of the plurality of output lines OPL2, which extends in the longitudinal direction in FIGS. 2 and 5, has one end coupled to the output section 40. A row of the plurality of accumulators 21 arranged side by side in the lateral direction in FIG. 5 constitutes an accumulator line LA.

FIG. 6 illustrates a configuration example of each of the accumulators 21. The accumulator 21 includes an AND circuit 22, an accumulator circuit 23, and a switch section 24.

The AND circuit 22 obtains a logical multiplication (AND) of the selection control signal SSEL applied to the selection control line SEL and a signal in the reading line RDL. This configuration causes the AND circuit 22 to supply the signal in the reading line RDL to the accumulator circuit 23 when the selection control signal SSEL is at the high level.

In the imaging device 1, in response to the reading control signal SRCL related to one of the pixels 11 in the pixel array 10 becoming the high level, the selection control signal SSEL related to the accumulator 21 corresponding to this pixel 11 in the accumulators 21 becomes the high level. This causes the bit data BD outputted from the pixel 11 to be supplied through the reading line RDL to the accumulator 21 corresponding to this pixel 11. In the accumulator 21, the AND circuit 22 supplies this bit data BD supplied from the corresponding pixel 11 to the accumulator circuit 23.

The accumulator circuit 23 performs an accumulating operation on the basis of the signal (bit data BD) supplied from the AND circuit 22. The accumulator circuit 23 includes an 8-bit counter in this example. A bit B8 corresponds to an LSB and a bit B15 corresponds to an MSB. This configuration causes the accumulator circuit 23 to perform the accumulating operation on the basis of the bit data BD supplied through the reading line RDL from the pixel 11 corresponding to this accumulator 21 in the pixel array 10 and stores a result of the accumulating operation, i.e., count value. The data for 8 bits (bits B15 to B8) stored in the accumulator circuit 23 thus serves as higher-order bit data for the data for 8 bits (bits B7 to B0) stored in the counter 15 of the pixel 11 corresponding to this accumulator 21 in the pixel array 10. In other words, the counter 15 of the pixel 11 and the accumulator circuit 23 of the accumulator 21 corresponding to this pixel 11 constitute a 16-bit counter. In addition, the accumulator circuit 23 resets the count value on the basis of the reset signal SRSL2 applied to the reset line RSL2. Specifically, the accumulator circuit 23 resets the count value when the reset signal SRSL2 is at the low level. In addition, the accumulator circuit 23 supplies the stored data for 8 bits (bits B15 to B8) to the switch section 24.

The switch section 24, which is a switch to be turned on and off on the basis of the output control signal SOCL2 applied to the output control line OCL2, couples the accumulator 21 to the output line OPL2 when turned on. In this example, the switch section 24 is turned on when the output control signal SOCL2 is at the high level, causing the accumulator 21 to output the data for 8 bits (bits B15 to B8) in the accumulator circuit 23 to the output line OPL2. The accumulator 21 thus supplies the data for 8 bits through the output line OPL2 to the output section 40.

In each of the accumulators 21 in the accumulator array 20, this configuration causes the AND circuit 22 to supply the bit data BD, which has been supplied through the reading line RDL from the pixel 11 corresponding to the accumulator 21, to the accumulator circuit 23 in response to the selection control line SEL becoming the high level. The accumulator circuit 23 then performs the accumulating operation on the basis of this bit data BD, thereby aggregating the number of the photons detected by the pixel 11. Then, in response to the output control signal SOCL2 becoming the high level after the elapse of the exposure period, the switch section 24 is turned on. The accumulator 21 thus supplies the data for 8 bits (bits B15 to B8) in the accumulator circuit 23 through the output line OPL2 to the output section 40.

The addresser 30 (FIGS. 1 and 2) drives the pixel array 10 and the accumulator array 20. Specifically, the addresser 30 drives the pixel array 10 per unit of pixel line LP by applying a plurality of reset signals SRSL1 to the respective plurality of reset lines RSL1 in the pixel array 10, applying a plurality of reading control signals SRCL to the respective plurality of reading control lines RCL, and applying a plurality of output control signals SOCL1 to the respective plurality of output control lines OCL1. Meanwhile, the addresser 30 drives the accumulator array 20 per unit of accumulator line LA by applying a plurality of reset signals SRSL2 to the respective plurality of reset lines RSL2 in the accumulator array 20, applying a plurality of selection control signals SSEL to the respective plurality of selection control lines SEL, and applying a plurality of output control signals SOCL2 to the respective plurality of output control lines OCL2.

In addition, the addresser 30 generates the plurality of reading control signals SRCL on the basis of a plurality of notification signals SNOL in the plurality of notification lines NOL in the pixel array 10.

FIG. 7 illustrates a configuration example of the addresser 30. It is to be noted that one of the pixels 11 (pixel 11_1) in the first row and one of the pixels 11 (pixel 11_2) in the second row in the pixel array 10 are drawn in this FIG. 7 in addition to the addresser 30 for convenience of explanation. The addresser 30 includes a plurality of resistors 31, a plurality of inverters 32, a selector 33, and a priority order switcher 34.

Each of the plurality of resistors 31 is a so-called pull-up resistor that pulls up the notification line NOL. The plurality of resistors 31 corresponds to the respective plurality of notification lines NOL in the pixel array 10. One end of each of the resistors 31 is supplied with a high-level voltage V2 and the other end is coupled to the corresponding notification line NOL.

Each of the plurality of inverters 32 inverts the notification signal SNOL supplied through the notification line NOL and outputs the inverted signal as a signal SNO. The plurality of inverters 32 corresponds to the respective plurality of notification lines NOL in the pixel array 10. An input terminal of each of the inverters 32 is coupled to the corresponding notification line NOL and an output terminal is coupled to the selector 33.

The selector 33 determines, on the basis of the signals SNO outputted from the plurality of inverters 32, a selection order (reading order) of the pixel lines LP for reading the bit data BD from the plurality of pixels 11 in the pixel array 10 and supplying the bit data BD to the accumulator array 20, and generates the plurality of reading control signals SRCL, which are to be applied to the plurality of reading control lines RCL, on the basis of a determination result. The selector 33 includes a plurality of input terminals A (input terminals A1, A2, ... ) and a plurality of output terminals Y (output terminals Y1, Y2, ... ). The signals SNO outputted from the plurality of inverters 32 are inputted to the respective plurality of input terminals A. The selector 33 then outputs the plurality of reading control signals SRCL through the respective plurality of output terminals Y.

For example, when one of the pixels 11 in the pixel array 10 provides the detection notification to the addressor 30 through the notification line NOL, the inverter 32 coupled to this notification line NOL supplies the high-level signal SNO to the selector 33. The selector 33 determines the reading order on the basis of the signals SNO outputted from the plurality of inverters 32. The selector 33 then generates the plurality of reading control signals SRCL on the basis of the determination result. In the imaging device 1, this makes it possible to read the bit data BD preferentially from the pixels 11 in descending order of the number of photons detected thereby as described later, for example.

Moreover, in a case of receiving the detection notifications from the pixels 11 in a plurality of rows, for example, the selector 33 determines the reading order by using a priority order pattern PAT, which includes information regarding a row having priority, on the basis of instructions from the priority order switcher 34.

FIGS. 8A to 8D each illustrate an example of the priority order pattern PAT. In FIGS. 8A to 8D, the selector 33 includes four input terminals A (input terminals A1 to A4) and four output terminals Y (output terminals Y1 to Y4) for convenience of explanation. In FIGS. 8A to 8D, "1" represents the high level and "0" represents the low level. In addition, "X" represents that "0" and "1" are both acceptable.

The priority order pattern PAT (priority order pattern PATA) illustrated in FIG. 8A is an example where the priority order is set as an order of the fourth row, the third row, the second row, and the first row. In other words, the fourth row is the highest in the priority order and the first row is the lowest in the priority order. Specifically, for example, in a case where the pixels 11 in the first row and the pixels 11 in the second row provide the detection notifications, causing both of voltages of the input terminals A1 and A2 of the selector 33 to become the high level, the selector 33 sets a voltage of the output terminal Y2 at the high level as illustrated in FIG. 8A. The addressor 30 thus sets the reading control signal SRCL related to the pixels 11 in the second row at the high level. This results in reading the bit data BD of the pixels 11 in the second row and supplying the read bit data BD to the accumulator array 20. That is, in the case where the pixels 11 in the first row and the pixels 11 in the second row provide the detection notification, the selector 33 prioritizes the pixels 11 in the second row.

Meanwhile, for example, for example, in a case where the pixels 11 in the first row, the pixels 11 in the second row, and the pixels 11 in the third row provide the detection notifications, causing all of voltages of the input terminals A1 to A3 of the selector 33 to become the high level, the selector 33 sets a voltage of the output terminal Y3 at the high level as illustrated in FIG. 8A. The addressor 30 thus sets the reading control signal SRCL related to the pixels 11 in the third row at the high level. This results in reading the bit data BD of the pixels 11 in the third row and supplying the read bit data BD to the accumulator array 20. That is, in the case where the pixels 11 in the first to third rows provide the detection notifications, the selector 33 prioritizes the pixels 11 in the third row.

Meanwhile, for example, for example, in a case where the pixels 11 in the first row, the pixels 11 in the second row, the pixels 11 in the third row, and the pixels 11 in the fourth row provide the detection notification, causing all of voltages of the input terminals A1 to A4 of the selector 33 to become the high level, the selector 33 sets a voltage of the output terminal Y4 at the high level. The addressor 30 thus sets the reading control signal SRCL related to the pixels 11 in the fourth row at the high level. This results in reading the bit data BD of the pixels 11 in the fourth row and supplying the read bit data BD to the accumulator array 20. That is, in the case where the pixels 11 in the first to fourth rows provide the detection notifications, the selector 33 prioritizes the pixels 11 in the fourth row.

The priority order pattern PAT (priority order pattern PATB) illustrated in FIG. 8B is an example where the priority order is set as an order of the third row, the second row, the first row, and the fourth row. That is, in this example, in a case where the pixels 11 in the first to fourth rows provide the detection notifications, for example, the selector 33 prioritizes the pixels 11 in the third row. The priority order pattern PAT (priority order pattern PATC) illustrated in FIG. 8C is an example where the priority order is set as an order of the second row, the first row, the fourth row, and the third row. That is, in this example, in a case where the pixels in the first to fourth rows each provide the detection notification, for example, the selector 33 prioritizes the pixels 11 in the second row. The priority order pattern PAT (priority order pattern PATD) illustrated in FIG. 8D is an example where the priority order is set as an order of the first row, the fourth row, the third row, and the second row. That is, in this example, in a case where the pixels in the first to fourth rows each provide the detection notification, for example, the selector 33 prioritizes the pixels 11 in the first row. It is to be noted that the four priority order patterns PAT in FIGS. 8A to 8D provided in this example are not necessarily limitative but more priority order patterns PAT are possible.

The selector 33 is able to determine the reading order by using such a plurality of priority order patterns PAT. In this regard, for example, the selector 33 determines the reading order by using, among such a plurality of priority order patterns PAT, one corresponding to the instructions from the priority order switcher 34.

For example, the selector 33 may have a plurality of pieces of table data indicating such a plurality of priority order patterns PAT in advance and select the table data to use on the basis of the instructions from the priority order switcher 34, thereby selecting the priority order pattern PAT and operating on the basis of the selected table data. Moreover, for example, the selector 33 may operate in accordance with the priority order pattern PAT in use by using a logic circuit on the basis of the instructions from the priority order switcher 34.

The priority order switcher 34 instructs the selector 33 to switch the priority order pattern PAT. The priority order switcher 34 provides, for example, instructions for switching the priority order pattern PAT for a plurality of times during a period in a frame period F.

The addresser 30 thus generates the plurality of reading control signals SRCL to be supplied to the pixel array 10 on the basis of the plurality of notification signals SNOL in the plurality of notification lines NOL in the pixel array 10. In this regard, the addresser 30 generates the plurality of selection control signals SSEL in accordance with this plurality of reading control signals SRCL. Specifically, in a case of setting, among the plurality of reading control signals SRCL supplied to the pixel array 10, the reading control signal SRCL related to the pixels 11 in the first row at the high level, the addresser 30 sets, among the plurality of selection control signals SSEL supplied to the accumulator array 20, the selection control signal SSEL related to the accumulators 21 in the first row at the high level. This causes the bit data BD read from the pixel 11 to be supplied through the reading line RDL to the accumulator 21 corresponding to this pixel 11.

The output section 40 (FIGS. 1 and 2) generates an image signal Sout on the basis of the data for 8 bits (bits B7 to B0) supplied from each of the plurality of pixels 11 in the pixel array 10 through the output line OPL1 and the data for 8 bits (bits B15 to B8) supplied from each of the plurality of accumulators 21 in the accumulator array 20 through the output line OPL2.

FIG. 9 illustrates an implementation example of the imaging device 1. In this example, the imaging device 1 is provided by two semiconductor chips 111 and 121. A plurality of light-receiving elements 12 included in the imaging device 1 are provided in the semiconductor chip 111, while elements other than the plurality of light-receiving elements 12 and circuits of the imaging device 1 are provided in the semiconductor chip 121. The semiconductor chips 111 and 121 are placed on each other and electrically coupled to each other.

FIGS. 10A and 10B each illustrate an example of coupling between the semiconductor chips 111 and 121. The semiconductor chip 111 includes a semiconductor substrate 112 and an insulating layer 113. The light-receiving element 12 is provided on a front surface of the semiconductor substrate 112. The insulating layer 113 is provided on the front surface of the semiconductor substrate 112. The semiconductor chip 121 includes a semiconductor substrate 122 and an insulating layer 123. The insulating layer 123 is provided on a front surface of the semiconductor substrate 122.

In the example of FIG. 10A, the insulating layer 113 of the semiconductor chip 111 is provided with a via 114 and an electrode 115. The electrode 115 is provided on a surface of the insulating layer 113. The via 114 electrically couples this electrode 115 and the light-receiving element 12. Meanwhile, the insulating layer 123 of the semiconductor chip 121 is provided with a via 124 and an electrode 125. The electrode 125 is provided on a surface of the insulating layer 123. The via 124 electrically couples this electrode 125 and a circuit (in this example, the inverter 14) provided on the front surface of the semiconductor substrate 122. In this example, the semiconductor chips 111 and 121 are placed on each other with the insulating layer 113 of the semiconductor chip 111 and the insulating layer 123 of the semiconductor chip 121 being in contact with each other. This causes the electrode 115 of the semiconductor chip 111 and the electrode 125 of the semiconductor chip 121 to be in contact with each other and electrically coupled to each other. Such bonding may be achieved by Cu—Cu bonding, for example.

In FIG. 10B, the semiconductor substrate 122 of the semiconductor chip 121 is provided with a through electrode 126 and an electrode 127. The electrode 127 is provided on a rear surface of the semiconductor substrate 122. The through electrode 126 electrically couples this electrode 127 and a circuit (in this example, the inverter 14) provided on the front surface of the semiconductor substrate 122. The through electrode 126 penetrates through the semiconductor substrate 122. In this example, the semiconductor chips 111 and 121 are placed on each other with the insulating layer 113 of the semiconductor chip 111 and the semiconductor substrate 122 of the semiconductor chip 121 being in contact with each other. This causes the electrode 115 of the semiconductor chip 111 and the electrode 127 of the semiconductor chip 121 to be electrically coupled to each other through a bonding member 119, for example. Solder may be used as the bonding member 119, for example.

Here, each of the light-receiving elements 12 corresponds to a specific example of a "photoelectric converter" according to the present disclosure. The counter 15 corresponds to a specific example of a "storage" according to the present disclosure. The switch 18 corresponds to a specific example of an "output section" according to the present disclosure. The addresser 30 corresponds to a specific example of a "controller" according to the present disclosure. The plurality of pixel lines LP corresponds to a specific example of a "plurality of groups" according to the present disclosure. The transistor 17 corresponds to a specific example of a "switch" according to the present disclosure. Each of the reading control lines RCL corresponds to a specific example of a "control signal line" according to the present disclosure. The accumulator circuit 23 corresponds to a specific example of an "accumulating section" according to the present disclosure.

[Operation and Workings]

Next, description will be made on an operation and workings of the imaging device 1 according to the present embodiment.

(Outline of Overall Operation)

Referring to FIG. 2, outline of an overall operation of the imaging device 1 will first be described. In each of the pixels 11 in the pixel array 10, the light-receiving element 12 detects a photon and the counter 15 counts the number of photons detected by the light-receiving element 12. Then, in response to a signal indicated by the data (bit data BD) of the bit B7 of the counter 15 becoming the high level, the notification control circuit 16 sets the notification control signal SNOB at the high level, turning on the transistor 17. This causes the voltage (notification signal SNOL) of the notification line NOL to become the low level (active). Each of the pixels 11 thus provides the detection notification by supplying the notification signal SNOL to the addresser 30.

The addresser 30 determines, on the basis of this notification signal SNOL, the selection order (reading order) of the pixel lines LP for reading the bit data BD from each of the plurality of pixels 11 in the pixel array 10 and supplying the bit data BD to the accumulator array 20. The addressor 30 then generates the plurality of reading control signals SRCL on the basis of the determination result and generates the plurality of selection control signals SSEL in accordance with this plurality of reading control signals SRCL. This sets the reading control signal SRCL related to the pixels 11 (pixel 11A) having provided the detection notification at the high level and the selection control signal SSEL related to the accumulators 21 (accumulator 21A) corresponding to the pixel 11A at the high level. In the pixel 11, the switch 18 is turned on on the basis of this reading control signal SRCL, causing the pixel 11 to output the bit data BD to the reading line RDL. Meanwhile, in the accumulator 21, the AND circuit 22 supplies this bit data BD in the reading line RDL to the accumulator circuit 23 on the basis of the selection control signal SSEL. The accumulator circuit 23 then performs the accumulating operation on the basis of this bit data BD. Afterwards, in response to the reading control signal SRCL related to the pixel 11A becoming the low level and the selection control signal SSEL related to the accumulator 21A becoming the low level, the pixel 11A withdraws the detection notification.

Then, after the elapse of the exposure period, the addressor 30 sequentially selects the pixels 11 in the pixel array 10 using the plurality of output control signals SOCL1, while sequentially selecting the accumulators 21 in the accumulator array 20 using the plurality of output control signals SOCL2. In each of the pixels 11, the switch section 19 is turned on in response to the output control signal SOCL1 becoming the high level. This causes the pixel 11 to output the data for 8 bits (bits B7 to B0) in the counter 15 to the output line OPL1. Similarly, in each of the accumulators 21, the switch section 24 is turned on in response to the output control signal SOCL2 becoming the high level. This causes the accumulator 21 to output the data for 8 bits (bits B15 to B8) in the accumulator circuit 23 to the output line OPL2. The output section 40 generates the image signal Sout on the basis of the data for 8 bits (bits B7 to B0) supplied from the pixel array 10 and the data for 8 bits (bits B15 to B8) supplied from the accumulator array 20.

(Detailed Operation)

In the imaging device 1, the pixels 11 in the pixel array 10 each count the number of photons detected during the frame period F. This operation will be described below in detail.

FIG. 11 illustrates an example of an operation of each of the pixel array 10 and the accumulator array 20 during the frame period F.

The imaging device 1 performs a reset drive D1 per unit of pixel line LP by performing line sequential scanning on the plurality of pixels 11 in the pixel array 10 sequentially from top to bottom in a vertical direction (longitudinal direction) during a period of timings t0 to t1. Specifically, the addressor 30 sequentially resets the counters 15 of the pixels 11 per unit of pixel line LP by applying the plurality of reset signals SRSL1 to the respective plurality of reset lines RSL1. This causes each of the counters 15 to reset the count value and, subsequently, start the counting operation. An exposure period P1 is thus started sequentially in the plurality of pixels 11.

During this exposure period P1, the counter 15 of each of the pixels 11 increments the count value every time when the light-receiving element 12 detects a photon. The counter 15 thus stores the count value corresponding to the number of photons detected by the light-receiving element 12. Then, in response to the signal indicated by the data (bit data BD) of the bit B7 in the counter 15 becoming the high level, this pixel 11 provides the detection notification by supplying the notification signal SNOL to the addressor 30. The addressor 30 determines the reading order on the basis of this notification signal SNOL and generates the plurality of reading control signals SRCL on the basis of the determination result. In addition, the addressor 30 generates the plurality of selection control signals SSEL in accordance with this plurality of reading control signals SRCL. This sets the reading control signal SRCL related to the pixels 11 (pixel 11A) having provided the detection notification at the high level and the selection control signal SSEL related to the accumulators 21 (accumulator 21A) corresponding to the pixel 11A at the high level. The pixel 11A supplies the bit data BD to the accumulator 21A and the accumulator 21A performs the accumulating operation on the basis of this bit data BD. Afterwards, in response to the reading control signal SRCL related to the pixel 11A and the selection control signal SSEL related to the accumulator 21A each becoming the low level, the pixel 11A withdraws the detection notification.

The imaging device 1 then performs an output drive D31 per unit of pixel line LP by performing line sequential scanning on the plurality of pixels 11 in the pixel array 10 sequentially from top to bottom in the vertical direction (longitudinal direction) during a period of timings t2 to t3, while performing an output drive D32 per unit of accumulator line LA by performing line sequential scanning on the plurality of accumulators 21 in the accumulator array 20 sequentially from top to bottom in the vertical direction. Specifically, the addressor 30 applies the plurality of output control signals SOCL1 to the respective plurality of output control lines OCL1, thereby causing the pixels 11 to sequentially output the data for 8 bits (bits B7 to B0) to the output lines OPL1 per unit of pixel line LP. Meanwhile, the addressor 30 applies the plurality of output control signals SOCL2 to the respective plurality of output control lines OCL2, thereby causing the accumulators 21 to sequentially output the data for 8 bits (bits B15 to B8) to the output lines OPL2 per unit of accumulator line LA. The output section 40 then generates the image signal Sout on the basis of the data for 8 bits (bits B7 to B0) supplied from the pixel array 10 and the data for 8 bits (bits B15 to B8) supplied from the accumulator array 20.

The imaging device 1 thus generates a frame image during the frame period F. The imaging device 1 repeats this operation of the timings t0 to t3 hereafter.

(Regarding Determination of Reading Order)

The addressor 30 determines the reading order on the basis of the notification signals SNOL during the exposure period P1 and generates the plurality of reading control signals SRCL on the basis of the determination result. This operation will be described below in detail. It is to be noted that the description will be made below using an example where the selector 33 of the addressor 30 includes the four input terminals A (input terminals A1 to A4) and the four output terminals Y (output terminals Y1 to Y4) for convenience of explanation.

FIG. 12 illustrates an operation example of the addressor 30, in which (A) illustrates a waveform of a signal SNO1 outputted by the inverter 32 related to the first row, (B) illustrates a waveform of a signal SNO2 outputted by the inverter 32 related to the second row, (C) illustrates a waveform of a signal SNO3 outputted by the inverter 32 related to the third row, (D) illustrates a waveform of a signal SNO4 outputted by the inverter 32 related to the fourth row, (E) illustrates a waveform of a reading control signal SRCL1 related to the first row, (F) illustrates a waveform of a reading control signal SRCL2 related to the second row, (G)

illustrates a waveform of a reading control signal SRCL3 related to the third row, and (H) illustrates a waveform of a reading control signal SRCL4 related to the fourth row. For example, the signal SNO1 illustrated in FIG. 12(A) is an inverted signal of the notification signal SNOL related to the pixel line LP of the first row. For this reason, a period when the signal SNO1 is at the high level corresponds to a period when the pixels 11 in the first row provide the detection notification. The same applies to FIGS. 12(B) to (D). Moreover, a period when the reading control signal SRCL1 is at the high level illustrated in FIG. 12(E) corresponds to a period when the pixels 11 in the first row output the bit data BD to the reading line RDL. The same applies to FIGS. 12(F) to (H). Moreover, the waveform of the reading control signal SRCL1 related to the first row illustrated in FIG. 12(E) is similar to a waveform of a selection control signal SSEL1 related to the first row, the waveform of the reading control signal SRCL2 related to the second row illustrated in FIG. 12(F) is similar to a waveform of a selection control signal SSEL2 related to the second row, the waveform of the reading control signal SRCL3 related to the third row illustrated in FIG. 12(G) is similar to a waveform of a selection control signal SSEL3 related to the third row, and the waveform of the reading control signal SRCL4 related to the fourth row illustrated in FIG. 12(H) is similar to a waveform of a selection control signal SSEL4 related to the fourth row.

The selector 33 of the addresser 30 determines the reading order on the basis of the signals SNO1 to SNO4. In this regard, the selector 33 determines the reading order by using the priority order pattern PATA (FIG. 8A) where the priority order is set as the order of the fourth row, the third row, the second row, and the first row in this example. The selector 33 then generates the four reading control signals SRCL1 to SRCL4 every reading cycle T0 on the basis of the determination result. This operation will be described below in detail.

First, in this example, one of the pixels 11 in the second row, one of the pixels 11 in the third row, and one of the pixels 11 in the first row provide the detection notifications in this sequence during a period preceding a timing t11. This causes the signal SNO2, the signal SNO3, and the signal SNO1 to change in this sequence from the low level to the high level (FIGS. 12(A) to (C)).

(Timings t11 to t12)

Next, the selector 33 changes the reading control signal SRCL3 from the low level to the high level at the timing t11 (FIG. 12(G)). That is, since each of the signals SNO1 to SNO3 is at the high level at the timing t11, the selector 33 changes the reading control signal SRCL3 from the low level to the high level to prioritize the pixels 11 in the third row on the basis of the priority order pattern PATA. Simultaneously, the addresser 30 changes the selection control signal SSEL3 related to the accumulators 21 in the third row in the accumulator array 20 from the low level to the high level.

In each of the pixels 11 in the third row, the switch 18 is turned on in accordance with this reading control signal SRCL3. This causes this pixel 11 to output the bit data BD to the reading line RDL. Meanwhile, in the accumulator 21 corresponding to this pixel 11 in the third row, the AND circuit 22 supplies the signal (bit data BD) in the reading line RDL to the accumulator circuit 23 in response to the selection control signal SSEL3. The bit data BD is thus read from the pixel 11 in the third row and the read bit data BD is supplied to the accumulator 21 corresponding to this pixel 11 through the reading line RDL.

In this example, one of the pixels 11 in the fourth row provides the detection notification during a period of the timings t11 to t12. This causes the signal SNO4 to change from the low level to the high level during the period of the timings t11 to t12 (FIG. 12(D)).

(Timings t12 to t13)

Next, the selector 33 changes the reading control signal SRCL3 from the high level to the low level at the timing t12 (FIG. 12(G)). Simultaneously, the addresser 30 changes the selection control signal SSEL3 related to the accumulators 21 in the third row in the accumulator array 20 from the high level to the low level. As a result, the switch 18 is turned off in each of the pixels 11 in the third row and the AND circuit 22 stops supplying the bit data BD to the accumulator circuit 23 in each of the accumulators 21 in the third row. This terminates reading of the bit data BD from the pixels 11 in the third row. Meanwhile, in one of the pixels 11 that has provided the detection notification in the third row, the notification control circuit 16 turns off the transistor 17 on the basis of the reading control signal SRCL3, causing this pixel 11 to withdraw the detection notification. This changes the signal SNO3 from the high level to the low level (FIG. 12(C)).

Moreover, the selector 33 changes the reading control signal SRCL4 from the low level to the high level at the timing t12 (FIG. 12(H)). That is, since each of the signals SNO1, SNO2, and SNO4 is at the high level at the timing t12, the selector 33 changes the reading control signal SRCL4 from the low level to the high level to prioritize the pixels 11 in the fourth row on the basis of the priority order pattern PATA. Simultaneously, the addresser 30 changes the selection control signal SSEL4 related to the accumulators 21 in the fourth row in the accumulator array 20 from the low level to the high level. The bit data BD is thus read from the pixel 11 in the fourth row and the read bit data BD is supplied to the accumulator 21 corresponding to this pixel 11 through the reading line RDL.

(Timings t13 to t14)

Next, the selector 33 changes the reading control signal SRCL4 from the high level to the low level at the timing t13 (FIG. 12(H)). Simultaneously, the addresser 30 changes the selection control signal SSEL4 related to the accumulators 21 in the fourth row in the accumulator array 20 from the high level to the low level. This terminates reading of the bit data BD from the pixels 11 in the fourth row. Meanwhile, in one of the pixels 11 that has provided the detection notification in the fourth row, the notification control circuit 16 turns off the transistor 17 on the basis of the reading control signal SRCL4, causing this pixel 11 to withdraw the detection notification. This changes the signal SNO4 from the high level to the low level (FIG. 12(D)).

Moreover, the selector 33 changes the reading control signal SRCL2 from the low level to the high level at the timing t13 (FIG. 12(F)). That is, since each of the signals SNO1 and SNO2 is at the high level at the timing t13, the selector 33 changes the reading control signal SRCL2 from the low level to the high level to prioritize the pixels 11 in the second row on the basis of the priority order pattern PATA. Simultaneously, the addresser 30 changes the selection control signal SSEL2 related to the accumulators 21 in the second row in the accumulator array 20 from the low level to the high level. The bit data BD is thus read from the pixel 11 in the second row and the read bit data BD is supplied to the accumulator 21 corresponding to this pixel 11 through the reading line RDL.

In this example, one of the pixels 11 in the fourth row and one of the pixels 11 in the third row provide the detection notification in this sequence during a period of timings t13 to t14. This causes the signal SN4 and the signal SN3 to change in this sequence from the low level to the high level (FIGS. 12(C), (D)) during the period of the timings t13 to t14.

(Timings t14 to t15)

Next, the selector 33 changes the reading control signal SRCL2 from the high level to the low level at the timing t14 (FIG. 12(F)). Simultaneously, the addresser 30 changes the selection control signal SSEL2 related to the accumulators 21 in the second row in the accumulator array 20 from the high level to the low level. This terminates reading of the bit data BD from the pixels 11 in the second row. Meanwhile, in one of the pixels 11 that has provided the detection notification in the second row, the notification control circuit 16 turns off the transistor 17 on the basis of the reading control signal SRCL2, causing this pixel 11 to withdraw the detection notification. This changes the signal SNO2 from the high level to the low level (FIG. 12(B)).

Moreover, the selector 33 changes the reading control signal SRCL4 from the low level to the high level at the timing t14 (FIG. 12(H)). That is, since each of the signals SNO1, SNO3, and SNO4 is at the high level at the timing t14, the selector 33 changes the reading control signal SRCL4 from the low level to the high level to prioritize the pixels 11 in the fourth row on the basis of the priority order pattern PATA. Simultaneously, the addresser 30 changes the selection control signal SSEL4 related to the accumulators 21 in the fourth row in the accumulator array 20 from the low level to the high level. The bit data BD is thus read from the pixel 11 in the fourth row and the read bit data BD is supplied to the accumulator 21 corresponding to this pixel 11 through the reading line RDL.

(Timings t15 to t19)

The imaging device 1 operates in a similar manner as above hereafter. Specifically, the selector 33 sets the reading control signal SRCL3 at the high level to prioritize the pixels 11 in the third row during a period of timings t15 to t16 (FIG. 12(G)). The bit data BD is thus read from the pixel 11 in the third row and the read bit data BD is supplied to the accumulator 21 corresponding to this pixel 11 through the reading line RDL.

Meanwhile, the selector 33 sets the reading control signal SRCL1 at the high level to prioritize the pixels 11 in the first row during a period of timings t16 to t17 (FIG. 12(E)). The bit data BD is thus read from the pixel 11 in the first row and the read bit data BD is supplied to the accumulator 21 corresponding to this pixel 11 through the reading line RDL.

Meanwhile, the selector 33 sets the reading control signal SRCL2 at the high level to prioritize the pixels 11 in the second row during a period of timings t17 to t18 (FIG. 12(F)). The bit data BD is thus read from the pixel 11 in the second row and the read bit data BD is supplied to the accumulator 21 corresponding to this pixel 11 through the reading line RDL.

Meanwhile, the selector 33 sets the reading control signal SRCL4 at the high level to prioritize the pixels 11 in the fourth row during a period of timings t18 to t19 (FIG. 12(H)). The bit data BD is thus read from the pixel 11 in the fourth row and the read bit data BD is supplied to the accumulator 21 corresponding to this pixel 11 through the reading line RDL.

Although the selector 33 determines the reading order by using the priority order pattern PATA illustrated in FIG. 8A in this example, the priority order pattern PAT changes during a period in the frame period F. Specifically, the priority order switcher 34 provides instructions for switching the priority order pattern PAT for a plurality of times during a period in the frame period F. The selector 33 thus determines the reading order by sequentially using the variety of priority order patterns PAT during a certain frame period F. As a result, it is possible in the imaging device 1 to reduce a difference in a reading waiting time elapsed from when the pixel 11 provides the detection notification to when the bit data BD is read from the pixel 11. That is, since the priority order pattern PATA sets the priority order as the order of the fourth row, the third row, the second row, and the first row, in a case where the pixel 11 in the fourth row provides the detection notification, the bit data BD is read from this pixel 11 in the fourth row soon, whereas in a case where the pixel 11 in the first row provides the detection notification, there is a possibility of taking time to read the bit data BD from this pixel 11 in the first row as illustrated in FIG. 12, for example. As a result, reading the bit data BD from this pixel 11 in the first row may fail, for example. The selector 33 determines the reading order by sequentially using the variety of priority order patterns PAT during a certain frame period F. Thus, in a case of using another priority order pattern PAT, for example, it is possible to read, in response to the pixel 11 in the first row providing the detection notification, the bit data BD from the pixel 11 in the first row soon and, consequently, reduce a difference in the reading waiting time. As a result, the imaging device 1 is able to reduce a possibility of a failure in reading the bit data BD from the pixels 11 in a certain row, for example.

As described above, the imaging device 1 includes the accumulator array 20 in addition to the pixel array 10, allowing each of the pixels 11 in the pixel array 10 and the accumulator 21 corresponding to the pixel 11 in the accumulator array 20 to store the count value corresponding to the number of photons. This makes it possible to reduce a size of each of the pixels 11 while increasing a count value storable in the pixel 11 in the imaging device 1. That is, for example, in a case where the accumulator array 20 is not provided, the count value is to be stored only in each of the pixels 11 in the pixel array 10, resulting in a reduction in the storable count value. In addition, in this case, an increase in the number of bits of the counter 15 in each of the pixels 11 increases the size of each of the pixels 11. In contrast, in the imaging device 1, which includes the accumulator array 20 in addition to the pixel array 10, the count value corresponding to the number of photons is able to be stored in the pixels 11 and the accumulators 21. Specifically, in this example, the counter 15 of each of the pixels 11 and the accumulator circuit 23 of the accumulator 21 corresponding to this pixel 11 constitute a 16-bit counter. This makes it possible for the imaging device 1 to reduce the size of each of the pixels 11 while increasing the count value storable in the pixel 11.

Moreover, the imaging device 1 controls, on the basis of the data stored in the counter 15 of each of the pixels 11, the operation for reading the bit data BD from the pixel 11. Specifically, first, in response to the signal indicated by the data (bit data BD) of the bit B7 in the counter 15 becoming the high level, the pixel 11 provides the detection notification to the addresser 30 by setting the voltage (notification signal SNOL) of the notification line NOL at the low level (active). The addresser 30 then generates the reading control signal SRCL and the selection control signal SSEL on the basis of this detection notification, reads the bit data BD from the pixel 11, and supplies the bit data BD to the accumulator array 20. In the imaging device 1, it is thus possible to timely supply information regarding the number of the photons detected by the pixel 11 to the accumulator 21.

That is, for example, in a case where the addressor performs the line sequential scanning to read the bit data BD from the pixels, the bit data BD may not be completely read if the pixels in a partial region in the pixel array detect a lot of photons. That is, since time to elapse from reading of the bit data BD to next reading of the bit data BD in each of the pixels has been determined in this case, the counter may overflow if the pixel detects a lot of photons during this time, for example. In this case, there is a possibility that image quality of an image captured by an imaging operation is lowered. In contrast, the imaging device 1 controls, on the basis of the data stored in the counter 15 in each of the pixels 11, the operation for reading the bit data BD from the pixel 11. In the imaging device 1, this makes it possible to read the bit data BD preferentially from the pixels 11 in descending order of the number of photons detected thereby, for example. Thus, it is possible to timely supply information regarding the number of the photons detected by the pixels 11 to the accumulator 21 in the imaging device 1, allowing for reducing a possibility of occurrence of overflow of the counter, for example. As a result, the imaging device 1 is able to enhance the image quality of an image captured by the imaging operation.

Moreover, the imaging device 1 controls, on the basis of the data stored in the counter 15 of each of the pixels 11, the operation for reading the bit data BD from the pixel 11 as described above, thereby being able to reduce power consumption. That is, in a case where the addressor performs the line sequential scanning to read the bit data BD from the pixels, for example, the bit data BD is to be read from all the pixels 11 irrespective of whether or not the pixels 11 have detected a photon and thus there is a possibility of increasing power consumption. In contrast, in the imaging device 1, it is possible to reduce frequency of performing the reading operation on the pixel 11 that hardly detects a photon and, consequently, reduce power consumption, for example.

Moreover, in the imaging device 1, the bit data BD read from each of the plurality of pixels 11 in one column is time-divisionally supplied through the reading line RDL to corresponding one of the plurality of accumulators 21 in one column. Furthermore, in the imaging device 1, in a case of the addressor 30 receiving the detection notifications from the pixels 11 in a plurality of rows, one of the plurality of rows is prioritized. Thus, even in a case of simultaneously receiving the detection notifications from the pixels 11 in a plurality of rows, for example, it is possible to sequentially read the bit data BD from the pixels 11 in this plurality of rows.

Moreover, in the imaging device 1, in a case of receiving the detection notifications from the pixels 11 in a plurality of rows, the priority order is switched during a period in the frame period F. Specifically, the selector 33 determines the reading order by sequentially using the variety of priority order patterns PAT during a certain frame period F. In the imaging device 1, this makes it possible to reduce a difference in the reading waiting time elapsed before the bit data BD is read from the pixel 11 and, consequently, enhance the image quality.

Effects

In the present embodiment, the accumulator array is provided in addition to the pixel array, allowing each of the pixels in the pixel array and the accumulator corresponding to the pixel in the accumulator array to store the count value corresponding to the number of photons as described above. This makes it possible to reduce the size of each of the pixels while increasing the count value storable in the pixel.

In the present embodiment, on the basis of the data stored in the counter of each of the pixels, the operation for reading the bit data from the pixel is controlled. For this reason, it is possible to timely supply information regarding the number of the photons detected by the pixel to the accumulator while being able to reduce power consumption.

In the present embodiment, in a case of receiving the detection notifications from the pixels in a plurality of rows, one of the plurality of rows is prioritized. Thus, even in a case of simultaneously receiving the detection notifications from the pixels in a plurality of rows, for example, it is possible to sequentially read the bit data from the pixels in this plurality of rows.

In the present embodiment, in a case of receiving the detection notifications from the pixels in a plurality of rows, the priority order is switched during a period in the frame period. This makes it possible to reduce a difference in the reading waiting time elapsed before the bit data is read from the pixel and, consequently, enhance the image quality.

Modification Example 1-1

In the above embodiment, the drain of the transistor 17 of each of the pixels 11 in one row in the pixel array 10 is coupled to the notification line NOL while the notification line NOL is pulled up as illustrated in FIGS. 2 and 3, but it is not necessarily limitative. That is, in addition to a configuration according to the present embodiment illustrated in FIG. 13, configurations illustrated in FIGS. 14 and 15 are applicable, for example. It is to be noted that FIGS. 13 to 15 each illustrate merely a part related to the detection notification in the imaging device.

An imaging device illustrated in FIG. 14 includes a pixel array 10B and an addressor 30B. The pixel array 10B includes a plurality of pixels 11B. The pixels 11B each include an OR circuit 17B. In this example, the OR circuit 17B obtains a logical disjunction (OR) of the notification control signal SNOB outputted from the notification control circuit 16 and an output signal of the OR circuit 17B of the pixel 11B at a left side of this pixel 11B. That is, the plurality of OR circuits 17B of the pixels 11B in one row are daisy-chain-coupled. Such a configuration also enables each of the pixels 11B to provide the detection notification to the addressor 30B.

An imaging device illustrated in FIG. 15 includes a pixel array 10C and an addressor 30C. The pixel array 10C includes a plurality of pixels 11C and a plurality of OR circuits 17C. The pixels 11C each output the notification control signal SNOB generated by the notification control circuit 16. The plurality of OR circuits 17C each provide the detection notification to the addressor 30C on the basis of this plurality of notification control signals SNOB. Specifically, in this example, an OR circuit 17C1 among the plurality of OR circuits 17C obtains a logical disjunction (OR) of the notification control signal SNOB outputted from first one of the pixels 11C from the left and the notification control signal SNOB outputted from second one of the pixels 11C from the left, and an OR circuit 17C2 obtains a logical disjunction (OR) of the notification control signal SNOB outputted from third one of the pixels 11C from the left and the notification control signal SNOB outputted from fourth one of the pixels 11C from the left, for example. Furthermore, a plurality of OR circuits 17C3, which is daisy-chain-coupled, among the plurality of OR circuits 17C provides the detection notifications to the addressor 30C on the basis of an output signal of the OR circuit 17C1 and an output signal of the OR circuit 17C2.

Modification Example 1-2

In the above embodiment, using the bit B7 of the counter 15 as the bit data BD, the detection notification is provided on the basis of this bit data BD while this bit data BD is read as illustrated in FIG. 4. However, it is not necessarily limitative. That is, in addition to a configuration according to the present embodiment illustrated in FIG. 16, a bit different from the bit B7 of the counter 15 may be used as the bit data BD as illustrated in FIG. 17, for example. In an example of this FIG. 17, the bit B5 of the counter 15 is used as the bit data BD. Alternatively, the bit data BD may be generated on the basis of a plurality of bits of the counter 15. Specifically, an AND circuit that obtains a logical multiplication of the bit B7 and the bit B6 of the counter 15 may be provided to use an obtained result as the bit data BD, for example.

Alternatively, the count value of the counter 15 may be compared with a reference value to generate the bit data BD on the basis of a comparison result, for example. FIG. 18 illustrates a configuration example of a circuit that generates the bit data BD in each of the pixels according to the present modification example. This pixel includes a reference code supply circuit 15D1 and a count value comparison circuit 15D2. The reference code supply circuit 15D1 holds a reference value as an 8-bit reference code and supplies this reference code to the count value comparison circuit 15D2. The count value comparison circuit 15D2 compares the data for 8 bits (bits B7 to B0) supplied from the counter 15 and the 8-bit reference code supplied from the reference code supply circuit 15D1 and generates the bit data BD on the basis of a comparison result.

The count value comparison circuit 15D2 may be a logic comparator as illustrated in FIG. 19, for example. In this example, by using eight inverted exclusive OR circuits (EX-NORs), the count value comparison circuit 15D2 compares the data for 8 bits (bits B7 to B0) supplied from the counter 15 and the 8-bit reference code supplied from the reference code supply circuit 15D1. The count value comparison circuit 15D2 then sets the bit data BD at "1" if the count value of the counter 15 matches the reference value.

Alternatively, a full adder may be used as the count value comparison circuit 15D2, for example. In this case, a carry bit of the full adder may be used as the bit data BD, for example. The count value comparison circuit 15D2 thus sets the bit data BD at "1" on the basis of a result of magnitude comparison of the count value of the counter 15 and the reference value, for example.

Modification Example 1-3

In the above embodiment, each of the pixels 11 includes the counter 15 that stores data for the plurality of bits but it is not necessarily limitative. Instead of this, each pixel may include a latch circuit that stores data for 1 bit as in an imaging device 1E illustrated in FIG. 20, for example. This imaging device 1E includes a pixel array 10E, an addresser 30E, and an output section 40E. The pixel array 10E includes a plurality of reset lines RSL1, a plurality of reading control lines RCL, a plurality of notification lines NOL, a plurality of reading lines RDL, and a plurality of pixels 11E. The pixels 11E each include the light-receiving element 12, the resistor 13, the inverter 14, an SR (Set/Reset) latch 15E, the transistor 17, and the switch 18. The SR latch 15E has a set terminal to which an output signal of the inverter 14 is supplied and a reset terminal that is coupled to the reset lines RSL1. The SR latch 15E outputs stored data as the bit data BD through an output terminal. Here, the SR latch 15E corresponds to a specific example of the "storage" according to the present disclosure.

In each of the pixels 11E in the pixel array 10E, this configuration causes the light-receiving element 12 to detect a photon, setting the SR latch 15E. The transistor 17 is then turned on when an output signal (bit data BD) of the SR latch 15E becomes the high level. Each of the pixels 11E thus provides the detection notification indicating that the photon has been detected to the addresser 30E. In response to the reading control signal SRCL becoming the high level on the basis of this detection notification, the switch 18 is turned on, causing the pixel 11E to output the bit data BD to the reading line RDL. This pixel 11E thus supplies this bit data BD through the reading line RDL to the accumulator 21 corresponding to this pixel 11E in the accumulator array 20. Afterwards, in response to the reset signal SRSL1 becoming the high level, the SR latch 15E is reset. This turns off the transistor 17, causing the pixel 11E to withdraw the detection notification.

Modification Example 1-4

In the above embodiment, each of the pixels 11 includes the counter 15 but it is not necessarily limitative. Instead of this, each of the pixels may include no counter as in an imaging device 1F illustrated in FIG. 21, for example. The imaging device 1F includes a pixel array 10F, an addresser 30F, and an output section 40F. The pixel array 10F includes a plurality of control lines CTL, a plurality of reading control lines RCL, a plurality of notification lines NOL, a plurality of reading lines RDL, and a plurality of pixels 11F. Each of the plurality of control lines CTL, which extend in a lateral direction in FIG. 21, has one end coupled to the addresser 30F. The addresser 30F applies a control signal SCTL to this control line CTL. The pixels 11F each include the light-receiving element 12, a transistor 13F, the notification control circuit 16, and transistors 17, 18F and 19F. The transistor 13F, which is a p-type MOS transistor, has a source to which the voltage V1 is supplied, a gate that is coupled to one of the control lines CTL, and a drain that is coupled to the cathode of the light-receiving element 12 and the input terminal of the inverter 14. In this example, the inverter 14 generates the bit data BD. That is, in this example, the light-receiving element 12 detects a photon and stores data for 1 bit when the transistor 13F is off. The inverter 14 then generates the bit data BD on the basis of the data stored in the light-receiving element 12. Each of the transistors 18F and 19F is an N-type MOS transistor. The transistor 18F has a gate to which a voltage indicated by the bit data BD is supplied, a drain to which the voltage V1 is supplied, and a source that is coupled to a drain of the transistor 19F. The transistor 19F has a gate that is coupled to the reading control line RCL, the drain that is coupled to the source of the transistor 18F, and a source that is coupled to the reading line RDL. Here, the light-receiving element 12 corresponds to a specific example of a "light-receiving element" and the "storage" according the present disclosure.

In each of the pixels 11F in the pixel array 10F, this configuration causes the transistor 13F to be turned off during a period when the control signal SCTL is at the high level, causing the light-receiving element 12 to detect a photon and store the data for 1 bit. Then, in response to the signal indicated by the bit data BD becoming the high level, the notification control circuit 16 sets the notification control signal SNOB at the high level, turning on the transistor 17. Each of the pixels 11F thus provides the detection notification indicating that the photon has been detected to the addressor 30F. In response to the reading control signal SRCL becoming the high level on the basis of this detection notification, the transistor 19F is turned on, coupling the source of the transistor 18F to the reading line RDL. This pixel 11F thus supplies this bit data BD through the reading line RDL to the accumulator 21 corresponding to this pixel 11F in the accumulator array 20. The control signal SCTL then becomes the high level after temporarily becoming the low level. This allows the light-receiving element 12 to detect a photon.

Modification Example 1-5

In the above embodiment, the notification control circuit 16 sets the notification control signal SNOB at the high level in response to a change in the signal indicated by the bit data BD from the low level to the high level and sets the notification control signal SNOB at the low level in response to a change in the reading control signal SRCL from the high level to the low level, but it is not necessarily limitative. Instead of this, the notification control circuit 16 may be coupled to the reset line RSL1, allowing the notification control circuit 16 to set the notification control signal SNOB at the high level in response to a change in the signal indicated by the bit data BD from the low level to the high level and set the notification control signal SNOB at the low level in response to a change in the reset signal SRSL1 from the high level to the low level as in an imaging device 1G illustrated in FIG. 22, for example.

Modification Example 1-6

In the above embodiment, the imaging device 1 is provided by the semiconductor chips 111 and 121 as illustrated in FIG. 9 but it is not necessarily limitative. Instead of this, the imaging device 1 may be provided by a single semiconductor chip, for example. Alternatively, the pixel array 10 of the imaging device 1 may be provided in the semiconductor chips 111 and 121, whereas the accumulator array 20 and the output section 40 may be provided in another semiconductor chip, for example. In this case, a configuration as in an imaging device 1H illustrated in FIG. 23 is possible. This imaging device 1H includes an addressor 38H and a decoder 39H. The addressor 38H and the decoder 39H correspond to the addressor 30 of the imaging device 1 (FIG. 1). The addressor 38H drives the pixel array 10. In addition, the addressor 38H supplies address information regarding the pixel line LP that is currently driven in the pixel array 10 to the decoder 39H. The decoder 39H drives the accumulator array 20 on the basis of the address information supplied from the addressor 38H. This configuration allows the pixel array 10 and the addressor 38H to be provided in the semiconductor chips 111 and 121 and the accumulator array 20, the decoder 39H, and the output section 40 to be provided in the other semiconductor chip, for example.

Modification Example 1-7

In the above embodiment, the imaging device 1 includes the pixel array 10, the accumulator array 20, the addressor 30, and the output section 40 as illustrated in FIG. 1, but it is not necessarily limitative. Instead of this, no accumulator array may be provided as in an imaging device 1J illustrated in FIG. 24, for example. This imaging device 1J includes the pixel array 10, the addressor 38H, and an output section 40J. The addressor 38H drives the pixel array 10. In addition, the addressor 38H supplies address information regarding the pixel line LP that is currently driven in the pixel array 10 to the output section 40J. The output section 40J generates an image signal Sout2 on the basis of the bit data BD supplied through the reading line RDL from each of the plurality of pixels 11 in the pixel array 10, the data for 8 bits (bits B7 to B0) supplied through the output line OPL1 from each of the plurality of pixels 11 in the pixel array 10, and the address information supplied from the addressor 38H.

In this imaging device 1J, the addressor 38H sets, in response to the pixel 11 providing the detection notification to the addressor 38H, the reading control signal SRCL related to the pixel 11 that has provided the detection notification at the high level. The bit data BD is thus read from the pixels 11, including this pixel 11, in one row.

Modification Example 1-8

In the above embodiment, the addressor 30 drives the pixel array 10 per unit of pixel line LP and drives the accumulator array 20 per unit of accumulator line LA, but it is not necessarily limitative. That is, without limitation to the example where the pixel array 10 and the accumulator array 20 are each driven per unit of line as in the present embodiment illustrated in FIG. 25, the pixel array 10 and the accumulator array 20 may each be driven per unit of area as illustrated in FIG. 26, for example. In this example, the addressor 30 drives the pixel array 10 per unit of pixel area AP and drives the accumulator array 20 per unit of accumulator area AA.

Other Modification Examples

In addition, two or more of these modification examples may be combined.

2. Second Embodiment

Next, description will be made on an imaging device 2 according to a second embodiment. According to the present embodiment, in a case of receiving the detection notifications from the pixels 11 in a plurality of rows, the reading order is determined to allow reading to be performed in an order from the row where the pixel 11 that is the first to provide the detection notification belongs. It is to be noted that the same reference sign is used to refer to substantially the same component as in the imaging device 1 according to the above first embodiment and explanation thereof is omitted as necessary.

As illustrated in FIGS. 1 and 2, the imaging device 2 includes an addressor 50. The addressor 50 drives the pixel array 10 and the accumulator array 20. In addition, the addressor 50 generates the plurality of reading control signals SRCL on the basis of the plurality of notification signals SNOL supplied from the pixel array 10 similarly to the addressor 30 according to the first embodiment.

FIG. 27 illustrates a configuration example of the addressor 50. The addressor 50 includes the plurality of resistors 31, the plurality of inverters 32, a master counter 51, a plurality of latches 52, a selector 53, and the priority order switcher 34.

The master counter 51 is a counter with a plurality of bits (N bits) that increments the count value in accordance with the lapse of time. The master counter 51 supplies N-bit count data CD indicating the count value to the plurality of latches 52.

Each of the plurality of latches 52 stores the count data CD supplied from the master counter 51 on the basis of the signal SNO outputted from the inverter 32. The plurality of latches 52 corresponds to the respective plurality of inverters 32. The latches 52 each have a data input terminal to which the count value of the master counter 51 is supplied and a clock input terminal to which the signal SNO outputted from the corresponding inverter 32 is supplied. Furthermore, the latches 52 each supply the stored data (count data CD) to the selector 53. The latches 52 each have a reset terminal to which a reset signal is supplied from the selector 53. When reset, the latch 52 sets the data stored therein at a maximum value (111 . . . 1). This configuration causes each of the latches 52 to store the count data CD of the master counter 51 at a timing of rise of the signal SNO outputted from the inverter 32 and supply the stored data (count data CD) to the selector 53.

The selector 53 determines the reading order on the basis of the data (count data CD) supplied from the plurality of latches 52 and generates the plurality of reading control signals SRCL to be applied to the plurality of reading control lines RCL on the basis of the determination result. The selector 53 includes the plurality of input terminals A (input terminal A1, A2, . . . ), the plurality of output terminals Y (output terminals Y1, Y2, . . . ), and a plurality of reset output terminals RO (reset output terminal RO1, RO2, . . . ). Data (count data CD) supplied from the plurality of latches 52 is inputted to the respective plurality of input terminals A. The selector 53 then outputs the plurality of reading control signals SRCL through the respective plurality of output terminals Y. In addition, the selector 53 supplies the reset signals to the respective plurality of latches 52 through the respective plurality of reset output terminals RO.

For example, when one of the pixels 11 in the pixel array 10 provides the detection notification to the addressor 50 through the notification line NOL, the inverter 32 coupled to the notification line NOL supplies the signal SNO at the high level to the latch 52. The latch 52 stores the count data CD of the master counter 51 at a timing of rise of this signal SNO and supplies the stored data (count data CD) to the selector 53. The selector 53 determines the reading order on the basis of the data (count data CD) supplied from the plurality of latches 52. Specifically, the selector 53 determines the reading order to allow reading to be performed in an order from, among the plurality of rows, the row providing the smallest one of the values indicated by the data (count data CD) supplied from the plurality of latches 52. The selector 53 is thus able to determine the reading order to allow reading to be performed in an order from the row where the pixel 11 that is the first to provide the detection notification belongs. The selector 53 then generates the plurality of reading control signals SRCL on the basis of the determination result.

Moreover, for example, in a case where the values indicated by the data (count data CD) supplied from the plurality of latches 52 are mutually the same, the selector 53 determines the reading order by using the priority order pattern PAT, which includes information regarding the row having priority, on the basis of the instructions from the priority order switcher 34 as in the first embodiment.

FIG. 28 illustrates an operation example of the addressor 50, in which (A) illustrates a waveform of a signal SNO1 outputted by the inverter 32 related to the first row, (B) illustrates a waveform of a signal SNO2 outputted by the inverter 32 related to the second row, (C) illustrates a waveform of a signal SNO3 outputted by the inverter 32 related to the third row, (D) illustrates a waveform of a signal SNO4 outputted by the inverter 32 related to the fourth row, (E) illustrates a waveform of a reading control signal SRCL1 related to the first row, (F) illustrates a waveform of a reading control signal SRCL2 related to the second row, (G) illustrates a waveform of a reading control signal SRCL3 related to the third row, and (H) illustrates a waveform of a reading control signal SRCL4 related to the fourth row.

The selector 53 of the addressor 50 determines the reading order on the basis of the data supplied from the plurality of latches 52. In this regard, the selector 53 determines the reading order to allow reading to be performed in the order from the row where the pixel 11 that is the first to provide the detection notification belongs. The selector 53 then generates the four reading control signals SRCL1 to SRCL4 every reading cycle T0 on the basis of the determination result. This operation will be described below in detail.

First, in this example, one of the pixels 11 in the second row, one of the pixels in the third row, and one of the pixels in the first row provide the detection notifications in this sequence during a period preceding a timing t21.

The detection notification provided by one of the pixels 11 in the second row causes a change in the signal SNO2 from the low level to the high level (FIG. 28(B)), and the latch 52 related to the second row stores the count data CD supplied from the master counter 51 in response.

Next, the detection notification provided by one of the pixels 11 in the third row causes a change in the signal SNO3 from the low level to the high level (FIG. 28(C)), and the latch 52 related to the third row stores the count data CD supplied from the master counter 51 in response. A value of the count data CD stored in this latch 52 related to the third row is larger than a value of the count data CD stored in the latch 52 related to the second row.

Next, the detection notification provided by one of the pixels 11 in the first row causes a change in the signal SNO3 from the low level to the high level (FIG. 28(A)), and the latch 52 related to the first row stores the count data CD supplied from the master counter 51 in response. A value of the count data CD stored in this latch 52 related to the first row is larger than the value of the count data CD stored in the latch 52 related to the third row.

(Timings t21 to t22)

The selector 53 changes the reading control signal SRCL2 from the low level to the high level at the timing t21 (FIG. 28(F)). That is, the selector 53 changes the reading control signal SRCL2 from the low level to the high level to prioritize the pixels 11 in the second row, since the data supplied from the latch 52 related to the second row indicates the smallest value among the data (count data CD) supplied from the plurality of latches 52. Simultaneously, the addressor 50 changes the selection control signal SSEL2 related to the accumulators 21 in the second row in the accumulator array 20 from the low level to the high level.

In each of the pixels 11 in the second row, the switch 18 is turned on in response to this reading control signal SRCL2. This causes this pixel 11 to output the bit data BD to the reading line RDL. Meanwhile, in the accumulator 21 corresponding to this pixel 11 in the second row, the AND circuit 22 supplies the signal (bit data BD) in the reading line RDL to the accumulator circuit 23 in accordance with the selection control signal SSEL2. The bit data BD is thus read from the pixel 11 in the second row and the read bit data BD is supplied to the accumulator 21 corresponding to this pixel 11 through the reading line RDL.

In this example, one of the pixels 11 in the fourth row provides the detection notification during a period of the timings t21 to t22. This causes a change in the signal SNO4 from the low level to the high level (FIG. 28(D)), and the latch 52 related to the fourth row stores the count data CD supplied from the master counter 51 in response. A value of the count data CD stored in this latch 52 related to the fourth row is larger than the value of the count data CD stored in the latch 52 related to the first row before the timing t21.
(Timings t22 to t23)

Next, the selector 53 changes the reading control signal SRCL2 from the high level to the low level at the timing t22 (FIG. 28(F)). Simultaneously, the addresser 50 changes the selection control signal SSEL2 related to the accumulators 21 in the second row in the accumulator array 20 from the high level to the low level. As a result, the switch 18 is turned off in each of the pixels 11 in the second row and the AND circuit 22 stops supplying the bit data BD to the accumulator circuit 23 in each of the accumulators 21 in the second row. This terminates reading of the bit data BD from the pixels 11 in the second row. Meanwhile, in one of the pixels 11 that has provided the detection notification in the second row, the notification control circuit 16 turns off the transistor 17 on the basis of the reading control signal SRCL2, causing this pixel 11 to withdraw the detection notification. This changes the signal SNO2 from the high level to the low level (FIG. 28(B)). In addition, the selector 53 resets the latch 52 related to the second row at this timing t22. The data to be stored in the latch 52 is thus set at the maximum value.

In addition, the selector 53 changes the reading control signal SRCL3 from the low level to the high level at the timing t22 (FIG. 28(G)). That is, the selector 53 changes the reading control signal SRCL3 from the low level to the high level to prioritize the pixels 11 in the third row, since the data supplied from the latch 52 related to the third row among the data (count data CD) supplied from the plurality of latches 52 indicates the smallest value. Simultaneously, the addresser 50 changes the selection control signal SSEL3 related to the accumulators 21 in the third row in the accumulator array 20 from the low level to the high level. The bit data BD is thus read from the pixel 11 in the third row and the read bit data BD is supplied to the accumulator 21 corresponding to this pixel 11 through the reading line RDL.
(Timings t23 to t24)

Next, the selector 53 changes the reading control signal SRCL3 from the high level to the low level at the timing t23 (FIG. 28(G)). Simultaneously, the addresser 50 changes the selection control signal SSEL3 related to the accumulators 21 in the third row in the accumulator array 20 from the high level to the low level. This terminates reading of the bit data BD from the pixels 11 in the third row. Meanwhile, in one of the pixels 11 that has provided the detection notification in the third row, the notification control circuit 16 turns off the transistor 17 on the basis of the reading control signal SRCL3, causing this pixel 11 to withdraw the detection notification. This changes the signal SNO3 from the high level to the low level (FIG. 28(C)). In addition, the selector 53 resets the latch 52 related to the third row at this timing t23. The data to be stored in the latch 52 is thus set at the maximum value.

In addition, the selector 53 changes the reading control signal SRCL1 from the low level to the high level at this timing t23 (FIG. 28(E)). That is, the selector 53 changes the reading control signal SRCL1 from the low level to the high level to prioritize the pixels 11 in the first row, since the data supplied from the latch 52 related to the first row among the data (count data CD) supplied from the plurality of latches 52 indicates the smallest value. Simultaneously, the addresser 50 changes the selection control signal SSEL1 related to the accumulators 21 in the first row in the accumulator array 20 from the low level to the high level. The bit data BD is thus read from the pixel 11 in the first row and the read bit data BD is supplied to the accumulator 21 corresponding to this pixel 11 through the reading line RDL.

In this example, one of the pixels 11 in the second row provides the detection notification during a period of the timings t23 to t24. This causes a change in the signal SNO2 from the low level to the high level (FIG. 28(D)), and the latch 52 related to the second row stores the count data CD supplied from the master counter 51 in response. A value of the count data CD stored in this latch 52 related to the second row is larger than the value of the count data CD stored in the latch 52 related to the fourth row during the period of the timings t21 to t22.
(Timings t24 to t25)

Next, the selector 53 changes the reading control signal SRCL1 from the high level to the low level at the timing t24 (FIG. 28(E)). Simultaneously, the addresser 50 changes the selection control signal SSEL1 related to the accumulators 21 in the first row in the accumulator array 20 from the high level to the low level. This terminates reading of the bit data BD from the pixels 11 in the first row. Meanwhile, in one of the pixels 11 that has provided the detection notification in the first row, the notification control circuit 16 turns off the transistor 17 on the basis of the reading control signal SRCL1, causing this pixel 11 to withdraw the detection notification. This changes the signal SNO1 from the high level to the low level (FIG. 28(A)). In addition, the selector 53 resets the latch 52 related to the first row at this timing t24. The data to be stored in the latch 52 is thus set at the maximum value.

In addition, the selector 53 changes the reading control signal SRCL4 from the low level to the high level at the timing t24 (FIG. 28(H)). That is, the selector 53 changes the reading control signal SRCL1 from the low level to the high level to prioritize the pixels 11 in the fourth row, since the data supplied from the latch 52 related to the fourth row among the data (count data CD) supplied from the plurality of latches 52 indicates the smallest value. Simultaneously, the addresser 50 changes the selection control signal SSEL4 related to the accumulators 21 in the fourth row in the accumulator array 20 from the low level to the high level. The bit data BD is thus read from the pixel 11 in the fourth row and the read bit data BD is supplied to the accumulator 21 corresponding to this pixel 11 through the reading line RDL.
(Timings t25 to t26)

Next, the selector 53 changes the reading control signal SRCL4 from the high level to the low level at the timing t25 (FIG. 28(H)). Simultaneously, the addresser 50 changes the selection control signal SSEL4 related to the accumulators 21 in the fourth row in the accumulator array 20 from the high level to the low level. This terminates reading of the bit data BD from the pixels 11 in the fourth row. Meanwhile, in one of the pixels 11 that has provided the detection notification in the fourth row, the notification control circuit 16 turns off the transistor 17 on the basis of the reading control signal SRCL4, causing this pixel 11 to withdraw the detection notification. This changes the signal SNO4 from the high level to the low level (FIG. 28(D)). In addition, the selector 53 resets the latch 52 related to the fourth row at this timing t25. The data to be stored in the latch 52 is thus set at the maximum value.

In addition, the selector 53 changes the reading control signal SRCL2 from the low level to the high level at the timing t25 (FIG. 28(F)). That is, the selector 53 changes the reading control signal SRCL2 from the low level to the high level to prioritize the pixels 11 in the second row, since the data supplied from the latch 52 related to the second row among the data (count data CD) supplied from the plurality of latches 52 indicates the smallest value. Simultaneously, the addressor 50 changes the selection control signal SSEL2 related to the accumulators 21 in the second row in the accumulator array 20 from the low level to the high level. The bit data BD is thus read from the pixel 11 in the second row and the read bit data BD is supplied to the accumulator 21 corresponding to this pixel 11 through the reading line RDL.

As described above, in the case of receiving the detection notifications from the pixels 11 in a plurality of rows, the imaging device 2 determines the reading order to allow reading to be performed in an order from the row where the pixel 11 that is the first to provide the detection notification belongs, making it possible to reduce a difference in the reading waiting time elapsed from when the pixel 11 provides the detection notification to when the bit data BD is read from the pixel 11. As a result, it is possible to timely supply information regarding the number of the photons detected by the pixel 11 to the accumulator 21 in the imaging device 2.

In the present embodiment, in the case of receiving the detection notifications from the pixels in a plurality of rows, the reading order is determined to allow reading to be performed in an order from the row where the pixel 11 that is the first to provide the detection notification belongs, making it possible to timely supply information regarding the number of the photons detected by the pixel to the accumulator.

Modification Example 2

The modification examples of the above first embodiment are applicable to the imaging device 2 according to the above embodiment.

3. Third Embodiment

Next, description will be made on an imaging device 3 according to a third embodiment. According to the present embodiment, in a case of receiving the detection notifications from the pixels in a plurality of rows, the reading order is determined to allow reading to be performed in an order from a row including the largest number of pixels that have provided the detection notifications. It is to be noted that the same reference sign is used to refer to substantially the same component as in the imaging device 1 according to the above first embodiment and explanation thereof is omitted as necessary.

FIG. 29 illustrates a configuration example of the imaging device 3 according to the present embodiment. As illustrated in FIGS. 1 and 29, the imaging device 3 includes a pixel array 60 and an addressor 70.

The pixel array 60 includes a plurality of pixels 61, the plurality of reset lines RSL1, a plurality of clear lines CLL, the plurality of reading control lines RCL, the plurality of notification lines NOL, the plurality of output control lines OCL1, the plurality of reading lines RDL, and the plurality of output lines OPL1. Each of the plurality of clear lines CLL, which extends in a lateral direction in FIG. 29, has one end coupled to the addressor 70. The addressor 70 applies a clear signal SCLL to each of the clear lines CLL.

FIG. 30 illustrates a configuration example of each of the pixels 61. The pixel 61 includes a notification control circuit 66. The notification control circuit 66 generates the notification control signal SNOB on the basis of the bit data BD, the reset signal SRSL1, and the clear signal SCLL. The notification control circuit 66 includes NAND circuits 101 to 103 and an AND circuit 104. The NAND circuit 101 obtains an inverted logical multiplication (NAND) of the clear signal SCLL and a signal indicated by the bit data BD. The NAND circuit 102 obtains an inverted logical multiplication (NAND) of an output signal of the NAND circuit 101 and an output signal of the NAND circuit 103. The NAND circuit 103 obtains an inverted logical multiplication (NAND) of an output signal of the NAND circuit 102 and the reset signal SRSL1. The AND circuit 104 obtains an inverted logical multiplication (NAND) of the output signal of the NAND circuit 103 and the signal indicated by the bit data BD.

FIG. 31 illustrates an operation example of the notification control circuit 66, in which (A) illustrates a waveform of the reset signal SRSL1, (B) illustrates a waveform of the signal indicated by the bit data BD, (C) illustrates a waveform of a signal S101 outputted from the NAND circuit 101, (D) illustrates a waveform of a signal S103 outputted from the NAND circuit 103, (E) illustrates a waveform of the notification control signal SNOB, (F) illustrates a waveform of the notification signal SNOL, and (G) illustrates a waveform of the clear signal SCLL.

The notification control circuit 66 controls a notification operation to prevent each of the pixels 61 from providing the detection notification to the addressor 70 for a plurality of times during the frame period F. This operation will be described below in detail.

First, the addressor 70 changes the reset signal SRSL1 from the high level to the low level at a timing t31 (FIG. 31(A)). This resets the counter 15, setting a signal indicated by the bit B7 (bit data BD) at the low level (FIG. 31(B)). Furthermore, the NAND circuit 103 changes the signal S103 from the low level to the high level on the basis of this reset signal SRSL1 (FIG. 31(D)).

Next, the addressor 70 changes the reset signal SRSL1 from the low level to the high level at a timing t32 (FIG. 31(A)). This causes the counter 15 to start counting the number of pulses supplied from the inverter 14.

Then, in this example, the signal indicated by the data (bit data BD) of the bit B7 in the counter 15 becomes the high level at a timing t33 (FIG. 31(B)). In response, the AND circuit 104 changes the notification control signal SNOB from the low level to the high level (FIG. 31(E)). This turns on the transistor 17, causing the notification signal SNOL to change from the high level to the low level (active) (FIG. 31(F)). The pixel 61 thus provides the detection notification to the addressor 70.

To cause this pixel 61 to withdraw the detection notification, the addressor 70 changes the clear signal SCLL from the low level to the high level on the basis of this notification signal SNOL at a timing t34 (FIG. 31(G)). This causes the NAND circuit 101 to change the signal S101 from the high level to the low level (FIG. 31(C)). In response, the NAND circuit 102 changes the output signal from the low level to the high level, causing the NAND circuit 103 to change the signal S103 from the high level to the low level (FIG. 31(D)). In response, the AND circuit 104 changes the notification control signal SNOB from the high level to the low level (FIG. 31(E)). This turns off the transistor 17, causing the notification signal SNOL to change from the low level to the high level (non-active) (FIG. 31(F)). The pixel 61 thus withdraws the detection notification.

Afterwards, the addresser 70 changes the clear signal SCLL from the high level to the low level at a timing t35 (FIG. 31(G)). The NAND circuit 101 changes the signal S101 from the low level to the high level in response (FIG. 31(C)).

At the timing t35 and thereafter, the signal S103 remains at the low level. This causes the AND circuit 104 to keep the notification control signal SNOB at the low level irrespective of the bit data BD. The pixel 61 thus provides no detection notification to the addresser 70 until a next time for the reset signal SRSL1 to become the low level. The pixel 61 is thus prevented from providing the detection notification to the addresser 70 for a plurality of times during the frame period F.

The addresser 70 (FIGS. 1 and 29) drives the pixel array 60 and the accumulator array 20. Specifically, the addresser 70 drives the pixel array 60 per unit of pixel line LP by applying the plurality of reset signals SRSL1 to the respective plurality of reset lines RSL1 in the pixel array 60, applying the plurality of clear signals SCLL to the respective plurality of clear lines CLL, applying the plurality of reading control signals SRCL to the respective plurality of reading control lines RCL, and applying the plurality of output control signals SOCL1 to the respective plurality of output control lines OCL1.

FIG. 32 illustrates a configuration example of the addresser 70. It is to be noted that one of the pixels 61 (pixel 61_1) in the first row and one of the pixels 61 (pixel 61_2) in the second row in the pixel array 60 are drawn in this FIG. 32 in addition to the addresser 70 for convenience of explanation. The addresser 70 includes the plurality of resistors 31, a clock generator 71, a plurality of clear signal generators 72, a plurality of counters 73, a selector 74, and the priority order switcher 34.

The clock generator 71 generates a clock signal SCK. A cycle of the clock signal SCK (clock cycle T1) is set shorter than the reading cycle T0.

Each of the plurality of clear signal generators 72 not only generates the clear signal SCLL but also generates a notification pulse signal SPU, on the basis of the notification signal SNOL and the clock signal SCK. The plurality of clear signal generators 72 corresponds to the respective plurality of notification lines NOL and to the respective plurality of clear lines CLL. The clear signal generators 72 each receive the notification signal SNOL supplied through the corresponding notification line NOL and the clock signal SCK. Then, the clear signal generators 72 each apply the generated clear signal SCLL to the corresponding clear line CLL, while supplying the generated notification pulse signal SPU to the corresponding counter 73 of the plurality of counters 73.

Each of the plurality of counters 73 performs a counting operation to count the number of pulses contained in the notification pulse signal SPU and stores the count value corresponding to this number of the pulses. The plurality of counters 73 corresponds to the respective plurality of clear signal generators 72. The counters 73 each receive the notification pulse signal SPU supplied from the corresponding clear signal generator 72. Then, the counters 73 each supply the stored count value to the selector 74. A reset signal is supplied from the selector 74 to a reset terminal of each of the counters 73. When reset, the counter 73 sets the count value stored therein at "0" (zero).

FIG. 33 illustrates a configuration example of each of the clear signal generators 72. The clear signal generator 72 includes a flip-flop (F/F) 81, inverters 82 and 83, an AND circuit 84, a delay circuit 85, an inverter 86, and an AND circuit 87. The flip-flop 81, which is a D-type flip-flop, samples the notification signal SNOL on the basis of a rising edge of the clock signal SCK and outputs a sampling result. The flip-flop 81 has a data input terminal to which the notification signal SNOL is supplied, a clock input terminal to which the clock signal SCK is supplied, and an output terminal coupled to an input terminal of the inverter 82. The input terminal of the inverter 82 is coupled to the output terminal of the flip-flop 81 and an output terminal is coupled to a first input terminal of the AND circuit 84 and a first input terminal of the AND circuit 87. An input terminal of the inverter 83 is supplied with the clock signal SCK and an output terminal is coupled to a second input terminal of the AND circuit 84. The AND circuit 84 obtains a logical multiplication (AND) of an output signal of the inverter 82 and an output signal of the inverter 83, and outputs an obtained result as the notification pulse signal SPU. The first input terminal of the AND circuit 84 is coupled to the output terminal of the inverter 82, the second input terminal is coupled to the output terminal of the inverter 83, and an output terminal is coupled to the counter 73. The delay circuit 85 delays the clock signal SCK and outputs the delayed signal. An input terminal of the delay circuit 85 is supplied with the clock signal SCK and an output terminal is coupled to an input terminal of the inverter 86. The input terminal of the inverter 86 is coupled to the output terminal of the delay circuit 85 and an output terminal is coupled to a third input terminal of the AND circuit 87. The AND circuit 87 obtains a logical multiplication (AND) of the output signal of the inverter 82, the clock signal SCK, and an output signal of the inverter 86 and outputs an obtained result as the clear signal SCLL. The first input terminal of the AND circuit 87 is coupled to the output terminal of the inverter 82, a second input terminal is supplied with the clock signal SCK, the third input terminal is coupled to the output terminal of the inverter 86, and an output terminal is coupled to the clear line CLL.

FIG. 34 illustrates an operation example of each of the clear signal generators 72, in which (A) illustrates a waveform of the clock signal SCK, (B) illustrates a waveform of the notification signal SNOL, (C) illustrates a waveform of a signal S82 outputted from the inverter 82, (D) illustrates a waveform of a signal S86 outputted from the inverter 86, (E) illustrates a waveform of the clear signal SCLL, (F) illustrates a waveform of the notification pulse signal SPU, and (G) illustrates an operation of the counter 73 to which the notification pulse signal SPU is supplied.

First, in this example, one of the pixels 61 (pixel 61A) provides the detection notification, causing the notification signal SNOL to change from the high level to the low level at a timing t41 (FIG. 34(B)).

Next, the flip-flop 81 of the clear signal generator 72 samples this notification signal SNOL on the basis of the rising edge of the clock signal SCK at a timing t42. The inverter 82 inverts and outputs an output signal of the flip-flop 81 as the signal S82. By doing so, the inverter 82 changes the signal S82 from the low level to the high level (FIGS. 34(A) and (C)). In response, the AND circuit 87 changes the clear signal SCLL from the low level to the high level (FIG. 34(E)).

The pixel 61A withdraws the detection notification in response to this clear signal SCLL. This causes the notification signal SNOL to change from the low level to the high level at a timing slightly delayed from this timing t42 (FIG. 34(B)).

The delay circuit 85 delays the clock signal SCK and the inverter 86 inverts and outputs the output signal of the delay circuit 85 as the signal S86. By doing so, the inverter 86 changes the signal S86 from the high level to the low level at a timing t43 (FIG. 34(D)). The AND circuit 87 changes the clear signal SCLL from the high level to the low level in response (FIG. 34(E)).

Next, the AND circuit 84 changes the notification pulse signal SPU from the low level to the high level in response to the change in the clock signal SCK at a timing t44 (FIG. 34(F)). This causes the counter 73 to increment the count value on the basis of this notification pulse signal SPU.

Next, since the clock signal SCK changes from the low level to the high level at this timing t45 (FIG. 34(A)), the output signal of the inverter 83 changes from the high level to the low level. In response, the AND circuit 84 changes the notification pulse signal SPU from the high level to the low level (FIG. 34(F)).

In addition, at this timing t45, the flip-flop 81 samples the notification signal SNOL on the basis of the rising edge of the clock signal SCK. This causes the inverter 82, which is downstream of this flip-flop 81, to change the signal S82 from the high level to the low level (FIGS. 34(A) and (C)).

A subsequent operation is similar as above. In this example, one of the pixels 61 (pixel 61B) different from the pixel 61A provides the detection notification at a timing t46, thereby causing the notification signal SNOL to change from the high level to the low level (FIG. 34(B)).

Next, at a timing t47, the flip-flop 81 samples this notification signal SNOL on the basis of the rising edge of the clock signal SCK, thereby causing the inverter 82, which is downstream of the flip-flop 81, to change the signal S82 from the low level to the high level (FIGS. 34(A) and (C)). In response, the AND circuit 87 changes the clear signal SCLL from the low level to the high level (FIG. 34(E)). The pixel 61B withdraws the detection notification in accordance with this clear signal SCLL. This causes the notification signal SNOL to change from the low level to the high level at a timing slightly delayed from this timing t47 (FIG. 34(B)).

Next, the inverter 86 changes the signal S86 from the high level to the low level at a timing t48 (FIG. 34(D)). In response, the AND circuit 87 changes the clear signal SCLL from the high level to the low level (FIG. 34(E)).

In this example, next, one of the pixels 61 (pixel 61C) different from the pixels 61A and 61B provides the detection notification, thereby causing the notification signal SNOL to change from the high level to the low level at a timing t49 (FIG. 34(B)).

Next, at a timing t50, the AND circuit 84 changes the notification pulse signal SPU from the low level to the high level in accordance with the change in the clock signal SCK (FIG. 34(F)). This causes the counter 73 to increment the count value on the basis of this notification pulse signal SPU.

Next, at a timing t51, since the clock signal SCK changes from the low level to the high level (FIG. 34A), the output signal of the inverter 83 changes the high level to the low level. In response, the AND circuit 84 changes the notification pulse signal SPU from the high level to the low level (FIG. 34(F)).

In addition, at this timing t51, the flip-flop 81 samples the notification signal SNOL on the basis of the rising edge of the clock signal SCK. This causes the inverter 82, which is downstream of this flip-flop 81, to keep the signal S82 at the high level (FIGS. 34(A) and (C)). This causes the AND circuit 87 to change the clear signal SCLL from the low level to the high level (FIG. 34(E)). The pixel 61C withdraws the detection notification in response to this clear signal SCLL. This causes the notification signal SNOL to change from the low level to the high level at a timing slightly delayed from this timing t51 (FIG. 34(B)).

Next, at a timing t52, the inverter 86 changes the signal S86 from the high level to the low level (FIG. 34(D)). In response, the AND circuit 87 changes the clear signal SCLL from the high level to the low level (FIG. 34(E)).

Next, at a timing t53, the AND circuit 84 changes the notification pulse signal SPU from the low level to the high level in accordance with the change in the clock signal SCK (FIG. 34(F)). This causes the counter 73 to increment the count value on the basis of this notification pulse signal SPU.

The clear signal generator 72 thus generates the clear signal SCLL, while generating the notification pulse signal SPU, on the basis of the notification signal SNOL and the clock signal SCK. Moreover, the counter 73 performs the counting operation to count the number of pulses contained in the notification pulse signal SPU and stores the count value corresponding to this number of the pulses. Moreover, the counter 73 supplies the stored count value to the selector 74.

The selector 74 determines the reading order on the basis of the count values supplied from the plurality of counters 73 and generates the plurality of reading control signals SRCL to be applied to the plurality of reading control lines RCL on the basis of the determination result. The selector 74 includes the plurality of input terminals A (input terminals A1, A2, . . . ), the plurality of output terminals Y (output terminals Y1, Y2, . . . ), and the plurality of reset output terminals RO (reset output terminals RO1, RO2, . . . ). The count values supplied from the plurality of counters 73 are inputted to the respective plurality of input terminals A. The selector 74 then outputs the plurality of reading control signals SRCL through the respective plurality of output terminals Y. In addition, the selector 74 supplies reset signals to the plurality of counters 73 through the respective plurality of reset output terminals RO.

For example, when one of the pixels 61 in the pixel array 60 provides the detection notification to the addressor 70 through the notification line NOL, the clear signal generator 72 coupled to the notification line NOL supplies a pulse to the counter 73 via the notification pulse signal SPU. The counter 73 increments the count value on the basis of this pulse. The selector 74 determines a reading order on the basis of the count values supplied from the plurality of counters 73. Specifically, the selector 74 determines the reading order to allow reading to be performed in an order from, among the plurality of rows, the row related to the largest one of the count values supplied from the plurality of counters 73. The selector 74 is thus able to determine the reading order to allow reading to be performed in an order from the row including the largest number of the pixels 61 that have provided the detection notifications. The selector 74 then generates the plurality of reading control signals SRCL on the basis of the determination result.

In addition, for example, in a case where the values indicated by the count values supplied from the plurality of counters 73 are mutually the same, the selector 74 determines the reading order by using the priority order pattern PAT, which includes information regarding a row having priority, on the basis of instructions from the priority order switcher 34 as in the first embodiment.

FIG. 35 illustrates an operation example of the addressor 70, in which (A) illustrates an operation of a counter 73_1 related to the first row, (B) illustrates an operation of a counter 73_2 related to the second row, (C) illustrates an operation of a counter 73_3 related to the third row, (D) illustrates an operation of a counter 73_4 related to the fourth row, (E) illustrates a waveform of the reading control signal SRCL1 related to the first row, (F) illustrates a waveform of the reading control signal SRCL2 related to the second row, (G) illustrates a waveform of the reading control signal SRCL3 related to the third row, and (H) illustrates a waveform of the reading control signal SRCL4 related to the fourth row.

The selector 74 of the addressor 70 determines the reading order on the basis of the count values supplied from the plurality of counters 73. In this regard, the selector 74 determines the reading order to allow reading to be performed in an order from the row including the largest number of the pixels 61 that have provided the detection notifications. The selector 74 then generates the four reading control signals SRCL1 to SRCL4 every reading cycle T0 on the basis of the determination result. It is to be noted that although the reading cycle T0 is set four times as long as the clock cycle T1 for convenience of explanation in this example, it is not necessarily limitative. The reading cycle T0 may be longer than four times the clock cycle T1 or the reading cycle T0 may be shorter than the four times the clock cycle T1. This operation will be described below in detail.

(Timings t61 to t62)

During a period of timings t61 to t62, the pixel array 60 detects a photon and provides the detection notification to the addressor 70. The counter 73 increments the count value in response.

Specifically, the count value of the counter 73_1 is incremented twice on the basis of the detection notifications from two of the pixels 61 in the first row during the timings t61 to t62 (FIG. 35(A)). The count value of the counter 73_1 thus becomes "2" at the end of this period of the timings t61 to t62.

In addition, the count value of the counter 73_2 is incremented once on the basis of the detection notification from one of the pixels 61 in the second row during the timings t61 to t62 (FIG. 35(B)). The count value of the counter 73_2 thus becomes "1" at the end of this period of the timings t61 to t62.

In addition, the count value of the counter 73_3 is incremented for three times on the basis of the detection notifications from three of the pixels 61 in the third row during the timings t61 to t62 (FIG. 35(C)). The count value of the counter 73_3 thus becomes "3" at the end of this period of the timings t61 to t62.

In addition, the count value of the counter 73_4 is incremented once on the basis of the detection notification from one of the pixels 61 in the fourth row during the timings t61 to t62 (FIG. 35(D)). The count value of the counter 73_4 thus becomes "1" at the end of this period of the timings t61 to t62.

(Timings t62 to t63)

At the timing t62, the selector 74 changes the reading control signal SRCL3 from the low level to the high level (FIG. 35(G)). That is, the selector 74 changes the reading control signal SRCL3 from the low level to the high level to prioritize the pixels 61 in the third row, since the count value of the counter 73_3 related to the third row is the largest among the count values of the plurality of counters 73 at the end of the period of the timings t61 to t62. Simultaneously, the addressor 70 changes the selection control signal SSEL3 related to the accumulators 21 in the third row in the accumulator array 20 from the low level to the high level.

In each of the pixels 61 in the third row, the switch 18 is turned on in response to this reading control signal SRCL3. This causes the pixel 61 to output the bit data BD to the reading line RDL. Meanwhile, in the accumulator 21 corresponding to this pixel 61 in the third row, the AND circuit 22 supplies the signal (bit data BD) in the reading line RDL to the accumulator circuit 23 in response to the selection control signal SSEL3. The bit data BD is thus read from the pixel 61 in the third row and the read bit data BD is supplied to the accumulator 21 corresponding to this pixel 61 through the reading line RDL.

The bit data BD is thus read from the pixel 61 in the third row during the period of the timings t62 to t63. Then, the selector 74 resets the counter 73_3 related to the third row at the end of this period of the timings t62 to t63. The count value of this counter 73_3 thus becomes "0" (FIG. 35(C)).

Moreover, during this period of the timings t62 to t63, the pixel array 60 detects a photon and provides the detection notification to the addressor 70. The counters 73 increments the count values in response. Specifically, during this period of the timings t62 to t63, the count value of the counter 73_1 is incremented once on the basis of the detection notification from one of the pixels 61 in the first row (FIG. 35(A)). The count value of the counter 73_1 thus becomes "3" at the end of this period of the timings t62 to t63. In addition, during this period of the timings t62 to t63, the count value of the counter 73_4 is incremented once on the basis of the detection notification from one of the pixels 61 in the fourth row (FIG. 35(D)). The count value of the counter 73_4 thus becomes "2" at the end of this period of the timings t62 to t63.

Meanwhile, since none of the pixels 61 in the second row provides the detection notification during this period of the timings t62 to t63, the count value of the counter 73_2 is not incremented (FIG. 35(B)). The count value of the counter 73_2 thus remains at "1" at the end of this period of the timings t62 to t63.

(Timings t63 to t64)

Next, at the timing t63, the selector 74 changes the reading control signal SRCL3 from the high level to the low level (FIG. 35(G)). Simultaneously, the addressor 70 changes the selection control signal SSEL3 related to the accumulators 21 in the third row in the accumulator array 20 from the high level to the low level. As a result, the switch 18 is turned off in each of the pixels 61 in the third row and the AND circuit 22 stops supplying the bit data BD to the accumulator circuit 23 in each of the accumulators 21 in the third row. This terminates reading of the bit data BD from the pixels 61 in the third row.

In addition, at this timing t63, the selector 74 changes the reading control signal SRCL1 from the low level to the high level (FIG. 35(E)). That is, since the count value of the counter 73_1 related to the first row is the largest among the count values of the plurality of counters 73 at the end of the period of the timings t62 to t63, the selector 74 changes the reading control signal SRCL1 from the low level to the high level to prioritize the pixels 61 in the first row. Simultaneously, the addressor 70 changes the selection control signal SSEL1 related to the accumulators 21 in the first row in the accumulator array 20 from the low level to the high level. The bit data BD is thus read from the pixel 61 in the first row and the read bit data BD is supplied to the accumulator 21 corresponding to this pixel 61 through the reading line RDL.

The bit data BD is thus read from the pixel 61 in the first row during a period of the timings t63 to t64. Then, the selector 74 resets the counter 73_1 related to the first row at the end of this period of the timings t63 to t64. The count value of this counter 73_1 thus becomes "0" (FIG. 35(A)).

Moreover, during this period of the timings t63 to t64, the pixel array 60 detects a photon and provides the detection notification to the addresser 70. The counters 73 increments the count values in response. Specifically, during this period of the timings t63 to t64, the count value of the counter 73_3 is incremented twice on the basis of the detection notifications from two of the pixels 61 in the third row (FIG. 35(C)). The count value of the counter 73_3 thus becomes "2" at the end of this period of the timings t63 to t64. In addition, the count value of the counter 73_4 is incremented for four times on the basis of the detection notifications from four of the pixels 61 in the fourth row during this period of the timings t63 to t64 (FIG. 35(D)). The count value of the counter 73_4 thus becomes "6" at the end of this period of the timings t63 to t64.

Meanwhile, since none of the pixels 61 in the second row provides the detection notification during this period of the timings t63 to t64, the count value of the counter 73_2 is not incremented (FIG. 35(B)). The count value of the counter 73_2 thus remains at "1" at the end of this period of the timings t63 to t64.

(Timings t64 to t65)

Next, at the timing t64, the selector 74 changes the reading control signal SRCL1 from the high level to the low level (FIG. 35(E)). Simultaneously, the addresser 70 changes the selection control signal SSEL1 related to the accumulators 21 in the first row in the accumulator array 20 from the high level to the low level. This terminates reading of the bit data BD from the pixels 61 in the first row.

In addition, at this timing t64, the selector 74 changes the reading control signal SRCL4 from the low level to the high level (FIG. 35(H)). That is, the selector 74 changes the reading control signal SRCL4 from the low level to the high level to prioritize the pixels 61 in the fourth row, since the count value of the counter 73_4 related to the fourth row is the largest among the count values of the plurality of counters 73 at the end of the period of the timings t63 to t64. Simultaneously, the addresser 70 changes the selection control signal SSEL4 related to the accumulators 21 in the fourth row in the accumulator array 20 from the low level to the high level. The bit data BD is thus read from the pixel 61 in the fourth row and the read bit data BD is supplied to the accumulator 21 corresponding to this pixel 61 through the reading line RDL.

The bit data BD is thus read from the pixel 61 in the fourth row during the period of the timings t64 to t65. Then, the selector 74 resets the counter 73_4 related to the fourth row at the end of this period of the timings t64 to t65. The count value of this counter 73_4 thus becomes "0" (FIG. 35(D)).

Moreover, during this period of the timings t64 to t65, the pixel array 60 detects a photon and provides the detection notification to the addresser 70. The counter 73 increments the count value in response. Specifically, during this period of the timings t64 to t65, the count value of the counter 73_1 is incremented once on the basis of the detection notification from one of the pixels 61 in the first row (FIG. 35(A)). The count value of the counter 73_1 thus becomes "1" at the end of this period of the timings t64 to t65.

Meanwhile, since none of the pixels 61 in the second row provides the detection notification during this period of the timings t64 to t65, the count value of the counter 73_2 is not incremented (FIG. 35(B)). The count value of the counter 73_2 thus remains at "1" at the end of this period of the timings t64 to t65. Moreover, since none of the pixels 61 in the third row provides the detection notification during this period of the timings t64 to t65, the count value of the counter 73_3 is not incremented (FIG. 35(C)). The count value of the counter 73_3 thus remains at "2" at the end of this period of the timings t64 to t65.

In the imaging device 3, in a case where the detection notifications are received from the pixels 61 in a plurality of rows, the reading order is determined to allow reading to be performed in an order from a row including the largest number of the pixels 61 that have provided the detection notifications as described above, thus allowing for enhancing throughput. As a result, in the imaging device 3, it is possible to, for example, efficiently read the bit data BD from the pixels 61 within a limited time, allowing for timely supplying the information regarding the number of the photons detected by the pixels 61 to the accumulators 21.

In the present embodiment, in a case where the detection notifications are received from the pixels in a plurality of rows, the reading order is determined to allow reading to be performed in an order from a row including the largest number of the pixels 61 that have provided the detection notifications, thus allowing for enhancing throughput and, consequently, enhancing the image quality.

Modification Example 3

The modification examples of the above first embodiment are applicable to the imaging device 3 according to the above embodiment.

4. Fourth Embodiment

Next, description will be made on an imaging device 4 according to a fourth embodiment. According to the present embodiment, a selection frequency (reading frequency) of each of pixel lines LP for reading bit data BD from a plurality of pixels in a pixel array and supplying the bit data BD to the accumulator array 20 is determined on the basis of data stored in the accumulator array 20. It is to be noted that the same reference sign is used to refer to substantially the same component as in the imaging device 1 according to the above first embodiment and explanation thereof is omitted as necessary.

FIGS. 36 and 37 each illustrate a configuration example of the imaging device 4 according to the present embodiment. As illustrated in FIGS. 36 and 37, the imaging device 4 includes a pixel array 90, an addresser 99, and an output section 120.

The pixel array 90 includes a plurality of pixels 91, the plurality of reset lines RSL1, the plurality of reading control lines RCL, the plurality of output control lines OCL1, the plurality of reading lines RDL, and the plurality of output lines OPL1. The pixels 91 each include the light-receiving element 12, the resistor 13, the inverter 14, the counter 15, the switch 18, and the switch section 19. That is, these pixels 91 are each provided by omitting the notification control circuit 16 and the transistor 17 from each of the pixels 11 according to the first embodiment, etc.

The addresser 99 (FIGS. 36 and 37) drives the pixel array 90 and the accumulator array 20. Specifically, the addresser 99 drives the pixel array 10 per unit of pixel line LP by applying the plurality of reset signals SRSL1 to the respective plurality of reset lines RSL1 in the pixel array 90, applying the plurality of reading control signals SRCL to the respective plurality of reading control lines RCL, and applying the plurality of output control signals SOCL1 to the respective plurality of output control lines OCL1. Meanwhile, the addressor 99 drives the accumulator array 20 per unit of accumulator line LA by applying the plurality of reset signals SRSL2 to the respective plurality of reset lines RSL2 in the accumulator array 20, applying the plurality of selection control signals SSEL to the respective plurality of selection control lines SEL, and applying the plurality of output control signals SOCL2 to the respective plurality of output control lines OCL2.

To read the bit data BD from the plurality of pixels 91 in the pixel array 90 and supply the bit data BD to the accumulator array 20, the addressor 99 basically performs line sequential scanning, thereby driving the pixel array 10 per unit of pixel line LP, while driving the accumulator array 20 per unit of accumulator line LA. At that time, the addressor 99 determines the reading frequency on the basis of weight information INF supplied from a calculator 131 (described later) of an output section 130.

The output section 130 generates the image signal Sout on the basis of data for 8 bits (bits B7 to B0) supplied through the output line OPL1 from each of the plurality of pixels 91 in the pixel array 90 and data for 8 bits (bits B15 to B8) supplied through the output line OPL2 from each of the plurality of accumulators 21 in the accumulator array 20.

The output section 130 includes the calculator 131. This calculator 131 generates the weight information INF on the basis of a value VAL indicated by the data for 8 bits (bits B15 to B8) supplied through the output line OPL2 from each of the plurality of accumulators 21 in the accumulator array 20.

FIG. 38 illustrates an example of the weight information INF. The weight information INF includes a plurality of weight coefficients k (weight coefficients k1, k2, k3, . . . ). The plurality of weight coefficients k is associated with the respective accumulator lines LA. Specifically, the weight coefficient k1 is obtained by dividing an average value of a plurality of values VAL in the accumulator line LA of the first row by an average value of all the values VAL obtained in the accumulator array 20. The weight coefficient k2 is obtained by dividing an average value of a plurality of values VAL in the accumulator line LA of the second row by an average value of all the values VAL obtained in the accumulator array 20. The weight coefficient k3 and subsequent weight coefficients are similarly obtained. That is, for example, the accumulator line LA corresponding to the pixel line LP that has detected a large number of photons provides the weight coefficient k larger than "1", whereas the accumulator line LA corresponding to the pixel line LP that has detected a small number of photons provides the weight coefficient k smaller than "1."

The calculator 131 generates such weight information INF on the basis of the value VAL indicated by the data for 8 bits (bits B15 to B8) supplied through the output line OPL2 from each of the plurality of accumulators 21 in the accumulator array 20. The output section 130 then supplies this weight information INF to the addressor 99.

Thus, on the basis of the weight information INF, the addressor 99 determines the reading frequency to allow the bit data BD to be read from a row with a large weight coefficient k for an increased number of times and the bit data BD to be read from a row with a small weight coefficient k for a reduced number of times, for example.

Here, the addressor 99 and the calculator 131 correspond to a specific example of the "controller" according to the present disclosure.

FIG. 39 illustrates an example of an operation of the pixel array 90 and the accumulator array 20 during the frame period F.

The imaging device 4 performs the reset drive D1 per unit of pixel line LP by performing line sequential scanning on the plurality of pixels 91 in the pixel array 90 sequentially from top to bottom in the vertical direction (longitudinal direction) during a period of timings t71 to t72. Specifically, the addressor 99 sequentially resets the counters 15 of the pixels 91 per unit of pixel line LP by applying the plurality of reset signals SRSL1 to the respective plurality of reset lines RSL1. This causes each of the counters 15 to reset the count value and, subsequently, start the counting operation. The exposure period P1 is thus started sequentially in the plurality of pixels 91.

During this exposure period P1, the counter 15 of each of the pixels 91 increments the count value every time when the light-receiving element 12 detects a photon. The counter 15 thus stores the count value corresponding to the number of photons detected by the light-receiving element 12.

During a period of the timings t72 to t73, the imaging device 4 performs a reading drive D2 per unit of pixel line LP basically by performing line sequential scanning on the plurality of pixels 91 in the pixel array 90 sequentially from top to bottom in the vertical direction (longitudinal direction). In this example, the imaging device 4 performs the reading drive D2 for ten times (reading drives D20 to D29) during the timings t72 to t73. It is to be noted that the number of times to perform the reading drive D2 is not necessarily limitative but may be more or less than ten times. Specifically, during each of the plurality of reading drives D2, the addressor 99 sequentially reads the bit data BD from the plurality of pixels 91 per unit of pixel line LP by applying the plurality of reading control signals SRCL to the respective plurality of reading control lines RCL and supplies the read bit data BD to the plurality of accumulators 21 per unit of accumulator line LA by applying the plurality of selection control signals SSEL to the respective plurality of selection control lines SEL. The plurality of accumulators 21 each perform the accumulating operation on the basis of the bit data BD.

In this regard, the addressor 99 determines the reading frequency on the basis of the weight information INF supplied from the calculator 131 of the output section 130 during the frame period F immediately before the current frame period F. Specifically, the addressor 99 determines the reading frequency to allow the bit data BD to be read from a row with a large weight coefficient k for an increased number of times and the bit data BD to be read from a row with a small weight coefficient k for a reduced number of times, for example.

FIG. 40A schematically illustrates an example of one of the reading drives D2 during the frame period F and FIG. 40B schematically illustrates an example of another reading drive D2 during the frame period F. As illustrated in FIG. 40A, the addressor 99 applies the plurality of reading control signals SRCL to the respective plurality of reading control lines RCL per unit of pixel line LP basically by performing line sequential scanning.

Then, for example, in a case where the weight coefficient k related to the second row is "1.1", the addressor 99 sets the reading control signal SRCL2 at the high level twice to read the bit data BD from the pixels 91 in the second row twice as illustrated in FIG. 40B during one of the ten reading drives D2, for example. That is, in this example, since the weight coefficient k related to the second row is "1.1" and thus the number of the photons detected by the pixels 91 in the second row is large, the bit data BD is read from the pixels 91 in the second row for an increased number of times during the frame period.

Meanwhile, for example, in a case where the weight coefficient k related to the third row is "0.9", the addressor 99 keeps the reading control signal SRCL2 at the low level not to read the bit data BD from the pixels 91 in the third row as illustrated in FIG. 40B during one of the ten reading drives D2, for example. That is, in this example, since the weight coefficient k related to the third row is "0.9" and thus the number of the photons detected by the pixels 91 in the third row is small, the bit data BD is read from the pixels 91 in the third row for a reduced number of times during the frame period.

Then, during a period of the timings t73 to t74, the imaging device 4 performs the output drive D31 per unit of pixel line LP by sequentially performing line sequential scanning on the plurality of pixels 91 in the pixel array 90 from top to bottom in the vertical direction (longitudinal direction), while performing the output drive D32 per unit of accumulator line LA by sequentially performing line sequential scanning on the plurality of accumulators 21 in the accumulator array 20 from top to bottom in the vertical direction. Specifically, the addressor 99 applies the plurality of output control signals SOCL1 to the respective plurality of output control lines OCL1, thereby causing the pixels 91 to sequentially output the data for 8 bits (bits B7 to B0) to the output lines OPL1 per unit of pixel line LP. In addition, the addressor 99 applies the plurality of output control signals SOCL2 to the respective plurality of output control lines OCL2, thereby causing the accumulators 21 to sequentially output the data for 8 bits (bits B15 to B8) to the output lines OPL2 per unit of accumulator line LA.

The calculator 131 of the output section 130 then generates the weight information INF on the basis of the data for 8 bits (bits B7 to B0) supplied from the pixel array 10 and data for 8 bits (bits B15 to B8) supplied from the accumulator array 20 and supplies this weight information INF to the addressor 99. In addition, the output section 130 generates the image signal Sout on the basis of the data for 8 bits (bits B7 to B0) and the data for 8 bits (bits B15 to B8).

As described above, in the imaging device 4, the reading frequency for reading the bit data BD from the plurality of pixels 91 in the pixel array 90 and supplying the read bit data BD to the accumulator array 20 is determined on the basis of the data stored in the accumulator array 20. This makes it possible to simplify a pixel configuration as compared with the case of the first embodiment, etc.

Moreover, in the imaging device 4, the reading frequency is determined on the basis of the weight information INF obtained during the frame period F immediately before the current frame period F. Specifically, the addressor 99 determines the reading frequency to allow the bit data BD to be read from a row with a large weight coefficient k for an increased number of times and the bit data BD to be read from a row with a small weight coefficient k for a reduced number of times, for example. This allows the bit data BD to be read from the pixels 91 in a row with a large number of detected photons for an increased number of times. As a result, it is possible to efficiently read the bit data BD from the pixels 91 in the imaging device 4, making it possible to timely supply information regarding the number of the photons detected by the pixels 91 to the accumulators 21.

In the present embodiment, the reading frequency is determined on the basis of the data stored in the accumulator array, making it possible to simplify a pixel configuration.

In the present embodiment, since the reading frequency is determined on the basis of the weight information, it is possible to read the bit data from the pixels in a row with a large number of the detected photons for an increased number of times, allowing for timely supplying information regarding the number of the photons detected by the pixels to the accumulators.

Modification Example 4-1

In the above embodiment, the addressor 99 determines the reading frequency on the basis of the weight information INF generated by the calculator 131 but it is not necessarily limitative. Instead of this, the calculator may determine the reading frequency on the basis of the weight information INF as in an imaging device 4A illustrated in FIG. 41, for example. This imaging device 4A includes an address decoder 99A and an output section 130A. The address decoder 99A drives the pixel array 90 and the accumulator array 20 on the basis of address information INFA supplied from the output section 130A. The output section 130A includes a calculator 131A. The calculator 131A not only generates the weight information INF similarly to the calculator 131 according to the above embodiment but also determines the reading frequency on the basis of the weight information INF. The calculator 131A then generates an address of the pixel line LP and the accumulator line LA to drive on the basis of the determined reading frequency and supplies information regarding this address of these pixel line LP and accumulator line LA as the address information INFA to the address decoder 99A.

Modification Example 4-2

In the above embodiment, the reading frequency is determined on the basis of the data stored in the accumulator array 20 but it is not necessarily limitative. Instead of this, the reading frequency may be determined on the basis of the data stored in the accumulator array 20 and the data stored in the pixel array 90.

5. Use Examples of Imaging Device

FIG. 42 illustrates use examples of the imaging devices 1 to 4 according to the above embodiments. For example, the above imaging devices 1 to 4 are usable in a variety of cases of sensing light such as visible light, infrared light, ultraviolet light, and X-ray as follows.

a device that captures an image provided for viewing, such as a digital camera or a mobile device with a camera function a device provided for traffic, such as an in-vehicle sensor that captures an image of a view, for example, in front of, behind, around, or inside a vehicle for safety driving including automatic braking, recognition of a state of a driver, or the like, a monitoring camera that monitors a traveling vehicle or a road, and a ranging sensor that measures an intervehicle distance, etc.

a device provided in a home appliance, such as a television, a refrigerator, or an air conditioner, to capture an image of a gesture of a user and operate the appliance in accordance with the gesture a device for medical care or healthcare, such as an endoscope or a device that captures an image of a blood vessel by receiving infrared light a device provided for security, such as a monitoring camera for a purpose of crime prevention or a camera for a purpose of person identification a device provided for beauty care, such as a skin measuring device that captures an image of skin or a microscope that captures an image of a scalp a device provided for sports, such as an action camera or a wearable camera for sports or the like a device provided for agriculture, such as a camera used for monitoring a state of a field or crops In addition, the technologies of the imaging devices 1 to 4 according to the above embodiments may be applied to a range finder using a TOF (Time Of Flight) method. According to this TOF method, light is outputted, while reflected light, which is reflected on an object to be measured, is detected. Furthermore, according to the TOF method, it is possible to measure a distance to the object to be measured by measuring a time difference between a timing when the light is outputted and a timing when the reflected light is detected. The technologies of the imaging devices 1 to 4 according to the above embodiments are applicable to a sensor that detects the reflected light in the range finder.

6. Example of Application to Mobile Body

The technology according to the present disclosure (present technology) is applicable to various products. For example, the technology according to the present disclosure may be implemented as an apparatus mounted on any type of mobile body such as an automobile, an electric vehicle, a hybrid electric vehicle, a motorcycle, a bicycle, a personal mobility, an airplane, a drone, a vessel, or a robot.

FIG. 43 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 43, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 43, an audio speaker 12061, a display section 12062, and an instrument panel 12063 are illustrated as the output device. The display section 12062 may, for example, include at least one of an on-board display and a head-up display.

FIG. 44 is a diagram depicting an example of the installation position of the imaging section 12031.

In FIG. 44, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 44 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

In the forgoing, described is one example of the vehicle control system to which the technology according to the present disclosure may be applied. The technology according to the present disclosure may be applied to the imaging section 12031 out of the configurations as described above. In the vehicle control system 12000, this makes it possible to timely aggregate the number of the photons detected by the pixels. As a result, the vehicle control system 12000 is able to enhance accuracy of, for example, a collision avoidance or collision mitigation function for the vehicle, a following driving function based on a following distance, a vehicle speed maintaining driving function, a warning function of collision of the vehicle, and a warning function of deviation of the vehicle from a lane.

In the forgoing, the present technology is described by using some embodiments, modification examples, and specific application examples thereof. However, the present technology is not limited to these embodiments, etc. and may be modified in a variety of manners.

For example, the configuration of each of the pixels, the number of the bits in each of the counters 15, the configuration of each of the accumulators 21, the number of the bits in each of the accumulator circuits 23, and the like in the above embodiments, etc. are merely examples and may be changed as necessary.

It is to be noted that the effects described herein are merely exemplary and not necessarily limitative and any other effect may be achieved.

It is to be noted that the present technology may include the following configurations.

(1)
An imaging device including:
a pixel including a photoelectric converter configured to generate a signal in response to entering light, a storage configured to store data corresponding to the signal, and an output section configured to output the data stored in the storage; and
a controller configured to control the output section to output the data in a case where the data stored in the storage satisfies a predetermined condition.

(2)
The imaging device according to (1), in which
the storage is configured to perform a counting operation on the basis of the signal, and
the data includes a count value generated by the counting operation.

(3)
The imaging device according to (2), in which
the predetermined condition is that the count value reaches a predetermined count value, and
the controller is configured to control the output section to output bit data included in the data.

(4)
The imaging device according to (1), in which
the data includes data for 1 bit, and
the predetermined condition is that the data reaches a predetermined logical value.

(5)
The imaging device according to (1), in which the photoelectric converter and the storage are integrally configured.

(6)
The imaging device according to any one of (1) to (5), including a plurality of the pixels, in which
the plurality of pixels is grouped into a plurality of groups including a first group,
the controller is configured to generate a plurality of control signals including a first control signal, and
the output section of each of a first plurality of pixels that belongs to the first group among the plurality of pixels is configured to output the data on the basis of the first control signal.

(7)
The imaging device according to (6), in which the controller is configured to control the output section of each of the first plurality of pixels to output the data using the first control signal in a case where the data in at least one of the first plurality of pixels satisfies the predetermined condition.

(8)
The imaging device according to (7), further including a control signal line coupled to each of the plurality of pixels that belongs to the first group, the control signal line being coupled to a power source through a resistor, in which
each of the plurality of pixels that belongs to the first group includes a switch configured to apply a predetermined voltage to the control signal line in a case where the data satisfies the predetermined condition, and
the controller is configured to generate the first control signal on the basis of a voltage in the control signal line.

(9)
The imaging device according to (6) or (7), in which
the plurality of groups includes a second group,
the plurality of control signals includes a second control signal, and
the output section of each of a second plurality of pixels that belongs to the second group among the plurality of pixels is configured to output the data on the basis of the second control signal.

(10)
The imaging device according to (9), in which
the controller is configured to selectively perform a first control operation or a second control operation in a case where the data in at least one of the first plurality of pixels and the data in at least one of the second plurality of pixels satisfy the predetermined condition,
the first control operation indicates controlling, using the first control signal, the output section of each of the first plurality of pixels to output the data and thereafter controlling, using the second control signal, the output section of each of the second plurality of pixels to output the data, and
the second control operation indicates controlling, using the second control signal, the output section of each of the second plurality of pixels to output the data and thereafter controlling, using the first control signal, the output section of each of the first plurality of pixels to output the data.

(11)
The imaging device according to (10), in which the controller is configured to perform the first control operation and the second control operation within one frame period.

(12)
The imaging device according to (9), in which
the controller includes a first timing detector configured to detect a first timing for the data in at least one of the first plurality of pixels to satisfy the predetermined condition and a second timing detector configured to detect a second timing for the data in at least one of the second plurality of pixels to satisfy the predetermined condition, is configured to identify which of the first timing and the second timing is earlier on the basis of a detection result of each of the first timing detector and the second timing detector, and is configured to perform a third control operation in a case where the first timing is earlier, and
the third control operation indicates controlling, using the first control signal, the output section of each of the first plurality of pixels to output the data and thereafter controlling, using the second control signal, the output section of each of the second plurality of pixels to output the data.

(13)
The imaging device according to (12), in which
the controller is configured to selectively perform a first control operation or a second control operation in a case where it is not possible to identify which of the first timing and the second timing is earlier,
the first control operation indicates controlling, using the first control signal, the output section of each of the first plurality of pixels to output the data and thereafter controlling, using the second control signal, the output section of each of the second plurality of pixels to output the data, and the second control operation indicates controlling, using the second control signal, the output section of each of the second plurality of pixels to output the data and thereafter controlling, using the first control signal, the output section of each of the first plurality of pixels to output the data.

(14)

The imaging device according to (9), in which the controller includes a first counter configured to count the number of times that the data in the first plurality of pixels has satisfied the predetermined condition and a second counter configured to count the number of times that the data in the second plurality of pixels has satisfied the predetermined condition, is configured to compare a first count value of the first counter and a second count value of the second counter, and is configured to perform a third control operation in a case where the first count value is larger than the second count value, and the third control operation indicates controlling, using the first control signal, the output section of each of the first plurality of pixels to output the data and thereafter controlling, using the second control signal, the output section of each of the second plurality of pixels to output the data.

(15)

The imaging device according to (14), in which the first count value indicates the number of, among the first plurality of pixels, pixels in which the data has satisfied the predetermined condition, and the second count value indicates the number of, among the second plurality of pixels, pixels in which the data has satisfied the predetermined condition.

(16)

The imaging device according to (14) or (15), in which the controller is configured to selectively perform a first control operation or a second control operation in a case where the first count value and the second count value are equal, the first control operation indicates controlling, using the first control signal, the output section of each of the first plurality of pixels to output the data and thereafter controlling, using the second control signal, the output section of each of the second plurality of pixels to output the data, and the second control operation indicates controlling, using the second control signal, the output section of each of the second plurality of pixels to output the data and thereafter controlling, using the first control signal, the output section of each of the first plurality of pixels to output the data.

(17)

The imaging device according to any one of (1) to (16), further including an accumulating section configured to accumulate the data outputted from the pixel.

(18)

An imaging device including:

a pixel including a photoelectric converter configured to generate a signal in response to entering light, a storage configured to store data corresponding to the signal, and an output section configured to output the data stored in the storage; and a controller configured to control the output section to output the data stored in the storage on the basis of accumulated data obtained by an accumulating section configured to accumulate the data outputted from the pixel.

(19)

The imaging device according to (18), in which the storage is configured to perform a counting operation on the basis of the signal, and the data includes a count value generated by the counting operation.

(20)

The imaging device according to (18), in which the data includes data for 1 bit.

(21)

The imaging device according to any one of (18) to (20), including a plurality of the pixels, in which the plurality of pixels is grouped into a plurality of groups including a first group, the controller is configured to generate a plurality of control signals including a first control signal, and the output section of each of a first plurality of pixels that belongs to the first group among the plurality of pixels is configured to output the data on the basis of the first control signal.

(22)

The imaging device according to (21), in which the controller is configured to: set a first output number of times that the output section of each of the first plurality of pixels outputs the data on the basis of a first plurality of pieces of the accumulated data obtained on the basis of the data outputted from the first plurality of pixels; and generate the first control signal on the basis of the first output number of times.

(23)

The imaging device according to (22), in which the plurality of groups includes a second group, the plurality of control signals includes a second control signal, the output section of each of a second plurality of pixels that belongs to the second group among the plurality of pixels is configured to output the data on the basis of the second control signal, and in a case where a total of values indicated by the first plurality of pieces of the accumulated data is larger than a total of values indicated by a second plurality of pieces of the accumulated data obtained on the basis of the data outputted from the second plurality of pixels, the controller is configured to: set the first output number of times and a second output number of times that the output section of each of the second plurality of pixels outputs the data to cause the first output number of times to be larger than the second output number of times; and generate the first control signal and the second control signal on the basis of the first output number of times and the second output number of times.

(24)

An imaging system including:

a pixel including a photoelectric converter configured to generate a signal in response to entering light, a storage configured to store data corresponding to the signal, and an output section configured to output the data stored in the storage;

an accumulating section configured to accumulate the data outputted from the pixel; and a controller configured to control the output section to output the data in a case where the data stored in the storage satisfies a predetermined condition.

This application claims priority on the basis of Japanese Priority Patent Application JP2018-128733 filed with the Japan Patent Office on Jul. 6, 2018, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging device comprising:
a plurality of pixels, respective ones of the pixels including a photoelectric converter configured to generate a signal in response to entering light, a storage configured to store data corresponding to the signal, and output circuitry configured to output the data stored in the storage; and
a controller configured to control the output circuitry to output the data in a case where the data stored in the storage satisfies a predetermined condition, wherein
the plurality of pixels is grouped into a plurality of groups including a first group,
the controller is configured to generate a plurality of control signals including a first control signal, and
the output circuitry of each of a first plurality of pixels that belongs to the first group among the plurality of pixels is configured to output the data on a basis of the first control signal.

2. The imaging device according to claim 1, wherein
the storage is configured to perform a counting operation on a basis of the signal, and
the data comprises a count value generated by the counting operation.

3. The imaging device according to claim 2, wherein
the predetermined condition is that the count value reaches a predetermined count value, and
the controller is configured to control the output circuitry to output bit data included in the data.

4. The imaging device according to claim 1, wherein
the data comprises data for 1 bit, and
the predetermined condition is that the data reaches a predetermined logical value.

5. The imaging device according to claim 1, wherein the photoelectric converter and the storage are integrally configured.

6. The imaging device according to claim 1, wherein the controller is configured to control the output circuitry of each of the first plurality of pixels to output the data using the first control signal in a case where the data in at least one of the first plurality of pixels satisfies the predetermined condition.

7. The imaging device according to claim 6, further comprising
a control signal line coupled to each of the plurality of pixels that belongs to the first group, the control signal line being coupled to a power source through a resistor, wherein
each of the plurality of pixels that belongs to the first group includes a switch configured to apply a predetermined voltage to the control signal line in a case where the data satisfies the predetermined condition, and
the controller is configured to generate the first control signal on a basis of a voltage in the control signal line.

8. The imaging device according to claim 1, wherein
the plurality of groups includes a second group,
the plurality of control signals includes a second control signal, and
the output circuitry of each of a second plurality of pixels that belongs to the second group among the plurality of pixels is configured to output the data on a basis of the second control signal.

9. The imaging device according to claim 8, wherein
the controller is configured to selectively perform a first control operation or a second control operation in a case where the data in at least one of the first plurality of pixels and the data in at least one of the second plurality of pixels satisfy the predetermined condition,
the first control operation indicates controlling, using the first control signal, the output circuitry of each of the first plurality of pixels to output the data and thereafter controlling, using the second control signal, the output circuitry of each of the second plurality of pixels to output the data, and
the second control operation indicates controlling, using the second control signal, the output circuitry of each of the second plurality of pixels to output the data and thereafter controlling, using the first control signal, the output circuitry of each of the first plurality of pixels to output the data.

10. The imaging device according to claim 9, wherein the controller is configured to perform the first control operation and the second control operation within one frame period.

11. The imaging device according to claim 8, wherein
the controller includes a first timing detector configured to detect a first timing for the data in at least one of the first plurality of pixels to satisfy the predetermined condition and a second timing detector configured to detect a second timing for the data in at least one of the second plurality of pixels to satisfy the predetermined condition, is configured to identify which of the first timing and the second timing is earlier on a basis of a detection result of each of the first timing detector and the second timing detector, and is configured to perform a third control operation in a case where the first timing is earlier, and
the third control operation indicates controlling, using the first control signal, the output circuitry of each of the first plurality of pixels to output the data and thereafter controlling, using the second control signal, the output circuitry of each of the second plurality of pixels to output the data.

12. The imaging device according to claim 11, wherein
the controller is configured to selectively perform a first control operation or a second control operation in a case where it is not possible to identify which of the first timing and the second timing is earlier,
the first control operation indicates controlling, using the first control signal, the output circuitry of each of the first plurality of pixels to output the data and thereafter controlling, using the second control signal, the output circuitry of each of the second plurality of pixels to output the data, and
the second control operation indicates controlling, using the second control signal, the output circuitry of each of the second plurality of pixels to output the data and thereafter controlling, using the first control signal, the output circuitry of each of the first plurality of pixels to output the data.

13. The imaging device according to claim 8, wherein
the controller includes a first counter configured to count a number of times that the data in the first plurality of pixels has satisfied the predetermined condition and a second counter configured to count a number of times that the data in the second plurality of pixels has satisfied the predetermined condition, is configured to compare a first count value of the first counter and a second count value of the second counter, and is configured to perform a third control operation in a case where the first count value is larger than the second count value, and
the third control operation indicates controlling, using the first control signal, the output circuitry of each of the first plurality of pixels to output the data and thereafter controlling, using the second control signal, the output circuitry of each of the second plurality of pixels to output the data.

14. The imaging device according to claim 13, wherein the first count value indicates a number of, among the first plurality of pixels, pixels in which the data has satisfied the predetermined condition, and
the second count value indicates a number of, among the second plurality of pixels, pixels in which the data has satisfied the predetermined condition.

15. The imaging device according to claim 13, wherein the controller is configured to selectively perform a first control operation or a second control operation in a case where the first count value and the second count value are equal,
the first control operation indicates controlling, using the first control signal, the output circuitry of each of the first plurality of pixels to output the data and thereafter controlling, using the second control signal, the output circuitry of each of the second plurality of pixels to output the data, and
the second control operation indicates controlling, using the second control signal, the output circuitry of each of the second plurality of pixels to output the data and thereafter controlling, using the first control signal, the output circuitry of each of the first plurality of pixels to output the data.

16. The imaging device according to claim 1, further comprising an accumulation circuitry configured to accumulate the data outputted from the pixel.

17. An imaging device comprising:
a plurality of pixels, respective ones of the pixels including a photoelectric converter configured to generate a signal in response to entering light, a storage configured to store data corresponding to the signal, and an output circuitry configured to output the data stored in the storage; and
a controller configured to control the output circuitry to output the data stored in the storage on a basis of accumulated data obtained by an accumulation circuitry configured to accumulate the data outputted from the pixel, wherein
the plurality of pixels is grouped into a plurality of groups including a first group,
the controller is configured to generate a plurality of control signals including a first control signal, and
the output circuitry of each of a first plurality of pixels that belongs to the first group among the plurality of pixels is configured to output the data on a basis of the first control signal.

18. The imaging device according to claim 17, wherein the storage is configured to perform a counting operation on a basis of the signal, and the data comprises a count value generated by the counting operation.

19. The imaging device according to claim 17, wherein the data comprises data for 1 bit.

20. The imaging device according to claim 17, wherein the controller is configured to: set a first output number of times that the output circuitry of each of the first plurality of pixels outputs the data on a basis of a first plurality of pieces of the accumulated data obtained on a basis of the data outputted from the first plurality of pixels; and generate the first control signal on a basis of the first output number of times.

21. The imaging device according to claim 20, wherein the plurality of groups includes a second group,
the plurality of control signals includes a second control signal,
the output circuitry of each of a second plurality of pixels that belongs to the second group among the plurality of pixels is configured to output the data on a basis of the second control signal, and
in a case where a total of values indicated by the first plurality of pieces of the accumulated data is larger than a total of values indicated by a second plurality of pieces of the accumulated data obtained on a basis of the data outputted from the second plurality of pixels, the controller is configured to: set the first output number of times and a second output number of times that the output circuitry of each of the second plurality of pixels outputs the data to cause the first output number of times to be larger than the second output number of times; and generate the first control signal and the second control signal on a basis of the first output number of times and the second output number of times.

22. An imaging system comprising:
a plurality of pixels, respective ones of the pixels including a photoelectric converter configured to generate a signal in response to entering light, a storage configured to store data corresponding to the signal, and an output circuitry configured to output the data stored in the storage;
accumulation circuitry configured to accumulate the data outputted from the pixel; and
a controller configured to control the output circuitry to output the data in a case where the data stored in the storage satisfies a predetermined condition, wherein
the plurality of pixels is grouped into a plurality of groups including a first group,
the controller is configured to generate a plurality of control signals including a first control signal, and
the output circuitry of each of a first plurality of pixels that belongs to the first group among the plurality of pixels is configured to output the data on a basis of the first control signal.

* * * * *